US008185585B2

(12) United States Patent
Zondervan et al.

(10) Patent No.: US 8,185,585 B2
(45) Date of Patent: May 22, 2012

(54) METHOD FOR SENDING AN ELECTRONIC MESSAGE UTILIZING CONNECTION INFORMATION AND RECIPIENT INFORMATION

(75) Inventors: Quinton Y. Zondervan, Boston, MA (US); Umair A. Khan, Fremont, CA (US); Gregory Harman, Cambridge, MA (US); Salman Akhtar, Fremont, CA (US); Muhammad Raza, Woburn, MA (US); Muhammad Ata Ul Haleem Vainco, Lahore (PK); Dmitriy V. Yepishin, Fremont, CA (US); Asad A. Zaidi, Newark, CA (US)

(73) Assignee: NVIDIA International, Inc., St. Michael (BB)

( * ) Notice: Subject to any disclaimer, the term of this patent is extended or adjusted under 35 U.S.C. 154(b) by 373 days.

(21) Appl. No.: 11/614,768

(22) Filed: Dec. 21, 2006

(65) Prior Publication Data
US 2007/0094340 A1 Apr. 26, 2007

Related U.S. Application Data

(60) Division of application No. 09/953,372, filed on Sep. 14, 2001, now Pat. No. 7,185,286, which is a continuation-in-part of application No. 09/942,080, filed on Aug. 28, 2001, now abandoned.

(51) Int. Cl.
*G06F 15/16* (2006.01)
(52) U.S. Cl. ......... 709/204; 709/206; 709/227; 709/228
(58) Field of Classification Search .................. 709/204, 709/206, 227, 228
See application file for complete search history.

(56) References Cited

U.S. PATENT DOCUMENTS

| 5,428,791 | A | * | 6/1995 | Andrew et al. ............... 717/121 |
| 5,706,457 | A | | 1/1998 | Dwyer et al. |
| 5,850,221 | A | | 12/1998 | Macrae et al. |
| 5,909,678 | A | | 6/1999 | Bergman et al. .................. 707/4 |
| 5,937,160 | A | * | 8/1999 | Davis et al. .................... 709/203 |
| 6,097,887 | A | | 8/2000 | Hardikar et al. |
| 6,105,043 | A | | 8/2000 | Francisco et al. |
| 6,169,992 | B1 | | 1/2001 | Beall et al. |
| 6,289,382 | B1 | | 9/2001 | Bowman-Amuah |
| 6,407,752 | B1 | | 6/2002 | Harnett |

(Continued)

FOREIGN PATENT DOCUMENTS
WO WO 01/20847 A2 * 9/2000

OTHER PUBLICATIONS

Padwick et al, Using Microsoft Outlook 2000. U.S.A., May 1999, pp. 46 and 49-50, retrieved from http://proquest.safaribooksonline.com/ 0-7897-1909-6, on Jan. 7, 2010.*

(Continued)

*Primary Examiner* — Karen Tang
(74) *Attorney, Agent, or Firm* — Zilka-Kotab, PC

(57) ABSTRACT

A method comprises displaying a mail server information screen, and receiving connection information via the mail server information screen. Further, the method comprises displaying an address page, and receiving recipient information via the address page. In addition, the method comprises displaying a content page, and receiving content in the content page. Additionally, an electronic mail message having the content is compiled, and the electronic mail message is sent to a recipient utilizing the connection information and recipient information.

28 Claims, 50 Drawing Sheets

U.S. PATENT DOCUMENTS

| | | |
|---|---|---|
| 6,418,471 B1 | 7/2002 | Shelton et al. |
| 6,532,023 B1 | 3/2003 | Schumacher et al. |
| 6,549,216 B1 | 4/2003 | Schumacher et al. |
| 6,697,793 B2 | 2/2004 | McGreevy .......................... 707/1 |
| 6,724,409 B1 | 4/2004 | Maddocks et al. |
| 6,775,819 B1 | 8/2004 | Hardikar et al. |
| 6,868,444 B1 | 3/2005 | Kim et al. |
| 6,912,692 B1 | 6/2005 | Pappas |
| 6,983,320 B1 | 1/2006 | Thomas et al. |
| 7,370,040 B1 | 5/2008 | Kruy et al. |
| 2001/0020237 A1 | 9/2001 | Yarnall et al. |
| 2002/0070968 A1 | 6/2002 | Austin et al. |
| 2002/0078158 A1* | 6/2002 | Brown et al. ................. 709/206 |
| 2002/0199034 A1 | 12/2002 | Beckett et al. ................. 709/328 |
| 2003/0018661 A1* | 1/2003 | Darugar ........................ 707/500 |

OTHER PUBLICATIONS

Padwick et al., Using Microsoft Outlook 2000. U.S.A., May 1999, pp. xxxviii, 48-50, 72, 74, and 94-95 retrieved from http://proquest.safaribooksonline.com/0-7897-1909-6 on Sep. 1, 2010.*

Office Action Summary from U.S. Appl. No. 11/944,048 mailed on Feb. 5, 2010.

Final Office Action from U.S. Appl. No. 11/944,048, dated Aug. 5, 2010.

Non-Final Office Action from U.S. Appl. No. 11/943,974, dated Oct. 27, 2010.

Final Office Action from U.S. Appl. No, 11/943,974, dated Jun. 7, 2011.

Advisory Action from U.S. Appl. No, 11/943,974, dated Aug. 26, 2011.

Non-Final Office Action from U.S. Appl. No. 11/944,048, dated Jul. 28, 2011.

Final Office Action from U.S. Appl. No. 11/944,048, dated Dec. 7, 2011.

Non-Final Office Action from U.S. Appl. No. 11/943,974, dated Feb. 9, 2012.

Advisory Action from U.S. Appl. No. 11/944,048, dated Feb. 27, 2012.

* cited by examiner

METHOD FOR SENDING AN ELECTRONIC MESSAGE UTILIZING CONNECTION INFORMATION AND RECIPIENT INFORMATION

RELATED APPLICATIONS

The present application is a divisional of U.S. patent application Ser. No. 09/953,372 entitled INTERFACE FOR MOBILIZING CONTENT AND TRANSACTIONS ON MULTIPLE CLASSES OF DEVICES, filed Sep. 14, 2001, now U.S. Pat. No. 7,185,286 which is a continuation-in-part of U.S. patent application Ser. No. 09/942,080 entitled SYSTEM, METHOD AND COMPUTER PROGRAM PRODUCT FOR PATTERN REPLAY USING STATE RECOGNITION, filed Aug. 28, 2001, now abandoned which are all incorporated herein by reference.

FIELD OF THE INVENTION

The present invention relates to computer-related transactions, and more particularly to automating computer-related transactions.

BACKGROUND OF THE INVENTION

The internet is composed of content distributed in the World Wide Web and various intranets. While a large fraction of the content is static, the truly interesting content is the one that a user can interact with dynamically. This content is of various types including, but not limited to (i) the content stored in various databases, (ii) e-commerce web-pages, (iii) directories, (iv) intranet pages, (v) data warehouses, etc.

The interaction with this dynamic content is accomplished through (i) queries/submissions to databases, (ii) buying/selling/interacting through e-commerce, (iii) running queries and lookups in directories, (iv) accessing and interacting with content resident on intranet pages (including on individual computers), and/or (v) accessing, interacting with, adding subtracting or modifying content resident in data warehouses.

The access to or interaction with this dynamic content is done in a variety of ways. For example, such interaction may be accomplished through direct access to the databases by running specific commands or through form submissions on the Internet that run specific queries or perform specific actions. This interaction requires the submission of necessary parameters or information to complete a query or interaction (addition, modification, subtraction) with the dynamic content. This information may need to be submitted in multiple steps. Once the submission of information is finished, the results of the interaction/query/e-commerce are sent back to the user.

Each time a user wishes to interact in the foregoing manner, the user is required to carry out each and every one of the steps associated with the submission of necessary parameters or information. If a same type of transaction is to be carried out in a repeated manner, this may be very time consuming and problematic.

Accordingly, accessing web content is more complicated than simply making individual HTTP requests. The prior art has yet to enable fetching of the same content as the user and rendering it the same way the user saw it. To do this, the appropriate content must first be fetched across the network. It must then be rendered correctly.

When fetching the content, the user may first be required to log in or run a search for a certain term. More generally, the content of interest could be generated by an arbitrary web transaction. Logging in and running a search are all examples of web transactions. Thus, fetching content requires support for various authentication and network protocols, management of client-side state information as well as support for the appropriate cipher strength.

It should be noted that fetching any interactive web content requires the ability to be able to execute web transactions. In the case of non-interactive content (e.g. the top headlines from a news site), no transaction is required to retrieve the content. One simply has to request the page from the remote server. However, if any interaction is required to access that content (e.g. weather report for a particular zip code), the transaction must be executed before the content can be retrieved.

Web transactions vary in their complexity. They may be as simple as entering a zip code to receive a customized weather report. On the other hand, they may be complex enough to involve logging in to a secure stock trading site, browsing to a particular page on the site, submitting a query and then browsing to a specific section in the report to obtain the current credit rating of a company.

Rendering the content is also a challenging problem. To start with, there is no well-defined standard for how web pages should display. Identical HTML is often rendered differently by competing browsers. Secondly, even apart from standard disputes and ambiguities, one can never be entirely sure that one has rendered a page as intended by the page designer. The designer may not have intended it for display on certain resolutions. Furthermore, not all browsers and clients are equally capable.

The aforementioned problems are compounded when attempting to access and navigate websites using wireless devices. Most websites are not wireless enabled. Nor can most wireless devices access and retrieve content from the websites directly.

There is therefore a need for a process that allows mobilization of any website to allow output of desired content on a mobile device in a format amendable to display on the mobile device. There is also a need for a method to render active content into a format amenable to display on a device that does not support active content. There is a further need for an interface that allows creation and manipulation of transaction patterns that automate interactions with content and applications.

SUMMARY OF THE INVENTION

A graphical user interface for visual representation and manipulation of a transaction pattern, including creation and/or modification thereof. The graphical user interface includes a workplace view for receiving user specification of at least one of content and a transaction for a transaction pattern. A pattern view allows manipulation of properties of the pattern. A device editor view allows a user to specify pattern-related output on a client device. The graphical user interface also includes a script view for allowing a user to utilize scripting to manipulate a data flow within the pattern.

In one embodiment, the workplace view includes a browser view, which allows the user to specify interactions with web content, and/or allows the user to specify web content such as by clicking on the content with a mouse. In another embodiment, the workplace view of the graphical user interface includes a database view having database connection dialogs.

In an embodiment, the pattern view displays one or more icons each representing a connector to an application and/or a collection of connectors. The connector(s) may include a markup language connector such as an XML connector, a database connector, an email connector such as an SMTP connector, an FTP connector, and/or a messaging connector such as an SMS connector. Preferably, the pattern view allows specification of an additional path of the pattern. Note that the additional paths may include alternate, looping, and/or branching paths. Also preferably, the pattern view allows coupling of the pattern to a second pattern.

In one embodiment, the device editor view of the graphical user interface displays a simulation of an output of a display of the client device. Preferably, the device editor view allows specification of output relating to the pattern for multiple client devices.

The client device may be a wireless device, and/or can be any one of the following illustrative devices: a wireless telephone, Personal Digital Assistant (PDA), handheld computer, a pager, and a device connected to a wireless modem.

In a further embodiment, the graphical user interface includes a project view displaying elements defined in the pattern. A data view can also be provided to display data variables. The graphical user interface can also include a pattern gallery view displaying a list of patterns available for use. A replay view is also provided for displaying a replay of the pattern.

A system, method and article of manufacture for recording a transaction pattern utilizing a graphical user interface are also provided. An interface is displayed. A user is allowed to specify interactions with content via the interface. For example, the user can specify interactions by way of example, entering information through a wizard-type program interface, etc. The interactions are recorded. A pattern is generated based on the recorded interactions. The pattern is displayed on a graphical user interface. The pattern includes a graphical representation of each interaction.

In one embodiment a browser is displayed. The user specifies interactions with web (HTML/XML) content using the browser. In another embodiment, a database view having database connection dialogs is displayed. The user specifies interactions with a database using the dialogs. In a further embodiment, the interface for allowing the user to specify interactions with content is a wizard.

In an embodiment, the user is allowed to connect representations of the interactions via the graphical user interface for specifying an order of execution of the interactions in the pattern. The pattern may further include prerecorded interactions retrieved from a data store.

In another embodiment, a portion of a prerecorded pattern is recognized as a prefix of a pattern being recorded. The new pattern branches from the already existing pattern. As an option, the pattern can be coupled to another pattern.

In a further embodiment, specifications of interactions relating to the pattern for multiple client devices are received. A simulation of an output of a display of the client device as it would be during replay of the pattern can be displayed.

A method for recording an interaction with a database is also provided. A driver selection page is displayed, which allows selection of a database driver. A connection information page is displayed. The connection information page receives connection parameters of the database such as name and location. A field selection page is also displayed, and allows selection of at least one field of the database. The field selection information forms a portion of a query. A filter page is displayed. The filter page receives filtering parameters for filtering data in the field(s) of the database. The filtering data also forms a portion of the query. A transaction pattern is generated from the information received via the connection information page, field selection page, and filter page.

In one embodiment, a representation of the transaction pattern is displayed in a pattern view. Results of the query can be displayed. As an option, variables are used to generalize the query. As another option, the results of the query are stored in a variable.

In another embodiment, a loop back page is displayed. The loop back page allows creation of another query with the same connection parameters. The pattern can include multiple queries, which can further be organized in a sequence in the pattern.

A method for recording a File Transfer Protocol (FTP) interaction is provided. A connection type page is displayed. The connection type page allows selection of a mode of connection to a data source. A connection information page is displayed. Connection parameters of the data source such as host name, user name, password and email, are received via the connection information page. An action selection page is displayed, which allows selection of an FTP interaction with the data source. An action parameter page is displayed. Parameters relating to performing the selected FTP interaction are received via the action parameter page. A transaction pattern is generated based on the information received by the pages.

In one embodiment, a user is allowed to connect to the data source anonymously. As an option, a data transfer mode selection page can be displayed for allowing specification of a mode for data transfer. In a further embodiment, the FTP action can include retrieving a directory listing of the data source, uploading a file to the data source, downloading a file from the data source, and/or deleting a file from the data source.

A method for generating a template for an electronic mail message. A mail server information screen is displayed. Connection information is received via the mail server information screen. An address page is displayed. Recipient information is received via the address page. A content page is displayed. Content for the message is received via the content page. An electronic mail message is compiled with the content. The electronic mail message is sent to a recipient utilizing the connection information and recipient information.

In one embodiment, the connection information includes at least one variable. In another embodiment, the recipient information includes at least one variable. In a further embodiment, the content includes at least one variable.

DESCRIPTION OF THE PREFERRED EMBODIMENTS

Figure 1:
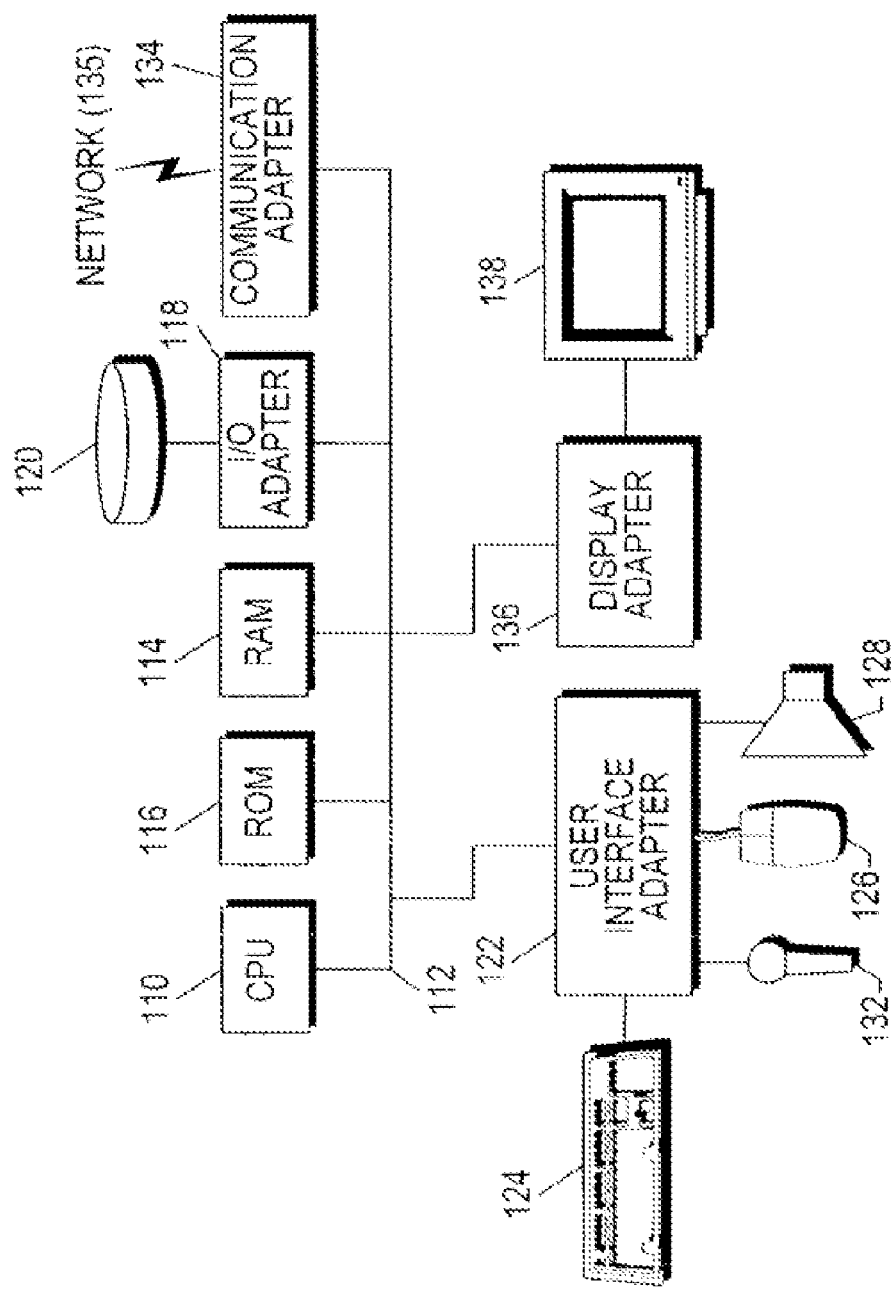
FIG. 1 illustrates a typical hardware configuration of a workstation in accordance with a preferred embodiment.

FIG. 1 illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, and I/O adapter 118 for connecting peripheral devices such as disk storage units 120 to the bus 112, a user interface adapter 122 for connecting a keyboard 124, a mouse 126, a speaker 328, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows Operating System (OS), the IBM OS/2 operating system, the MAC OS, or UNIX operating system. Those skilled in the art may appreciate that the present invention may also be implemented on platforms and operating systems other than those mentioned.

Figure 2:
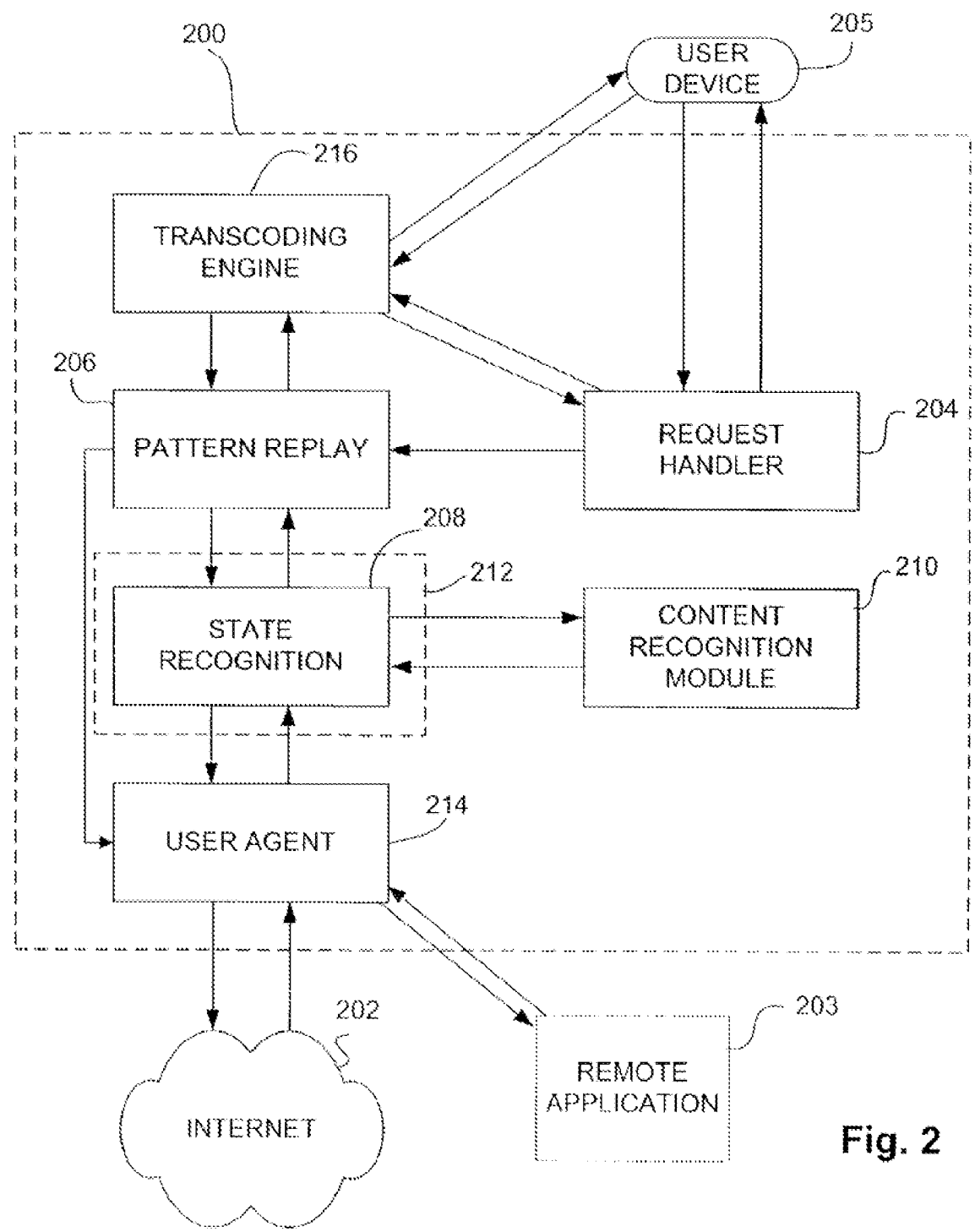
FIG. 2 illustrates a system for navigating a network, including conducting transactions, in accordance with one embodiment.

FIG. 2 illustrates a platform 200 for mobilizing a network site/application 202 and/or enabling interaction with a remote application 203, including conducting automated transactions and selecting content, in accordance with one embodiment of the present invention.

A Request Handler (RH) 204 communicates with a user device 205. The RH manages requests from the user device, routing them to the appropriate system component.

When a user requests a transaction, the request is sent to a Pattern Replay Engine (PRE) 206, which replays a pattern for conducting a transaction on behalf of a user. More information about the PRE is set forth below. More information about operation and functionality of the PRE is found in U.S. patent application entitled SYSTEM, METHOD AND COMPUTER PROGRAM PRODUCT FOR PATTERN REPLAY USING STATE RECOGNITION, filed Aug. 28, 2001 under Ser. No. 09/942,080 and U.S. patent application entitled SYSTEM, METHOD AND COMPUTER PROGRAM PRODUCT FOR THE RECORDING AND PLAYBACK OF TRANSACTION MACROS, filed Aug. 28, 2001 under Ser. No. 09/942,047, each of which is assigned to common assignee Clickmarks, Inc., and which are both herein incorporated by reference.

The State Recognition Module (SRM) 208 determines which state a website is in based on its current output, such as a structure of the current output. The SRM may communicate with a Content Recognition Model 210, which recognizes individual documents that can comprise a state. A Connector 212 is in communication with the SRM. The Connector executes a state in the pattern. The SRM, Content Recognition Module, and connector are described in detail in U.S.

patent application entitled SYSTEM, METHOD AND COMPUTER PROGRAM PRODUCT FOR RECOGNIZING A STATE OF A REMOTE APPLICATION, filed Aug. 28, 2001 under Ser. No. 09/942,263 and assigned to common assignee Clickmarks, Inc., and which is herein incorporated by reference. More information about operation and functionality of the Content Retrieval Module is found in U.S. patent application entitled SYSTEM, METHOD AND COMPUTER PROGRAM PRODUCT FOR RETRIEVING ARBITRARY CONTENT FROM A REMOTE DATA SITE FOR OUTPUT TO A DEVICE IN A FORMAT SUITABLE FOR THAT DEVICE, filed Aug. 28, 2001 under Ser. No. 09/942,262 and assigned to common assignee Clickmarks, Inc., and which is herein incorporated by reference.

The User Agent 214 is used by other components of the system to provide the actual interaction with a remote website. For example, when replaying a pattern, the SRM communicates with the User Agent via the Connector to provide instructions to the User Agent. The other system components have intelligence built into them that instructs them how to utilize the User Agent. For example, when a user clicks on a button on a page, other components instruct the User Agent to navigate to the desired web page and perform some action, such as filling in a form. The User Agent retrieves the resulting page and returns it to the other components.

By default, the User Agent is not running. A listener (not shown) listens for requests. When the listener receives a request, it creates a new User Agent process on the server and returns an identifier that identifies the User Agent process. Subsequently, client processes use the identifier, go the specific User Agent and instruct it to perform some action. The User Agent performs the action according to the instructions and returns the results of the action.

A Transcoding Page Rending Engine (TRE) 216 renders content for display on the user device. Preferably, the TRE is able to render content on any display environment. More information about operation and functionality of the TRE is found in U.S. patent application entitled SYSTEM, METHOD AND COMPUTER PROGRAM PRODUCT FOR PAGE RENDERING UTILIZING TRANSCODING, filed Aug. 28, 2001 under Ser. No. 09/942,051 and assigned to common assignee Clickmarks, Inc., and which is herein incorporated by reference.

In the present invention, a transaction preferably refers to communicating (i) information and/or actions required to conduct the transaction, and/or (ii) information and/or actions sent back or desired by the user, respectively.

For example, a transaction, in one embodiment, may refer to information submitted by the user, actions taken by the user, actions taken by a system enabling the access of the user to the data, actions taken by the data to retrieve/modify content, results sent back to the user, and/or any combination or portion of the foregoing entities.

Interactive Design Tool (IDT)

The Interactive Design Tool according to one embodiment allows a user to mobilize content and transactions on to multiple classes of devices. Some specific examples of the use of the IDT include:

Mobilize an existing web application. (For example, mobilizing a Sales Force Automation application such as www.salesforce.com that currently exists in HTML form only)

Create a new mobile application based partially on existing content from the web, a database etc. (For example, giving a salesperson the ability to mark an order as closed from a mobile device resulting in a legacy database system being updated)

Create a Web Integration application based on the interaction of multiple existing web applications.

Configure the basic view presented by the mobilization platform (i.e. editing the application layout schema). Note that this last feature is conceptually different from the first three as it operates at a "higher" level; it defines that containers within which the various applications defined in the first three cases above may appear.

Application Views

The IDT graphical user interface provides several views according to one embodiment.

Workplaces

The first view is the Workplace view. Workplace views are the views within which the designer specifies the content and/or transaction by example. For example, while mobilizing web content, the Web Workplace presents a browser view to the designer where the designer can indicate specific content by clicking on the areas of interest. The workplace records the usage pattern in the background. If the designer is mobilizing content stored in a database, the Database Workplace displays the appropriate database connection dialogs. Thus, the workplace is at all times, aware of the class of content/transactions the designer is mobilizing and provides the appropriate view. The designer accesses content with multiple types of connectors. Connectors are functional blocks that allow access via various methods such as Web, database connectivity, FTP, etc.

Pattern View

The Pattern View is a view where the designer is able to manipulate the properties of the pattern. The Pattern View can also allow the designer to create a pattern manually and/or add pattern elements directly. Several functions enabled by the Pattern View follow.

The Pattern View allows formal pattern specification. Especially for web patterns, the pattern recorded in the Workplace represents only one possible interaction path. For example, the pattern may only represent a successful login into an online account.

However, in actual usage, a user may also encounter an unsuccessful login. The Pattern View is used to visually specify such alternate paths in a flowchart format. Note that formal specification may be needed not just for the web connector. For example, some connectors may require error handling alternate interaction paths. See the section on Recording Alternate Paths, below, for further details.

The Pattern View also enables cross-connector flow, including design of complex interactions that span multiple types of connectors. For example, consider an interaction that obtains content like stock quotes from the web and inserts them into a database. The two pieces of this interaction (web and database) are individually recorded with the Workplace. However, the Pattern View is where the information flow across these pieces is coupled, or "glued" together.

A pattern may be divided into multiple segments. For example, a pattern which aims to check on the price using a price comparison engine an then purchase the item, might be first divided into two segments (one for the comparison and one for the purchase). The designer can eventually link the individual segments together while applying appropriate selection and transformation using scripts.

Device Editor View(s)

The Device Editor View(s) is a view where the designer is able to specify the view and interaction of the Client Devices as it relates to the pattern under design. For example, consider a pattern for retrieving bank account information. Within the Workplace and Pattern View, the designer is able to specify how to fetch the account information while navigating through multiple web screens. In the Device Editor, the designer may specify, for example, two screens: one in which the bank account number is entered and a second where the account balance is displayed. The Device Editor View is able to accommodate design for multiple classes of devices (e.g. phones, PDAs, etc.). Further, the Device Editor View(s) can function as the screen editors for specific clients, and can depict an accurate rendering of what the client device displays.

Script Editor View

Within the Script View, the designer is able to edit Javascript to manipulate the data flow within the pattern and also serve as gluing logic.

Utility Views

These are views used to enhance the user experience and provide useful information at various points. One Utility View is a Project Explorer. The Project Explorer displays all elements defined in the project thus far in a tree format. The main branches of the tree can include: Pattern (which contains all the states defined thus far in the Pattern View grouped into segments), Scripts (all scripts defined), and/or Session Data.

Another Utility View is a Data Explorer. Using the Data Explorer, the designer is able to create and inspect the data variables. These variables can be created for a give pattern and/or can be predefined and provided in a database of the mobilization platform. The variables can be of basic data types but also can belong to User Defined data types that can also be created via this View. These variables are available to be used in different views.

A further Utility View is a Pattern Gallery, which displays a list of available patterns that can be re-used. Various properties of the patterns (inputs, outputs, description, last modification date, etc.) can be shown.

Replay Mode (Testing and Debugging)

According to one embodiment, once a pattern has been recorded, the IDT can be used to replay the pattern. This is critical for testing and debugging the pattern. The designer will have the ability to set breakpoints, step through the pattern and set up variable watch windows to trace the execution of the pattern. Since the pattern is interpreted, it may be possible to stop at a breakpoint, change the pattern that is supposed to follow, and re-start execution of the pattern.

IDT Output

According to an embodiment, the IDT can generate XML descriptions of the pattern called Pattern XML (or other suitable name), the mobile views generated and the data transformations, etc. designed within the data view. In addition, the scripts written by the designer are also recorded. The IDT also stores the current project in a binary document (uses MFC object serialization mechanisms), which has the information of the Pattern defined so far. The project file can be called "Company Process Document" (*.cpd files) or other suitable name.

Processes

Figure 3:
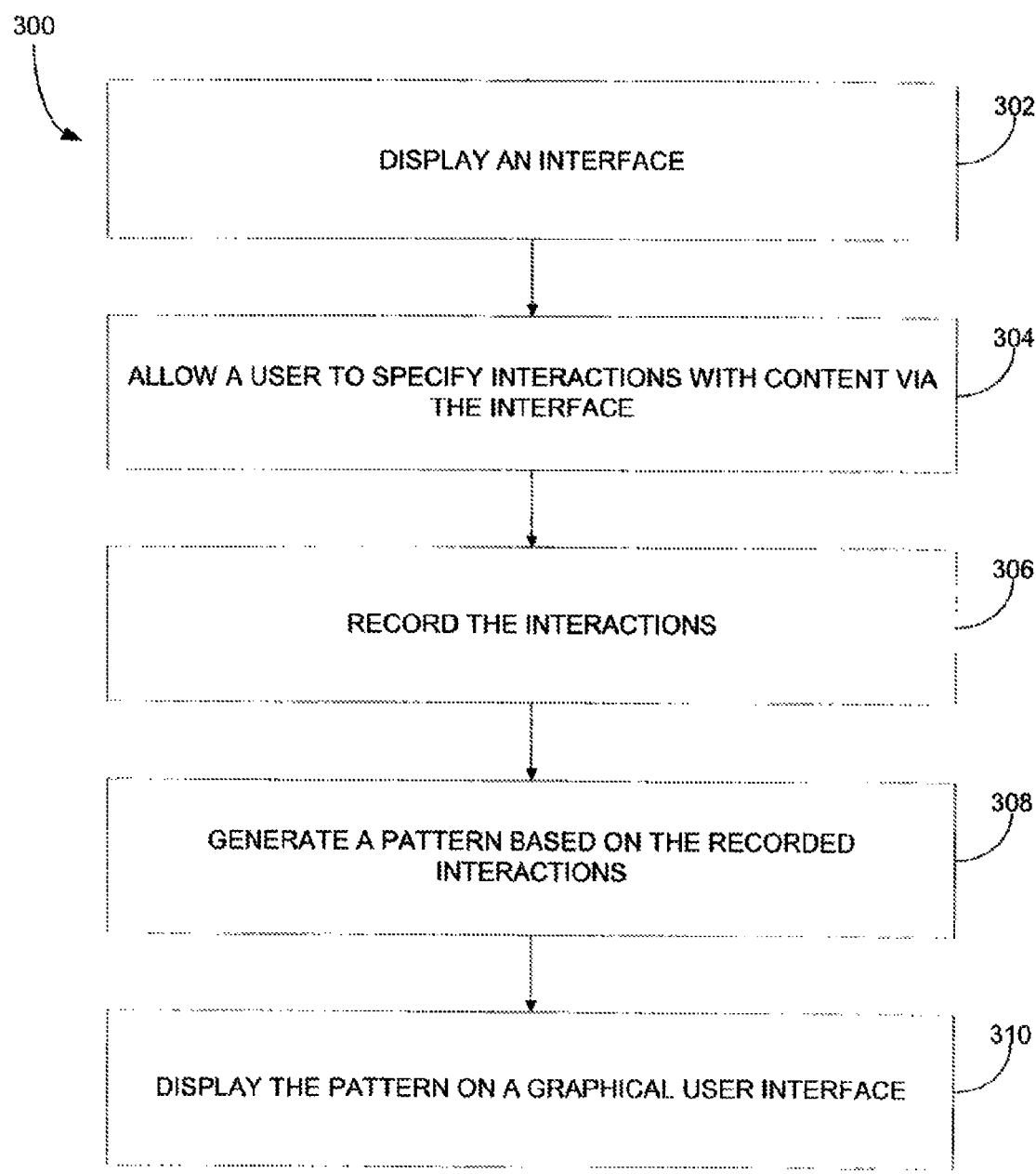
FIG. 3 is a flow diagram of a process for recording a transaction pattern utilizing a graphical user interface according to an embodiment.

FIG. 3 is a flow diagram of a process 300 for recording a transaction pattern utilizing a graphical user interface. In operation 302, an interface is displayed. A user is allowed to specify interactions with content via the interface in operation 304. For example, the user can specify interactions by way of example, entering information through a wizard-type program interface, etc. The interactions are recorded in operation 306. In operation 308, a pattern is generated based on the recorded interactions. The pattern is displayed on a graphical user interface in operation 310. The pattern includes a graphical representation of each interaction.

In one embodiment a browser is displayed. The user specifies interactions with web content using the browser. In another embodiment, a database view having database connection dialogs is displayed. The user specifies interactions with a database using the dialogs. In a further embodiment, the interface for allowing the user to specify interactions with content is a wizard.

In an embodiment, the user is allowed to connect representations of the interactions via the graphical user interface for specifying an order of execution of the interactions in the pattern. The pattern may further include prerecorded interactions retrieved from a data store.

In another embodiment, a portion of a prerecorded pattern is recognized as a prefix of a pattern being recorded. The new pattern branches from the already existing pattern. As an option, the pattern can be coupled to another pattern.

In a further embodiment, specifications of interactions relating to the pattern for multiple client devices are received. A simulation of an output of a display of the client device as it would be during replay of the pattern can be displayed.

Application Details

This section describes the functionality of each element of the IDT in detail and describes the details of the application in the following order.

a) Connectors: This section lists the connectors supported by default and an extensible architecture for plugging in new Connectors at run-time.
    b) Clients: This section lists all the target clients supported by default and the extensibility mechanism for adding new devices.
    c) Workplace View(s): This section describes the capabilities of the Workplace View for all the built-in connectors.
    d) Pattern View: This section describes the basic flowcharting capabilities of the Pattern View. It will then describe each of the palettes available within this view and the functionality supported by each icon on the palettes.
    e) Device Editor View: This section describes the basic visual editing abilities of the Client View.
    f) Data Management View: This section describes the facilities available to the designer to manage session and user variables.
    g) Script View: This section describes the editor and capabilities that the designer can add and maintain using JavaScript code, or any other scripting language.

Connectors

Several illustrative connectors are set forth in Table 1.

TABLE 1

| Component | Description |
| --- | --- |
| XML | Web Connector. This is the key Connector that allows content/transactions available on the Web to be accessed. |
| Database | Connectivity via ODBC/JDBC to access data |
| SMTP | Connection to outgoing email |
| FTP | Incoming and outgoing ftp connections |
| SMS | Outgoing messages using the SMS protocol |
| WebMethods | This connector provides the IDT with EAI capabilities. |

Any of the patterns indicated in the table above can be built-in within the IDT.

Connector UI Representation

Each connector can be represented within the IDT as a Workplace interface to specify how the connector is represented within the workplace. For example, a browser window that has been modified as described below can represent the XML Connector.

Each connector can also be represented as a set of "smart" icons cataloged within the Pattern View. The icons contain both the visual representation of the connector (or a sub-component of it: for example, one web page within a pattern specified using the XML Connector) as well a set of rules which govern how the pattern flow can be modified within that icon. For example, certain icons represent the ability for the pattern to loop within the state represented by the icon until an exit condition is reached. Other icons do not allow flow looping. The rules attached with the icon can be described using XML. Additionally, each icon can be contained within a palette/catalog that may be used to group functionality. For example, there may be seven smart icons together on a palette that represents the XML Connector while a second palette displays the three icons associated with the Database connector.

Connector Implementation

Connectors may be implemented as separate DLLs with a specified interface, which allows new connectors to be plugged-in at run-time to extend the capabilities of the IDT. The connector implementation in each case can provide the designer the ability to interact with the web pages, database tables, etc. to allow a simulated interaction that can be recorded and hence determine whether the parameters of the interaction are correct.

Illustrative Target Clients

Table 2 lists several target clients that can be supported by the IDT and how these can be extended. Note: A target client is a combination of a device, a User Agent and a markup language (for example, a cell phone with a phone.com browser using a Wireless Application Protocol (WAP)). The actual details of all the supported client devices with specific model and device capability can be documented in a Client Descriptor XML file.

TABLE 2

| Device Class | Description |
| --- | --- |
| WAP Phones | Describes phones with WML and/or HDML capabilities |
| PDAs | Describes devices (Palm, Pocket PC, etc.) |
| Voice XML | Access via voice devices |
| Web | Access via standard browsers on PCs |

Client UI Representation

Each device is represented within the IDT as a mode within the Device Editor View. The mode shows a visual representation of the screen available on the device as well the basic navigational buttons available for each device.

Client Implementation

Each device is implemented as an XML description of the client capabilities. This description lists properties of the physical device or software application (for example, screen size), the User Agent, and/or the markup language (by reference). Hence, the IDT is able to parse out that the Nokia 8110 running a phone.com browser with the WML support allows for bolding of text but not italics. This "plug-in" description of the User Agent and the Markup Language provides the flexibility to deal with new markup languages as required.

Application View

Figure 4:
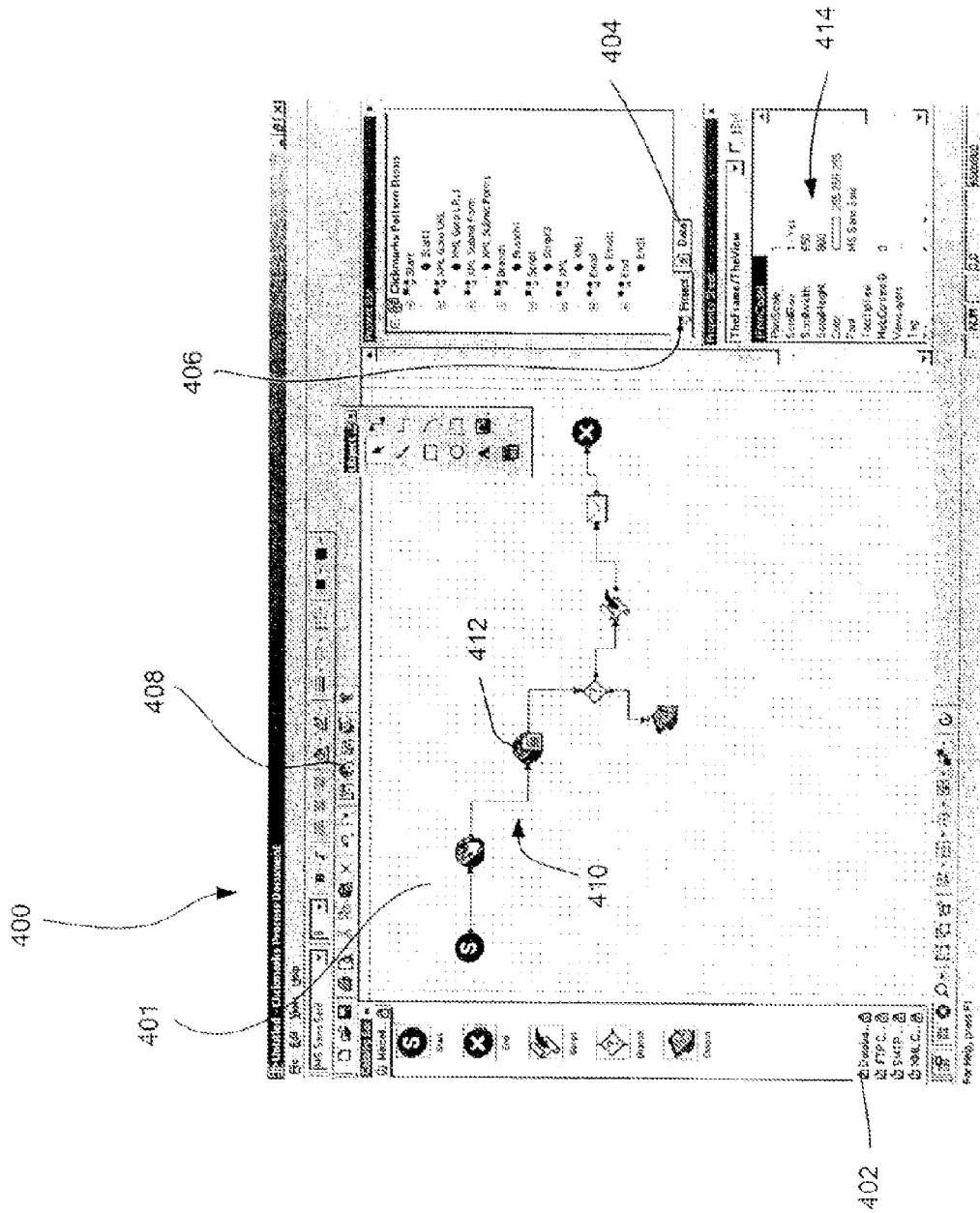
FIG. 4 illustrates the main features and layout of an application window according to one embodiment.

FIG. 4 illustrates the main features and layout of an application window 400 according to one embodiment.

As shown, the IDT application includes a Single Document Interface application with a pattern view 401 having a grid-like canvas. The stencils 402 (called catalogs) for each of the connector are stacked as a dockable bar and the Utility Views (containing the Data Explorer 404 and the Project Explorer 406) are also docked as a tabbed control bar. There are standard toolbars to access the editing capabilities. The recording workplace(s) can be invoked in the form of modal dialogs by selecting workplace recording buttons 408 from the toolbar.

The Pattern 410 consists of graphical iconic representations 412 of the interactions performed and/or connectors to remote data sources, applications, etc. The parameters/properties 414 of an interaction are available upon clicking the node 412 itself.

Workplace Views

This section describes the Workplace for each type of connector. A window and an associated toolbar represent each type of Workplace View.

XML Connector Workplace

An XML Connector provides the designer with the ability to interact with web sites written in markup language, an extended markup language, etc. The XML Connector also allows the designer to make transactions and extract information.

In the XML Connector workplace view, the main area is occupied by a browser window. A toolbar associated with the windows has buttons for Next, Previous, Stop, Refresh and an edit box to enter a URL. Additionally there are buttons for 'Start Recording' and 'Stop Recording'. After the designer clicks 'Start Recording', the workplace begins recording the usage pattern in the background. The designer can then use the Workplace like a standard browser and interact as normal with web content. The usage pattern is recorded in the form of an XML based Pattern Description, which also includes the links, buttons, etc. used by the designer to navigate the web content as well as data input elements where the designer may have entered some information (for example, login and password text boxes). The description also includes the actual values of the data entered by the designer. Subsequently the designer may modify and replace these values with data derived from Session and Platform variables.

Interaction of Workplace with Client View

The XML Connector workplace can directly interact with a Client View using a drag-and-drop operation. The designer can pick content from the workplace and move it a screen they create in the Client View and then set properties on the content within the Client View to control its display. (See the Client View section, below, for more details). Such an operation automatically creates a session variable storing the content that was "dragged".

Interaction of Workplace with Data Management View

Within the XML Connector the designer is able to select any content in the workplace and choose Associate Variable (from a right-click menu) to pipe the content into a session variable. If the designer has selected a single cell of a table or simple text, the data is inserted into an automatically-defined string variable. If the designer selects a table, the data is inserted into an m×n string array corresponding to m columns and n rows in the table.

Within the Data Management View, the designer has the ability to rename or delete the newly created variable. In addition, the designer can also concatenate the cells contained within a single row into a single string variable. In the case of a string array, the designer can also choose to drop certain columns within the array if they are not relevant.

The Data Management View also creates input variables for each place where the designer entered any data in the Workplace. The data that goes 'into' the web page may come from one of different sources. Illustrative sources are set forth below.

1. The data may be the data from Platform variables. These are use variables provided by the platform. Illustrative variables include the user login and password at Yahoo or a user's credit card number.

2. The data may come from some other connector, e.g., a value in a database using Session variables (created by the designer) as an intermediate step.
3. The data may be hard coded by the designer as literal value(s). For example, the designer may want the language to be English for all users.

Representation in Pattern View

After the designer stops recording and switches to Pattern View, the Pattern Description is parsed to display a visual representation in the form of a flowchart. See FIG. 4 and the related discussion. In general the process diagram can span multiple recordings with multiple types of connectors. States in which the designer entered some data can be visually differentiated from other states. The designer can click on any state and view the currently defined Session and Application variables in the Data Explorer.

HTML Document and Content Identification

A node in the graph may represent an interaction with an HTML page that is based on the assumption that a "specific page" has been reached and now either a link or a form needs to be submitted (this is the actual interaction). The Pattern Reply Engine (and other relevant Platform components) are able to identify the appropriate page. This identification can be based on feature recognition of a page. For example, for a given site a login page may be the one that has a 'Login:' and 'Password' in the first form on the page.

More information about recognizing a page can be found in U.S. patent application entitled SYSTEM, METHOD AND COMPUTER PROGRAM PRODUCT FOR RECOGNIZING A STATE OF A REMOTE APPLICATION, referenced above.

Similarly, the Content Retrieval Module can be used to retrieve a specific table from with a specific page. More information about operation and functionality of the Content Retrieval Module is found in U.S. patent application entitled SYSTEM, METHOD AND COMPUTER PROGRAM PRODUCT FOR RETRIEVING ARBITRARY CONTENT FROM A REMOTE DATA SITE FOR OUTPUT TO A DEVICE IN A FORMAT SUITABLE FOR THE DEVICE, as set forth above.

From the perspective of the IDT, when a designer interacts with a web page, specifically when a HTML document is completely loaded, the IDT 'scans' the page to extract the features of a web page that can be used to uniquely identify a page using an automated algorithm/heuristics, as set forth in the U.S. patent application entitled SYSTEM, METHOD AND COMPUTER PROGRAM PRODUCT FOR RECOGNIZING A STATE OF A REMOTE APPLICATION, discussed above. These identifying features can be presented to the designer for editing and modifications so that human approval is involved. The IDT can also provide UI support in the XML Connector Workplace.

Internally, each page can be given a unique identifier that will have a related 'identification features list' which can be stored as XML as part of the Pattern output. The identification feature list may be a Boolean expression of individual features.

Database Connector Workplace

Figure 5:
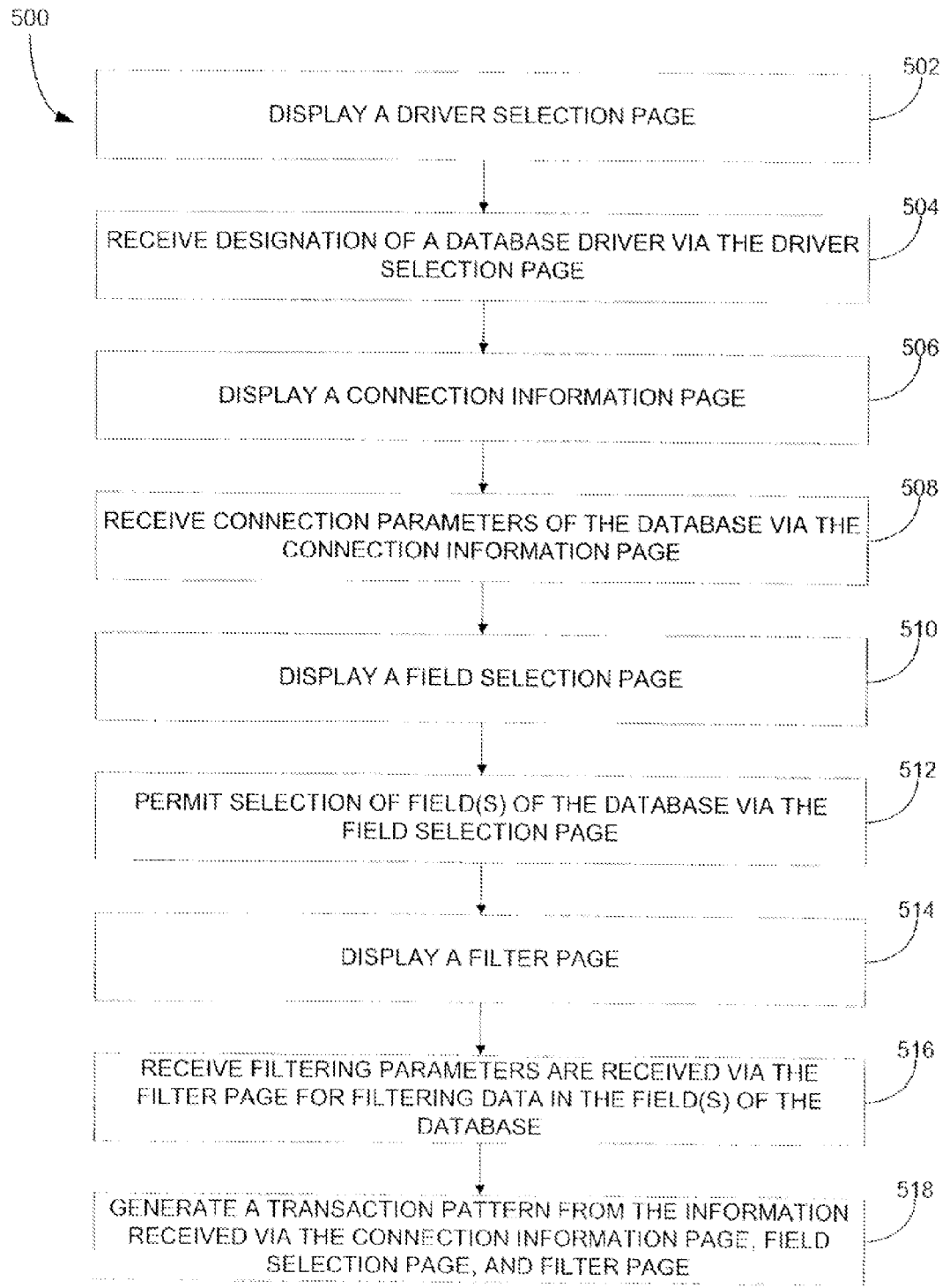
FIG. 5 is a flowchart of a process for recording an interaction with a database according to an embodiment.

FIG. 5 is a flowchart of a process 500 for recording an interaction with a database. In operation 502, a driver selection page is displayed. In operation 504, designation of a database driver is received via the driver selection page. A connection information page is displayed in operation 506. In operation 508, connection parameters of the database, such as name and location, are received via the connection information page. A field selection page is displayed in operation 510. Selection of field(s) of the database is permitted in operation 512 via the field selection page. A filter page is displayed in operation 514. In operation 516, filtering parameters are received via the filter page, and are used for filtering data in the field(s) of the database. In operation 518, a transaction pattern is generated from the information received via the connection information page, field selection page, and filter page.

This connector gives the designer the ability to interact with databases, which are accessible via the ODBC/JDBC interface. A 'Database Recorder Wizard' for this connector provides the user the ability to specify the Server Name, Schema Name, user name and password to connect depending on the selection of the database driver (i.e. Oracle or MS Access etc.). Illustrative databases that can be supported in the user interface include Microsoft® Access, Microsoft®SQLServer, etc.

Variables in the database connector can be used to generalize an SQL query to be executed and/or a sink for the query results. In both the cases the interaction can be performed using SQL and the user and session variables for moving data to and fro.

The user can insert variables in an SQL query, using the context menu, and can also run the generalized queries by providing the immediate values for these variables.

Following is a description of the screens of the Database Workplace according to one embodiment. The Database Workplace in this example is in the form of a wizard that guides the designer step-by-step through specification of connection information and later build a query. The designer can loop in the wizard pages to create multiple queries with the same connection. Each screen is described below.

Figure 6:
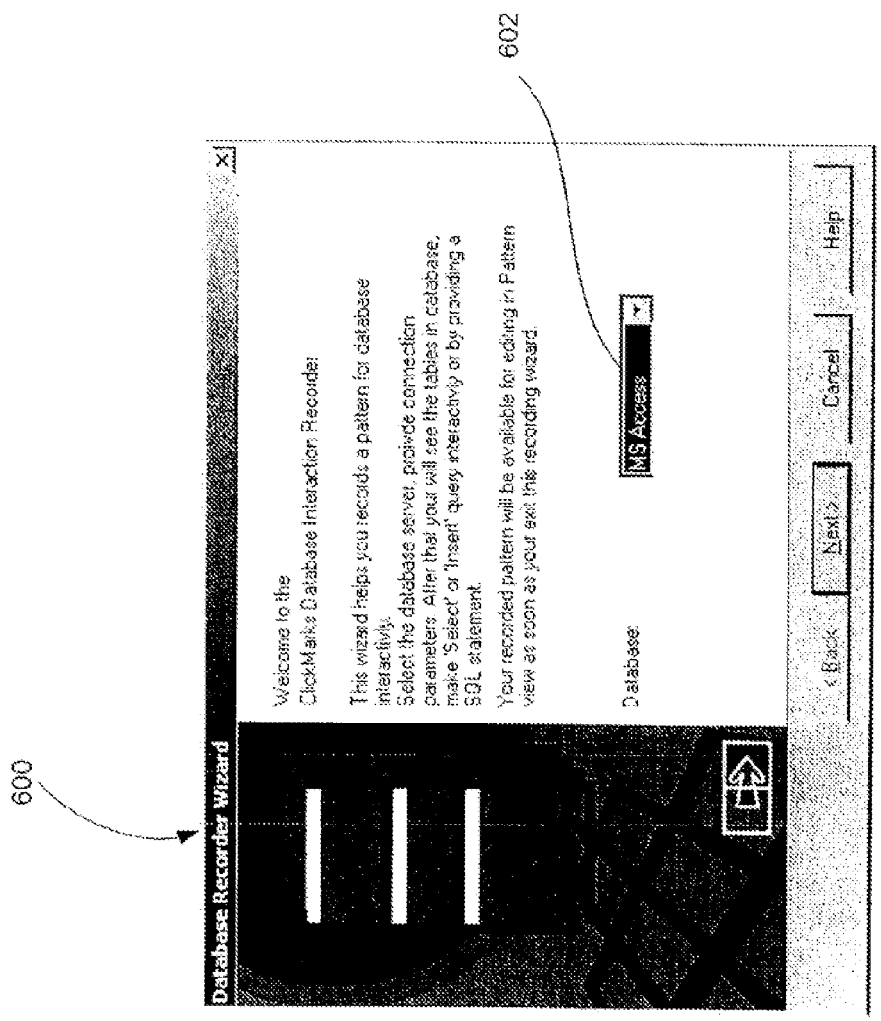
FIG. 6 illustrates a driver selection page of the database recorder wizard.

FIG. 6 illustrates a driver selection page 600 of the database recorder wizard. This page is shown when the designer invokes the Database Workplace from the toolbar. The designer selects the database driver from a Database field or menu 602. Which driver is selected determines the information needed to contact to the database and the driver to be used.

Figure 7:
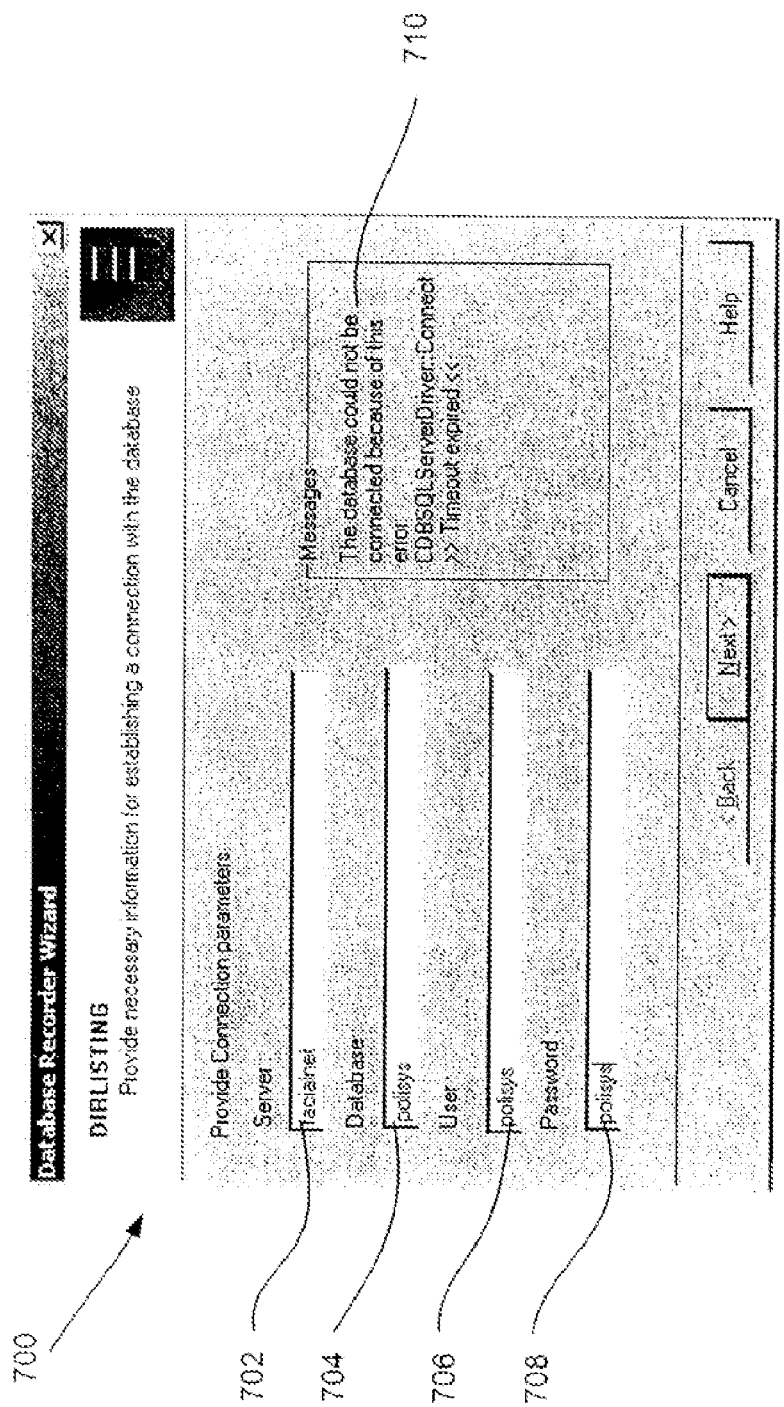
FIG. 7 illustrates a connection information page of the database recorder wizard.

FIG. 7 illustrates a connection information page 700 of the database recorder wizard, displayed after selection of the database driver from the driver selection page of FIG. 6. Several fields are presented, in which the designer provides connection information.

Such fields can include fields for server name 702, the DB server resolvable name 704, Username 706, Password 708, etc. The information needed depends on the driver selected. The message area 710 shows any error messages or user prompts that may occur. Table 3 lists several exemplary drivers and information needed in each case.

TABLE 3

| Database Driver | Connection Information |
| --- | --- |
| MS Access | MDB File Name |
| MS SQL Server | Server Name |
|  | Database |
|  | User |
|  | Password |

Figure 8:
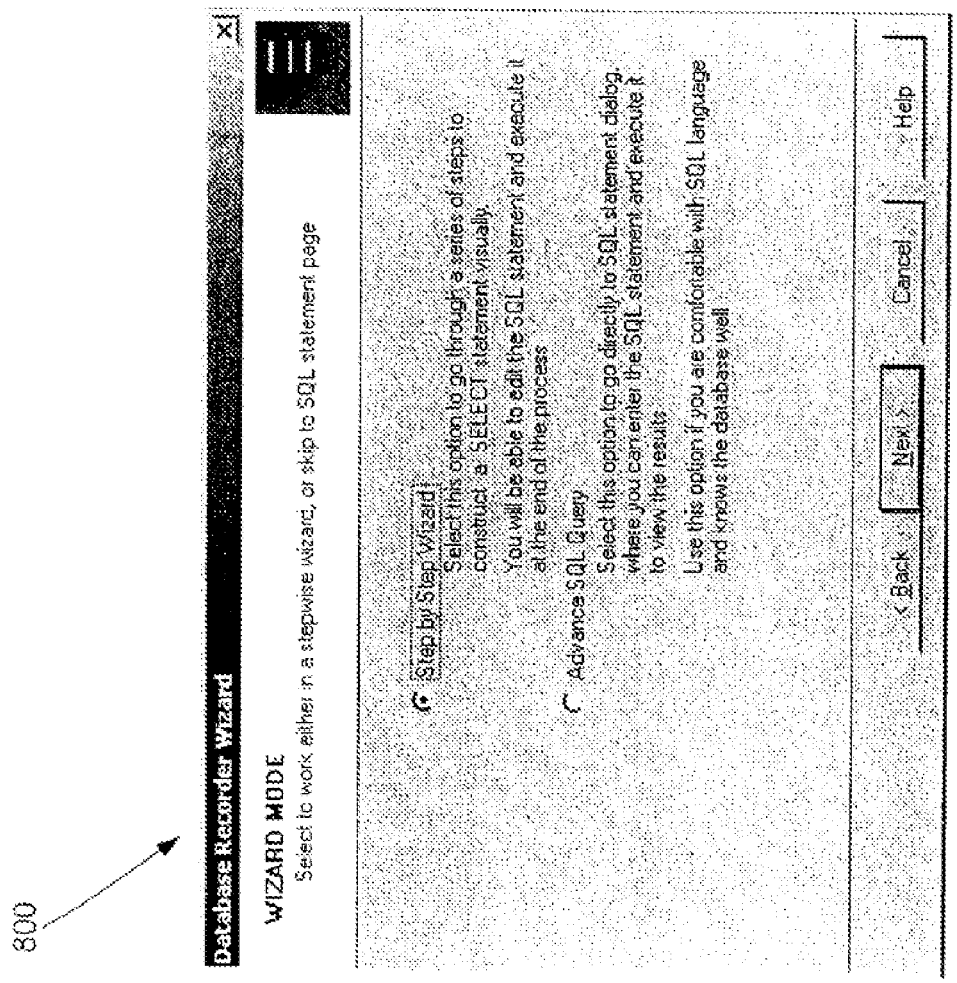
FIG. 8 is an illustration of a mode selection page of the database recorder wizard.

FIG. 8 is an illustration of a mode selection page 800 of the database recorder wizard. Using the connection information, the recorder has now actually established the connection with the database. The designer has a choice to create the SQL query in a step-by-step mode or directly go to Advanced Query mode to type in the query.

Figure 9:
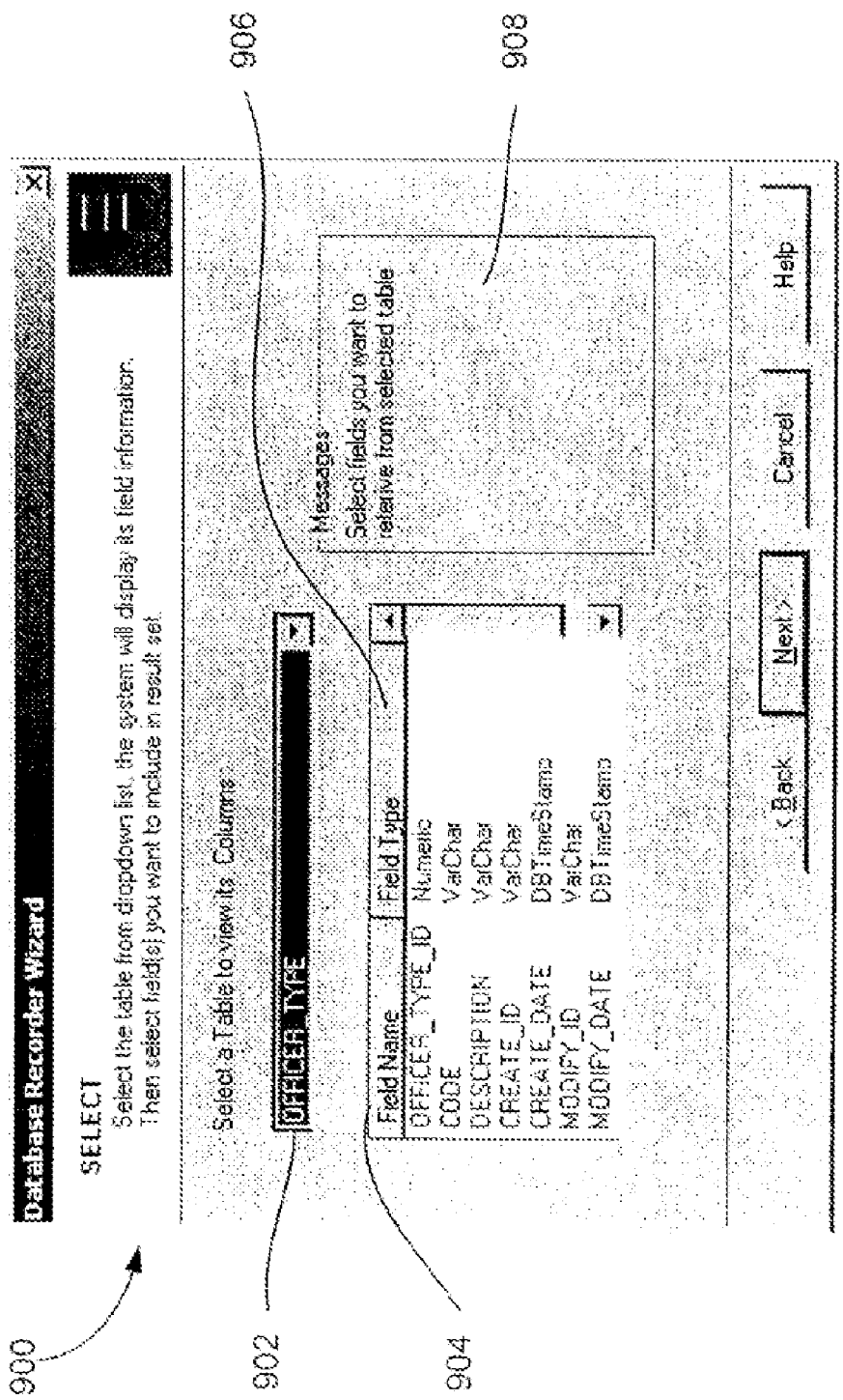
FIG. 9 depicts a table and field specification page of the database recorder wizard.

FIG. 9 depicts a table and field specification page 900 of the database recorder wizard. On this page, the wizard automatically displays the list of all tables of the database in the drop list. Selecting a table from the drop down menu 902 displays the fields/columns 904, 906 of that table along with the Field Type information. The designer can select multiple desired fields and proceed. Errors and prompts are shown in the messages area 908.

Figure 10:
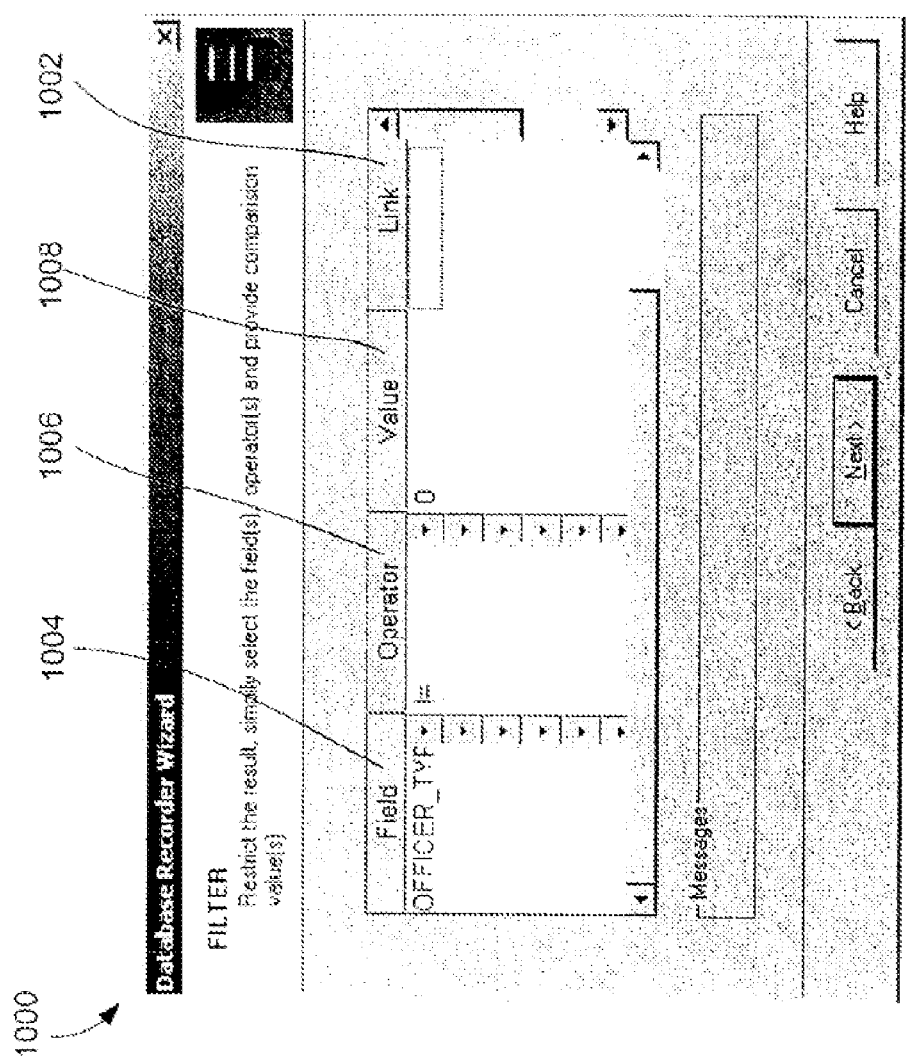
FIG. 10 shows a filter page of the database recorder wizard.

FIG. 10 shows a filter page 1000 of the database recorder wizard. From this page, the designer build the WHERE/Filter part of the SQL page. The filter is a list of conditions joined via the AND, OR link, entered in the link field 1002. Each condition consists of a field 1004, an operator 1006 and an operand value 1008.

Figure 11:
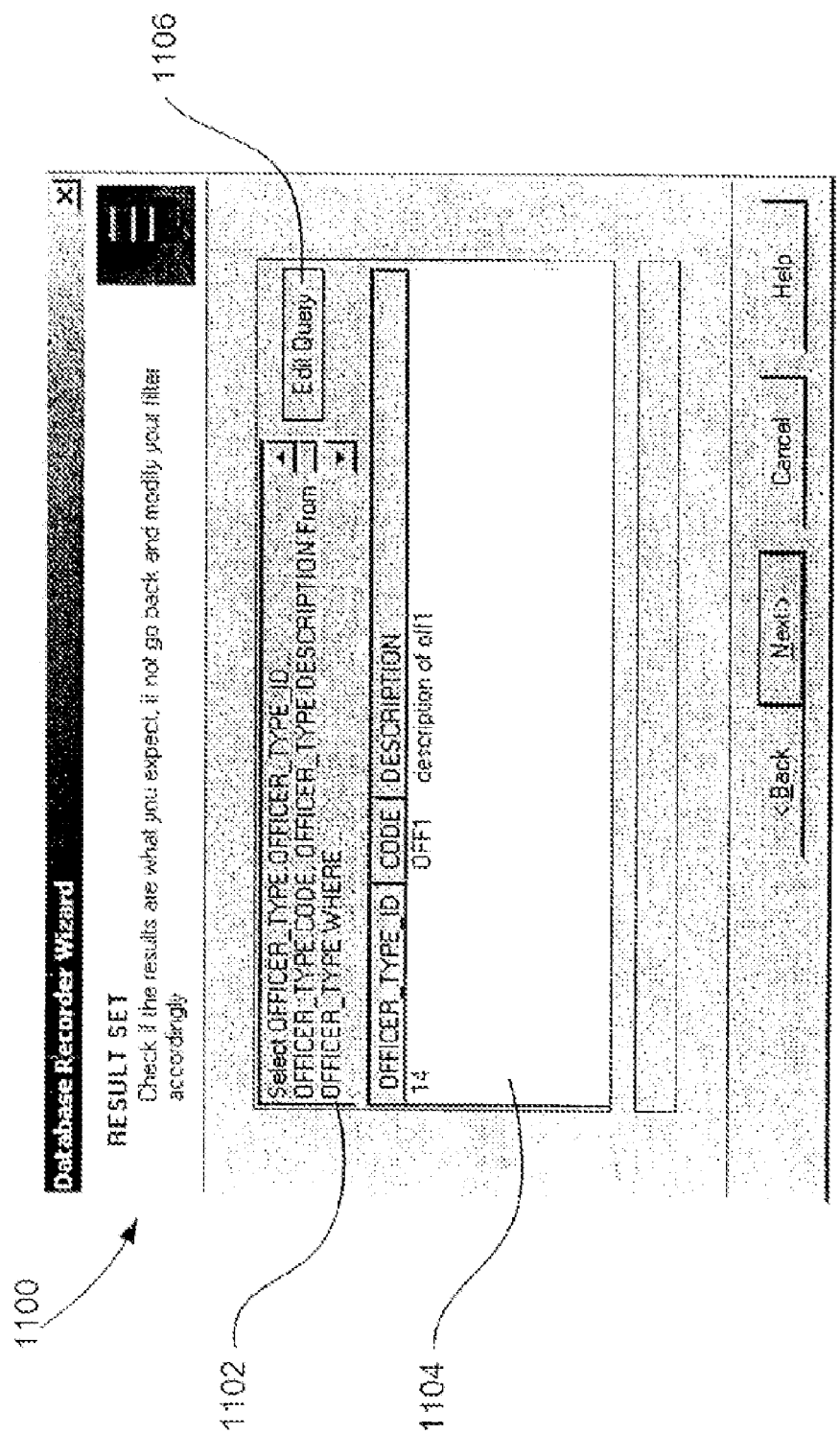
FIG. 11 is a depiction of a query results page of the database recorder wizard.

Finally, the results of the query that the designer has built so far are displayed in a query results page 1100 of the database recorder wizard, shown in FIG. 11. The upper edit box 1102 shows the query (initially read-only) and the lower grid 1104 shows the result set of the query execution. The designer can press the 'Edit Query' button 1106 to make the list editable (the button and after modifying the query changes to 'Execute Query') and after modifying the query can see the update results by pressing the 'Execute Query' button.

Figure 12:
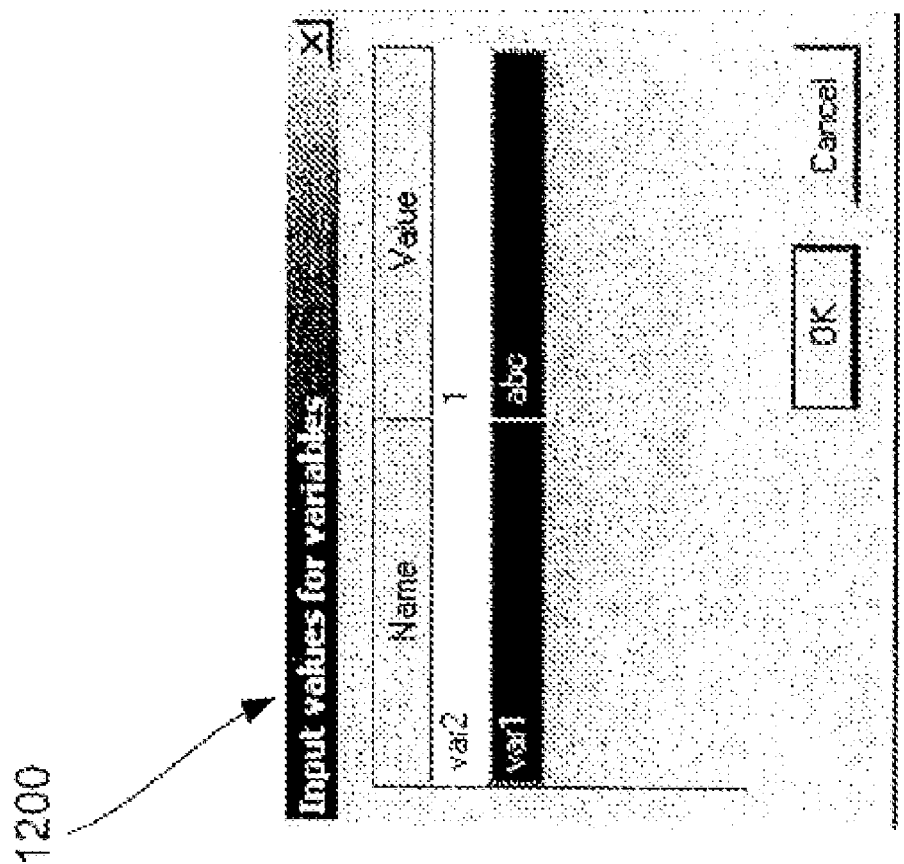
FIG. 12 is a drawing of the query page of the database recorder wizard.

When the query box is editable, the designer has the option to use variables to generalize the query. This can be achieved by pressing [Ctrl]+Space key combination resulting in a pop-up menu that enables the designer to choose from a list of variables, which can have been created using the Data Explorer. Choosing a variable inserts a '$$' enclosed string with the variable name; hence the designer can create a query by concatenating literal sub-strings and variable placeholders. Now when the designer presses the 'Execute Query' button, the wizard displays a pop-up dialog 1200 to get an input of the immediate values to be used for the variables (FIG. 12, which is a drawing of the query page of the database recorder wizard). These values are substituted to make the executable query. The results and messages are displayed as usual.

Figure 13:
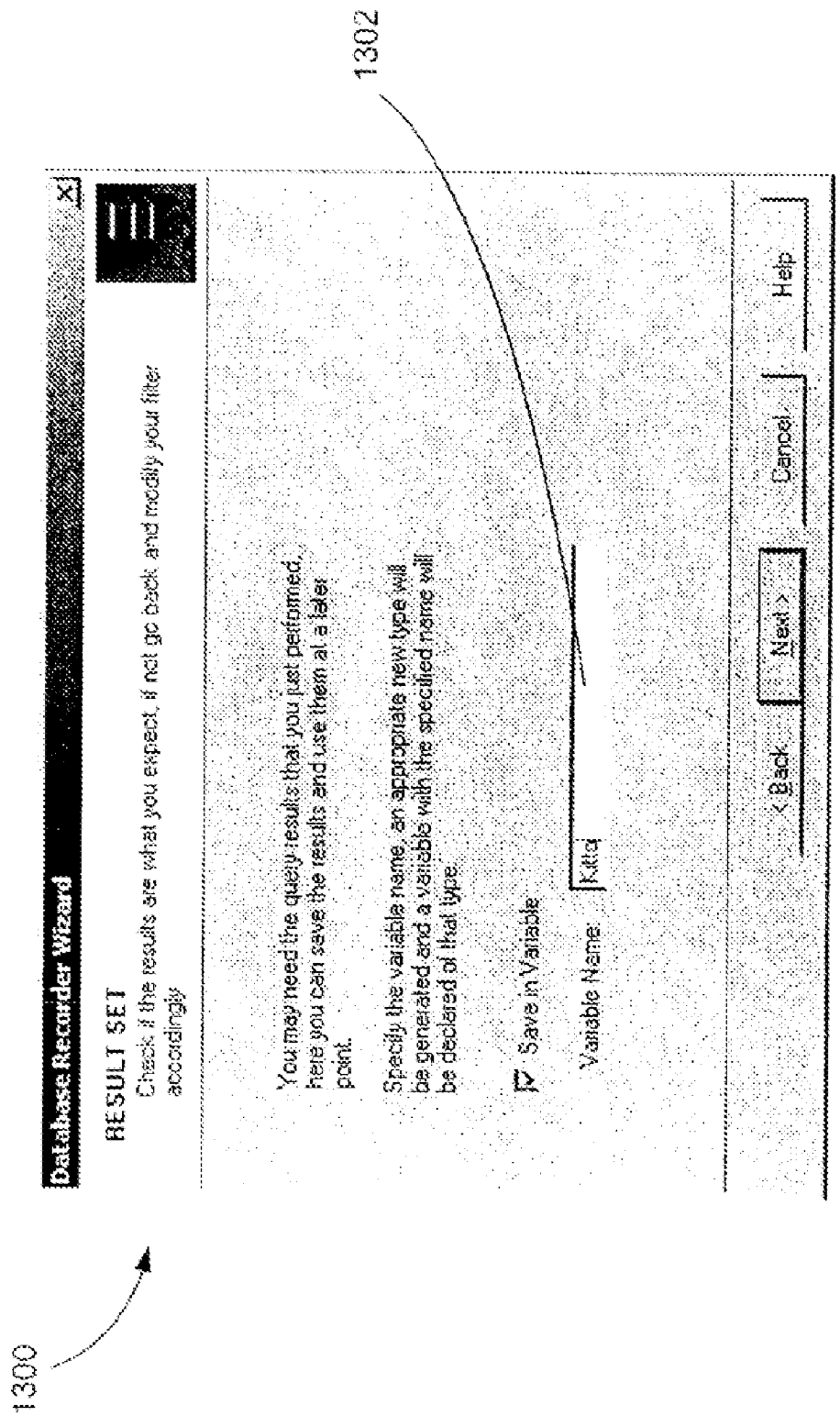
FIG. 13 depicts a specify result set variable page of the database recorder wizard.

Eventually when the designer accepts the query, the results of the query can optionally be stored in a variable. FIG. 13 depicts a specify result set variable page 1300 of the database recorder wizard. The designer in this case can specify the name of the variable in the Variable Name field 1302, which is automatically created as an array of a (new) user defined type having the same structure as a row of the table result.

Figure 14:
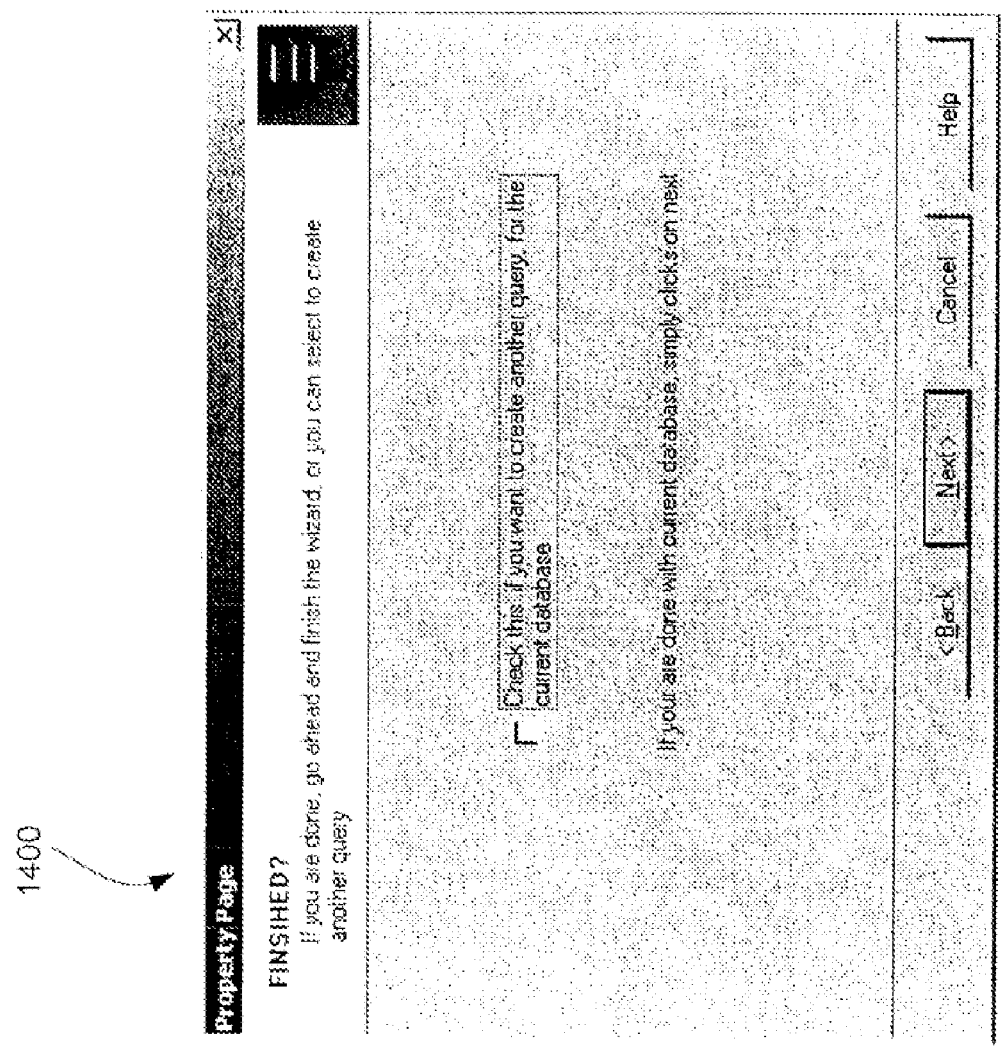
FIG. 14 is an illustration of a loop back page of the database recorder wizard.

FIG. 14 is an illustration of a loop back page 1400 of the database recorder wizard. The designer is now done with one query and may choose to end the wizard or do another query which takes the wizard back to the 'Table Selection Page.'

Figure 15:
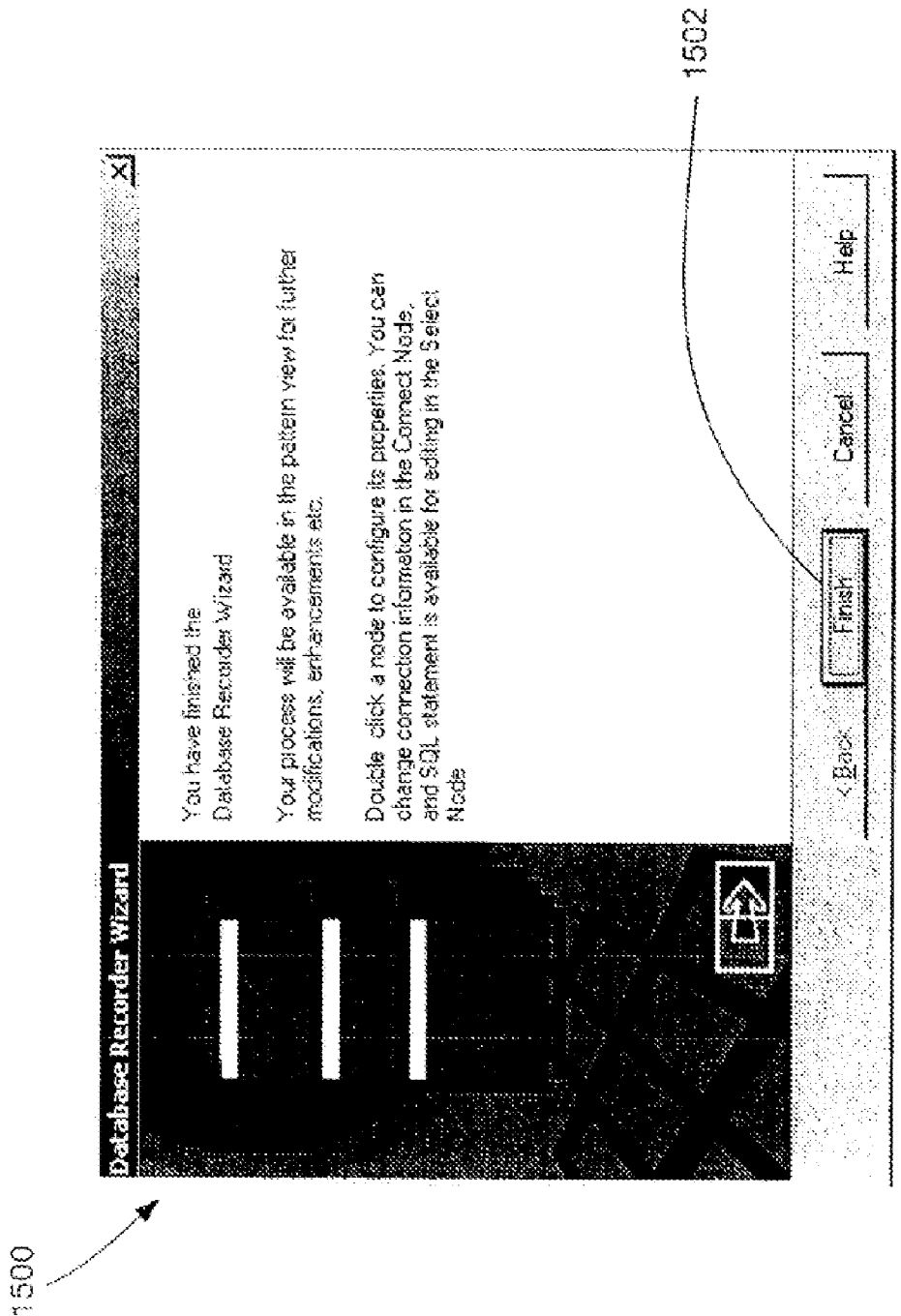
FIG. 15 depicts a finish page of the database recorder wizard reached once the designer has completed recording.
Figure 16:
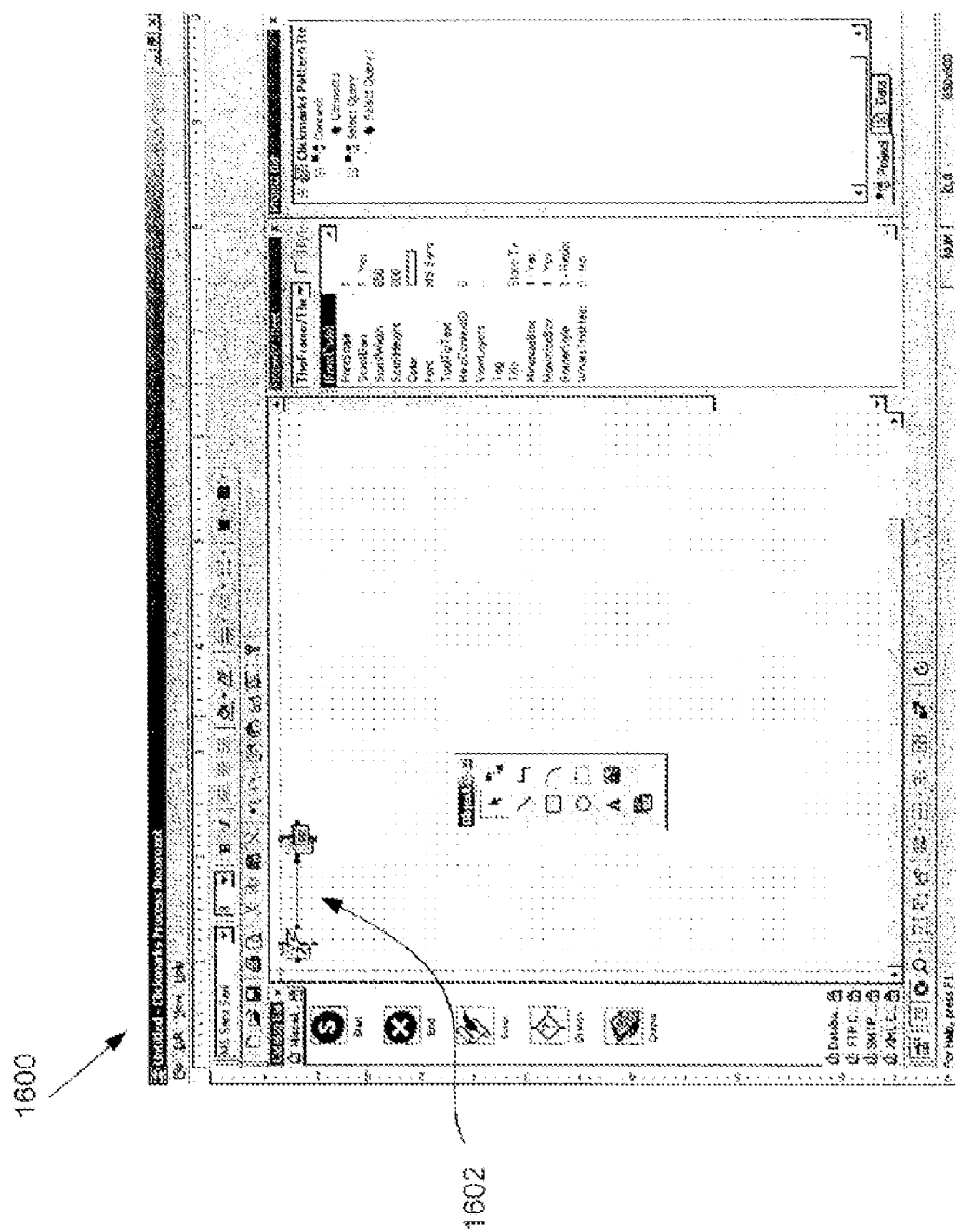
FIG. 16 shows the recorded pattern in a Pattern View.

FIG. 15 depicts a finish page 1500 of the database recorder wizard reached once the designer has completed recording. Selecting the Finish button 1502 ends the wizard and transfers the recorded pattern 1602 into the Pattern View 1600 as shown in FIG. 16.

In a typical usage of this connector the designer enters into a session recording mode, provides the connection information in a dialog and interactively constructs a query. There is a possibility of executing a series of queries (for both reading and/or writing data). The sequences of statements are executed as a batch and may have allowance for specifying transactional semantics. When the designer is enhancing the process while in the Pattern view, the SQL statements associated with an interaction can be fine-tuned and customized, and session and user variables can be used to provide and store values. The SQL specified as well as the connection parameters, etc. can be saved in an XML based pattern description specific to the database connector.

The result set returned by the query executed (whether read or write) is displayed in a grid with the columns representing the query column names.

Interaction of Workplace with Data Management View

The Database Connector interacts in a manner very similar to the XML Connector. The results grid displayed at the end can be converted into an m×n string array and the Data Management View then used to rename and/or modify the variable.

FTP Connector Workplace

Figure 17:
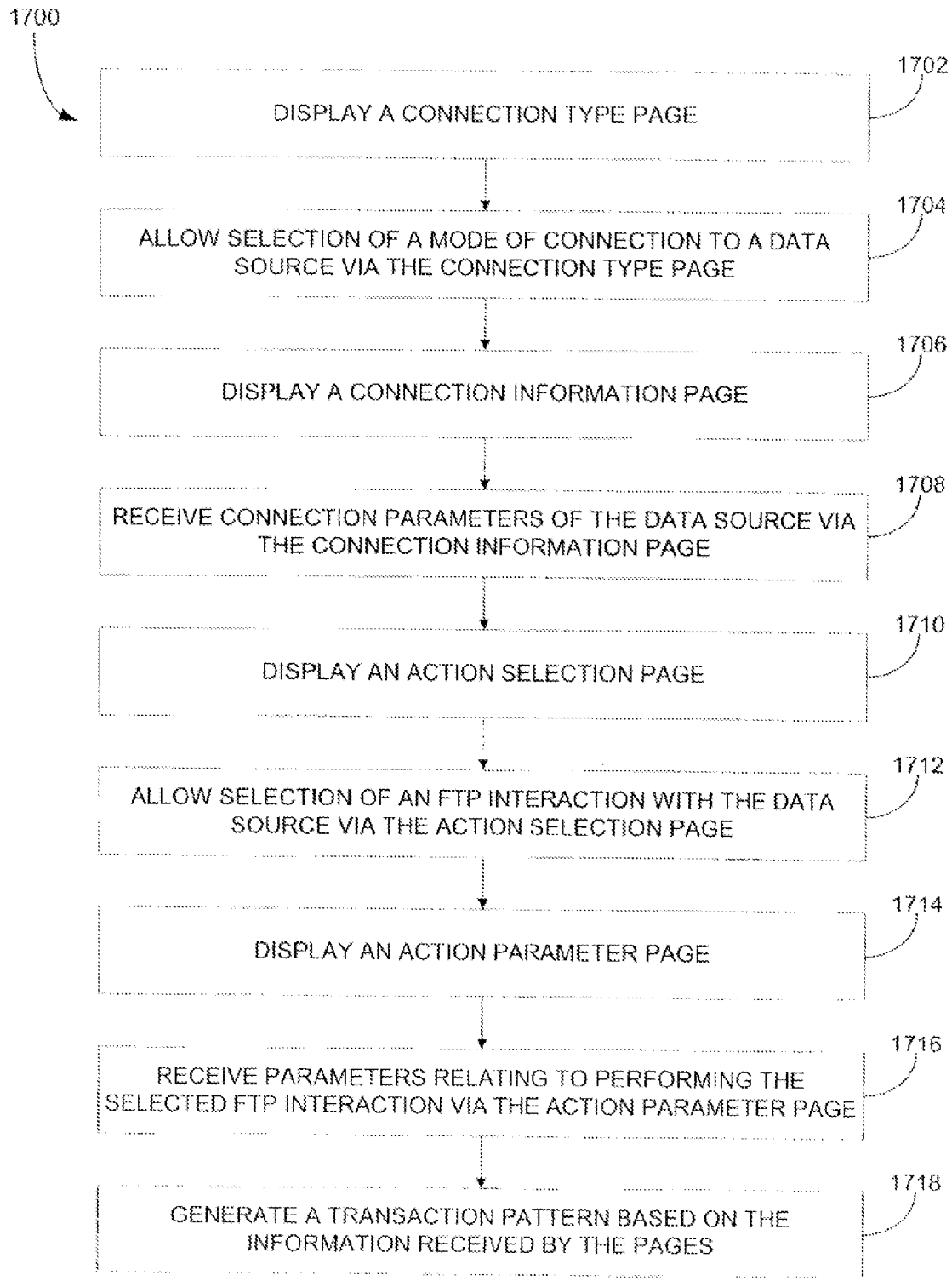
FIG. 17 depicts a method for recording a File Transfer Protocol (FTP) interaction according to an embodiment.

FIG. 17 depicts a method 1700 for recording a File Transfer Protocol (FTP) interaction according to a embodiment. In operation 1702, a connection type page is displayed. In operation 1704, the connection type page allows selection of a mode of connection to a data source. A connection information page is displayed in operation 1706. Connection parameters of the data source such as host name, user name, password and email, are received in operation 1708 via the connection information page. An action selection page is displayed in operation 1710, which, in operation 1712, allows selection of an FTP interaction with the data source. An action parameter page is displayed in operation 1714. Parameters relating to performing the selected FTP interaction are received in operation 1716 via the action parameter page. In operation 1718, a transaction pattern is generated based on the information received by the pages.

According to one embodiment, an FTP Recorder Wizard provides the designer with the ability for incoming and outgoing FTP requests. The FTP Recorder Wizard gives the designer the ability to specify the ftp site to which the request is to be sent, login and password information, and the ability to select files to be uploaded or downloaded and their location on a local and remote server.

The results of the recorder session are represented as an XML pattern which corresponds to ftp commands.

Figure 18:
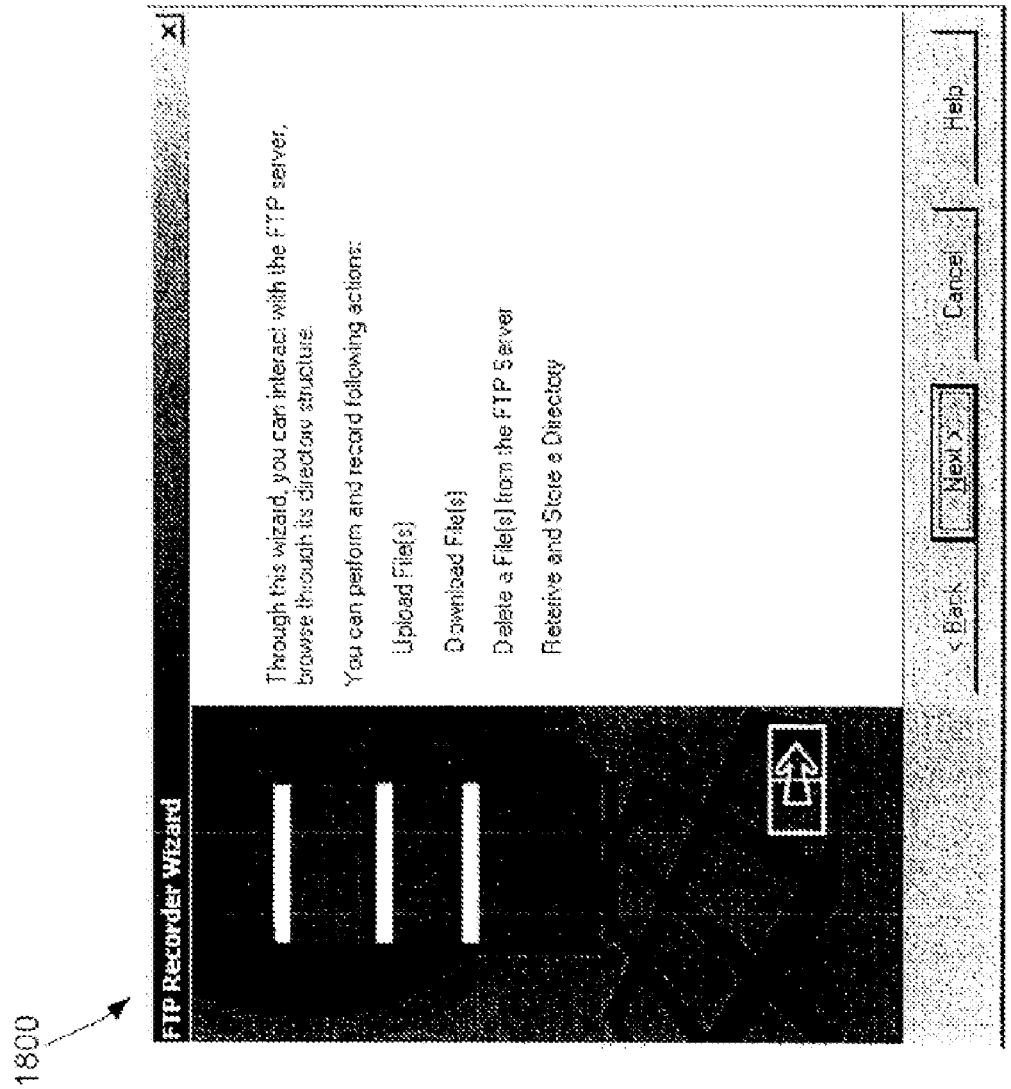
FIG. 18 illustrates a welcome page of the FTP recorder wizard.

The following discussion describes an illustrative embodiment of the FTP Workplace, which is preferably a wizard that guides the designer step-by-step to specify the connection information and later record one or more of the following, or other, actions:

File Upload
File Download
Retrieve Directory Listing
Delete Files on Remote Server The designer can loop in the wizard pages to record multiple actions with the same server. Each screen is described below:

FIG. 18 illustrates a welcome page 1800 of the FTP recorder wizard. This page briefs the user about the actions he or she can record using this wizard.

Figure 19:
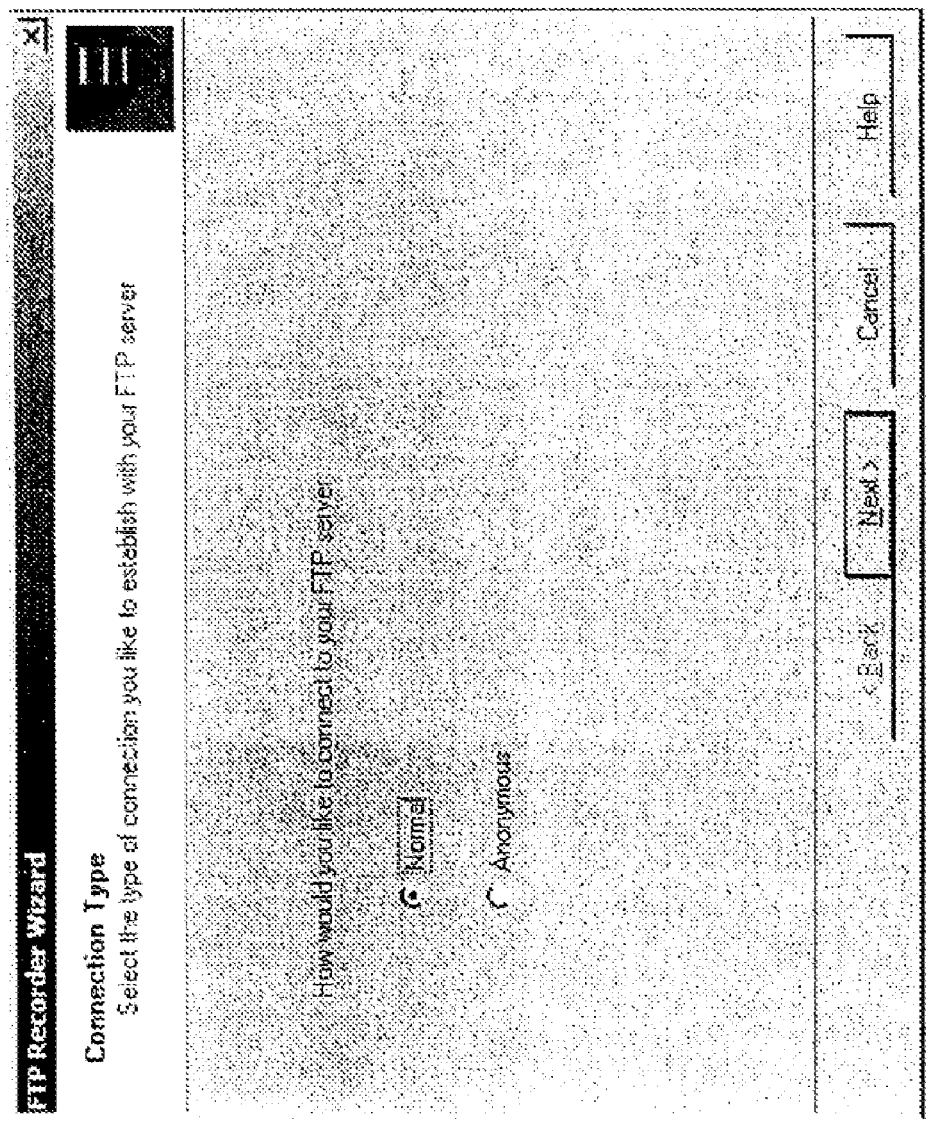
FIG. 19 illustrates a connection type page of the FTP recorder wizard.

FIG. 19 illustrates a connection type page 1900 of the FTP recorder wizard. This page allows the user to select his or her connection mode with the FTP server. A user can connect to a server either anonymously and/or by providing a username/password pair, according to one embodiment. The selection determines which fields are active on the connection information page, as shown in Table 4.

TABLE 4

| Type of Connection | Disabled fields |
|---|---|
| Anonymous | Password |
| Normal | Email |

Figure 20:
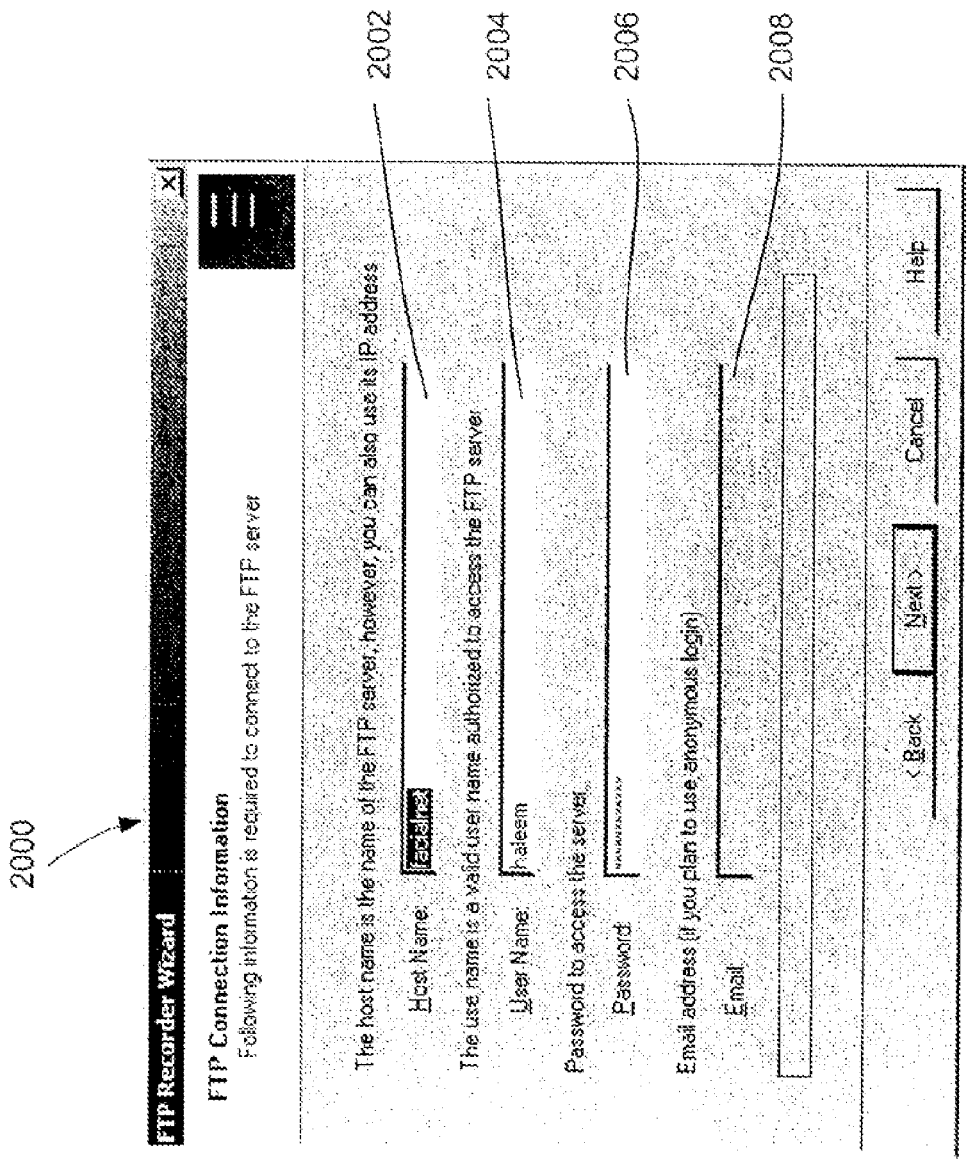
FIG. 20 illustrates a connection information page of the FTP recorder wizard.

FIG. 20 illustrates a connection information page 2000 of the FTP recorder wizard. This page allows the user to define FTP connection parameters fields, including fields for host name 2002, user name 2004, password 2006, and email 2006. These fields are described in Table 5.

TABLE 5

| Field name | Type | Mandatory/ Optional | Description |
| --- | --- | --- | --- |
| Host Name | String | Mandatory | IP address or host name. |
| User Name | String | Mandatory | User's account name for the FTP server |
| Password | String (Masked) | Mandatory for Normal mode | User's account password for FTP server |
| Email | String | Mandatory for Anonymous mode | Email address to be provided to the FTP server |

A static text, surrounded by a group box is present where all the messages are displayed. As an option, the suer can be forced to provide all the required fields for a given mode, before he is allowed to move to the next page.

Figure 21:
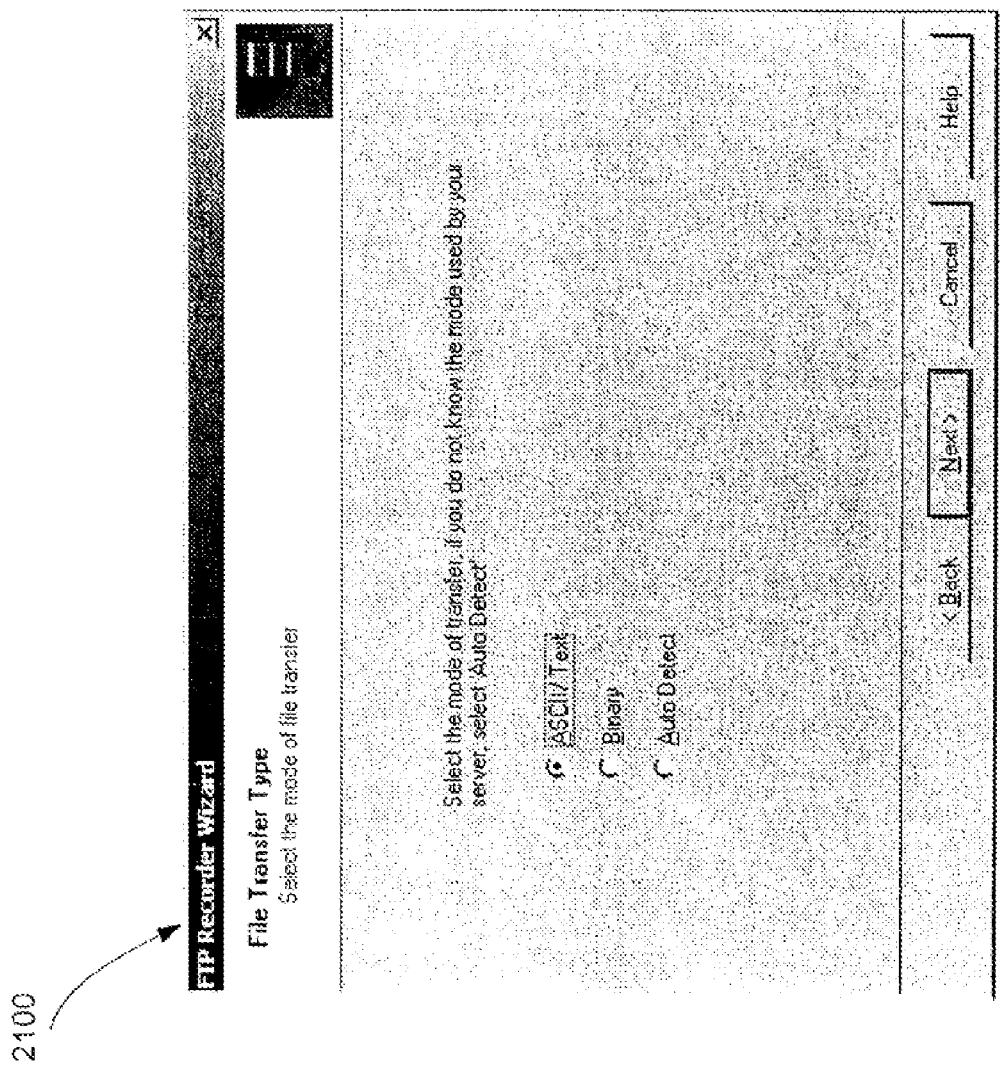
FIG. 21 depicts a transfer mode selection page of the FTP recorder wizard.

FIG. 21 depicts a transfer mode selection page 2100 of the FTP recorder wizard. This page allows user to select the data transfer mode. The application uses a mode (Text/Binary for example) to transfer data to and from the server, and if the specified server does not support that mode, an error message is shown to the user. If the user selects the 'Auto Detect' mode, the application can attempt to detect an appropriate mode.

Figure 22:
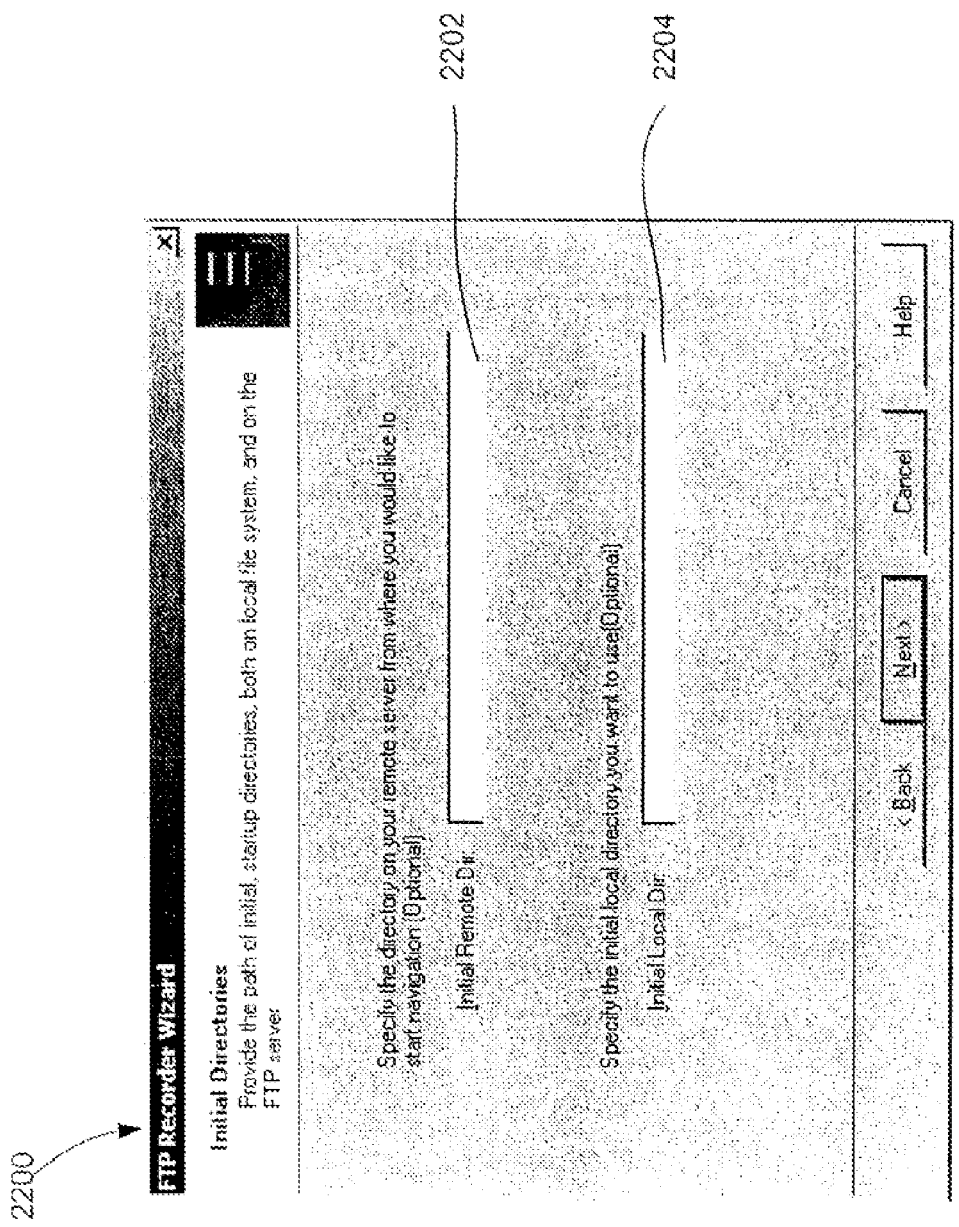
FIG. 22 is a drawing of an initial directory setting page of the FTP recorder wizard.

FIG. 22 is a drawing of an initial directory setting page 2200 of the FTP recorder wizard. This page allows user to provide the initial starting directory for the server and/or the local file system by entering path information in the associated field 2202, 2204.

Figure 23:
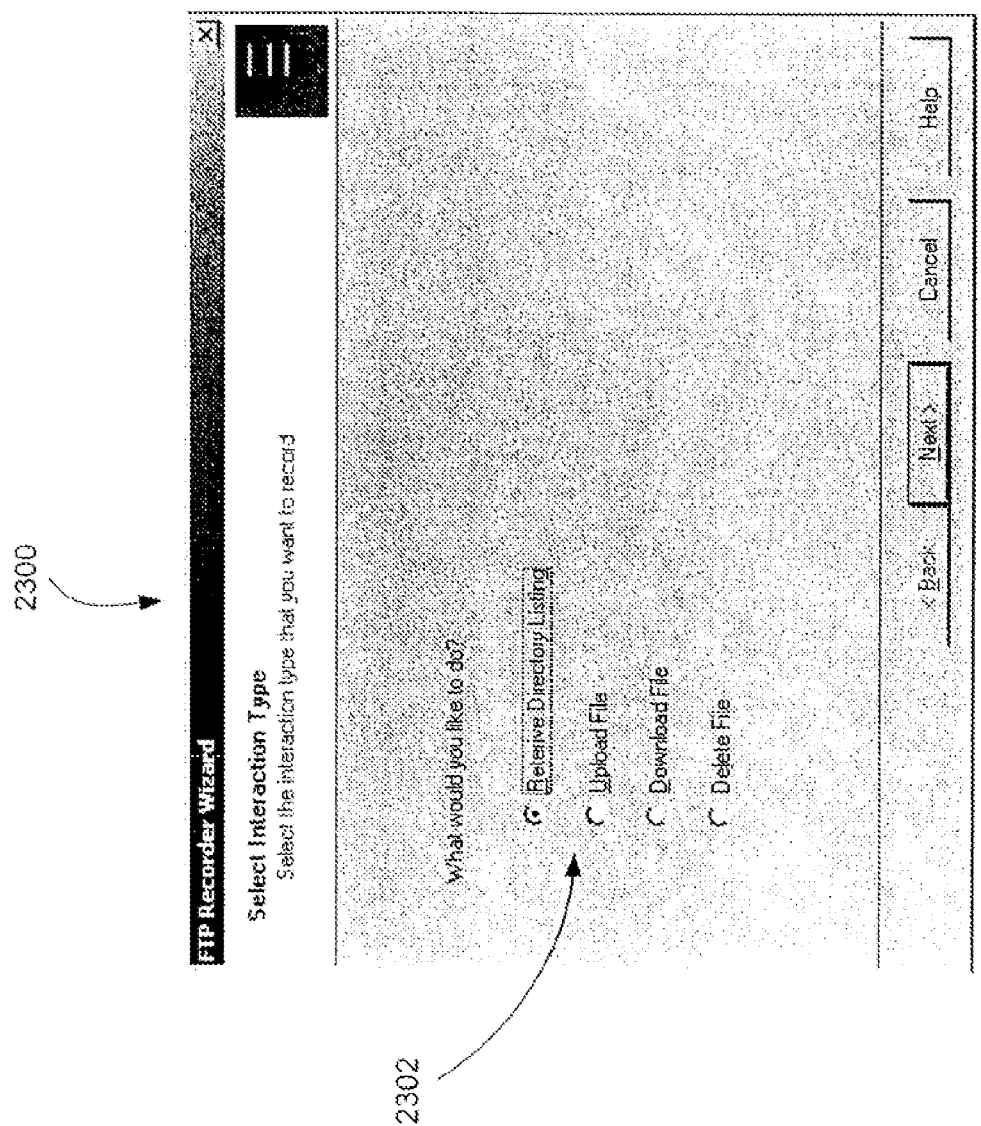
FIG. 23 illustrates an action selection page of the FTP recorder wizard.

FIG. 23 illustrates an action selection page 2300 of the FTP recorder wizard. This page enables the user to select a specific FTP command/process 2302 that he or she wants to record. Such commands and processes can include retrieving a directory listing, uploading a file, downloading a file, and deleting a file, among others. The following flow of the wizard is dependent on this selection.

Retrieve Directory

FIGS. 24-27 illustrate a wizard process for retrieving a directory listing.

Figure 24:
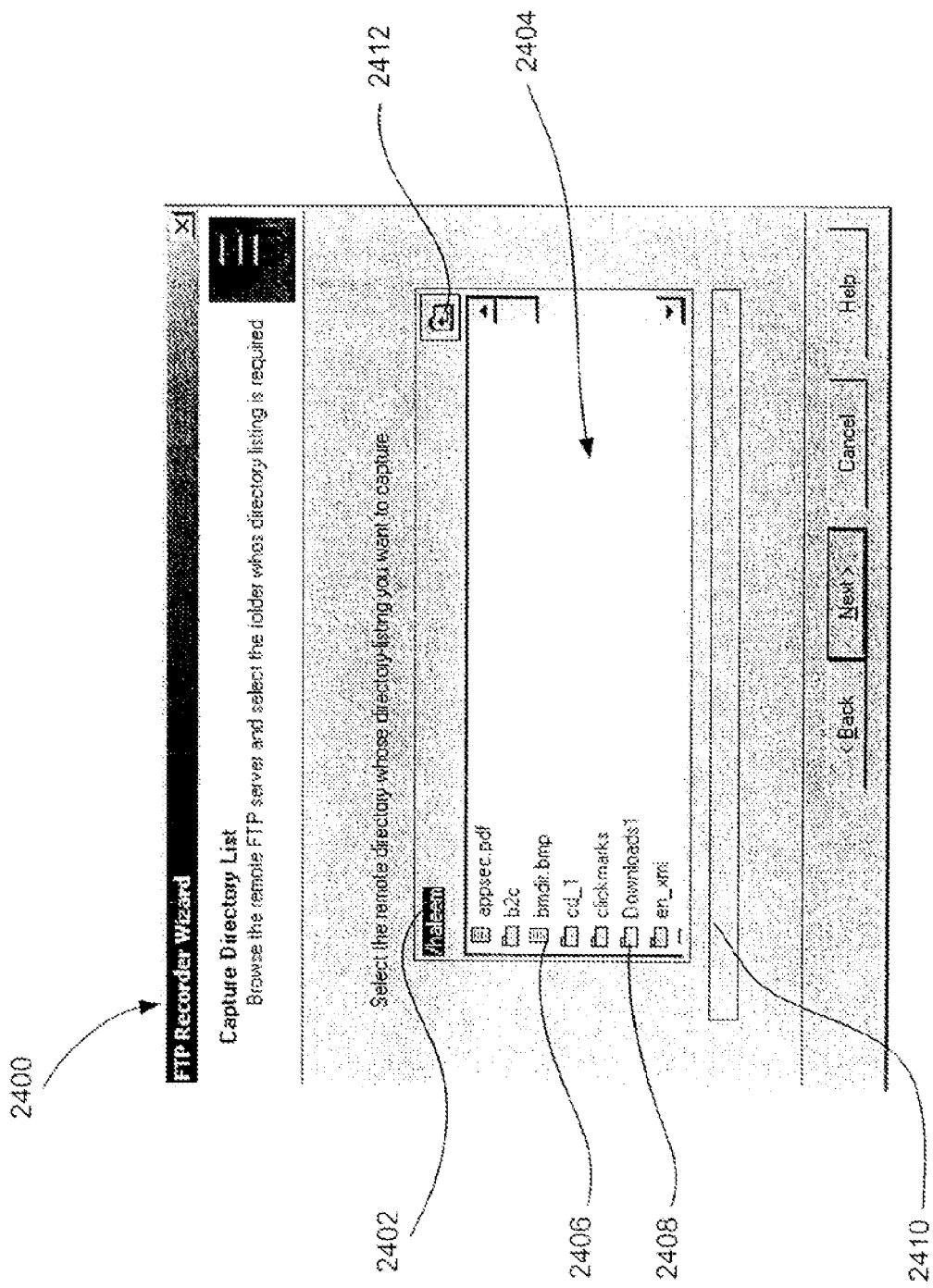
FIG. 24 depicts a directory listing retrieval page of the FTP recorder wizard.

FIG. 24 depicts a directory listing retrieval page 2400 of the FTP recorder wizard. This page allows the user to navigate through the FTP server's directory structure. Several controls are present on this page, including a read only edit box 2402 that displays the directory name (on the FTP server) whose contents are currently being displayed in the list area 2404. The list area displays the list of items in the current directory. A file type content can be marked with one type of icon 2406 and a sub directory can be marked with another type of icon 2408. A group box 2410 displays any messages and error strings. An icon 2412 can also be provided for navigating to a parent directory of the current directory shown in the edit box.

Figure 25:
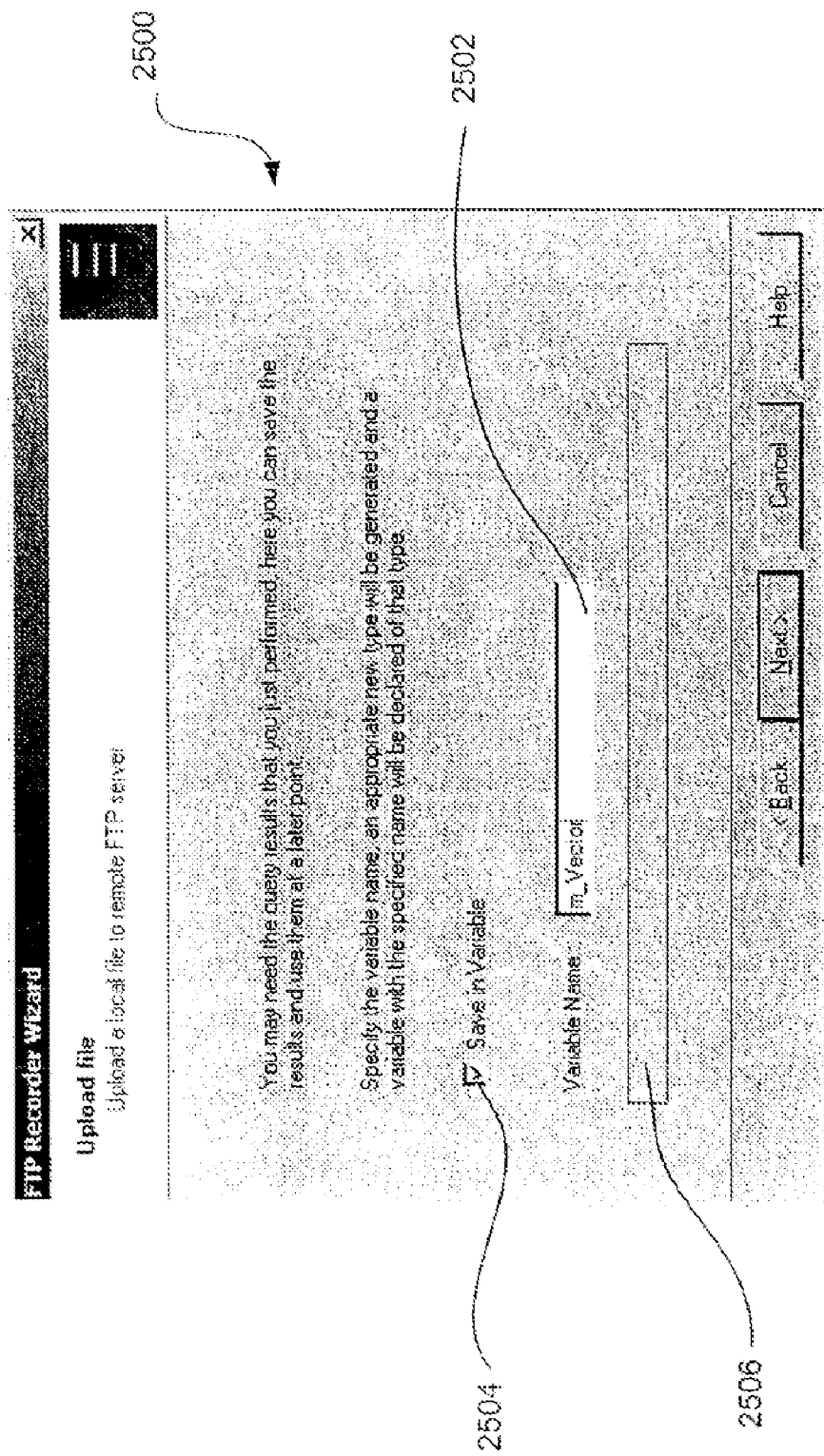
FIG. 25 is an illustration of a variable definition page of the FTP recorder wizard.

FIG. 25 is an illustration of a variable definition page 2500 of the FTP recorder wizard. Through this page, a user can define a variable in which the result of a variable in the Variable Name field 2502 and toggling a check box 2504. One type of variable is a DIRLISTING type variable. Error messages can be displayed in a message box 2506.

Figure 26:
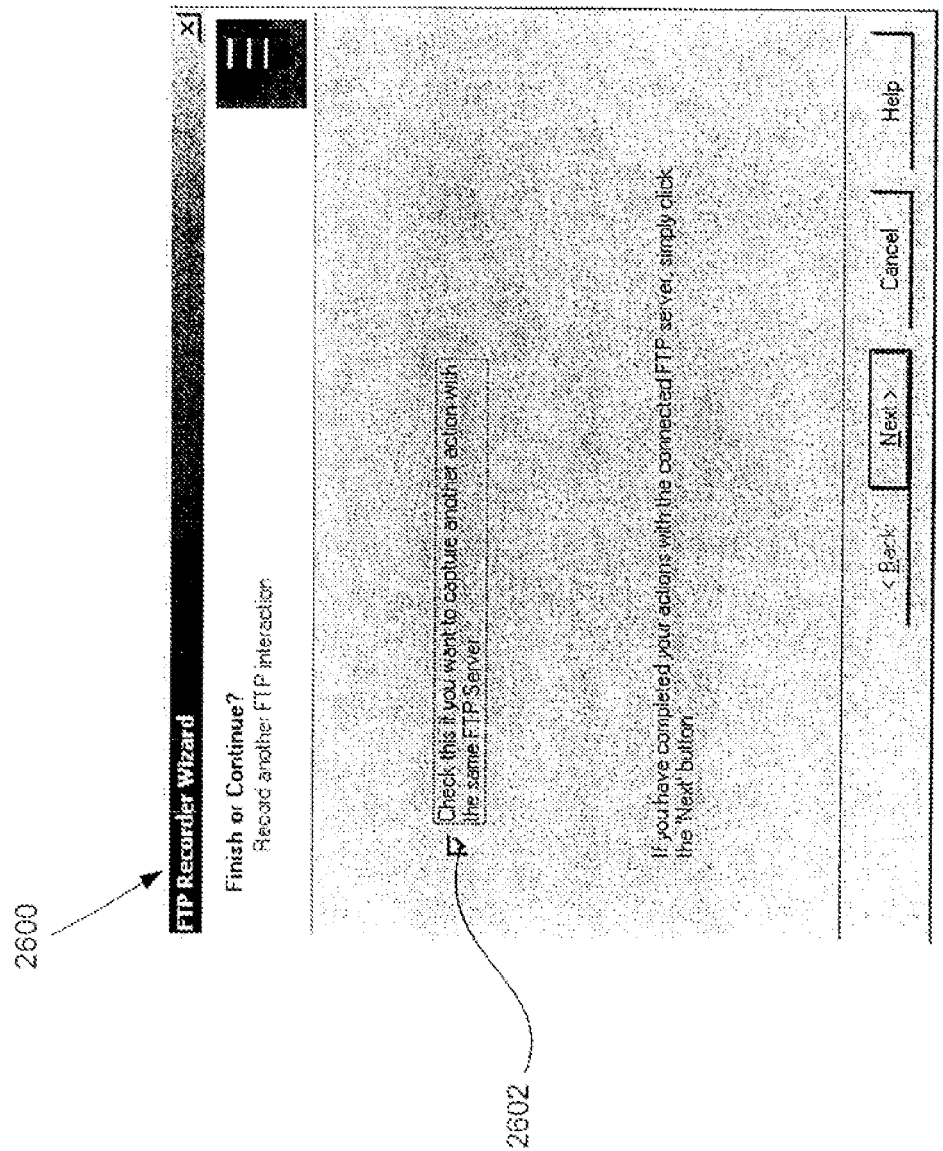
FIG. 26 depicts a loop back page of the FTP recorder wizard.

FIG. 26 depicts a loop back page 2600 of the FTP recorder wizard, which allows a user to record multiple actions by allowing the user to loop back to the action selection page shown in FIG. 23 by toggling the check box 2602.

Figure 27:
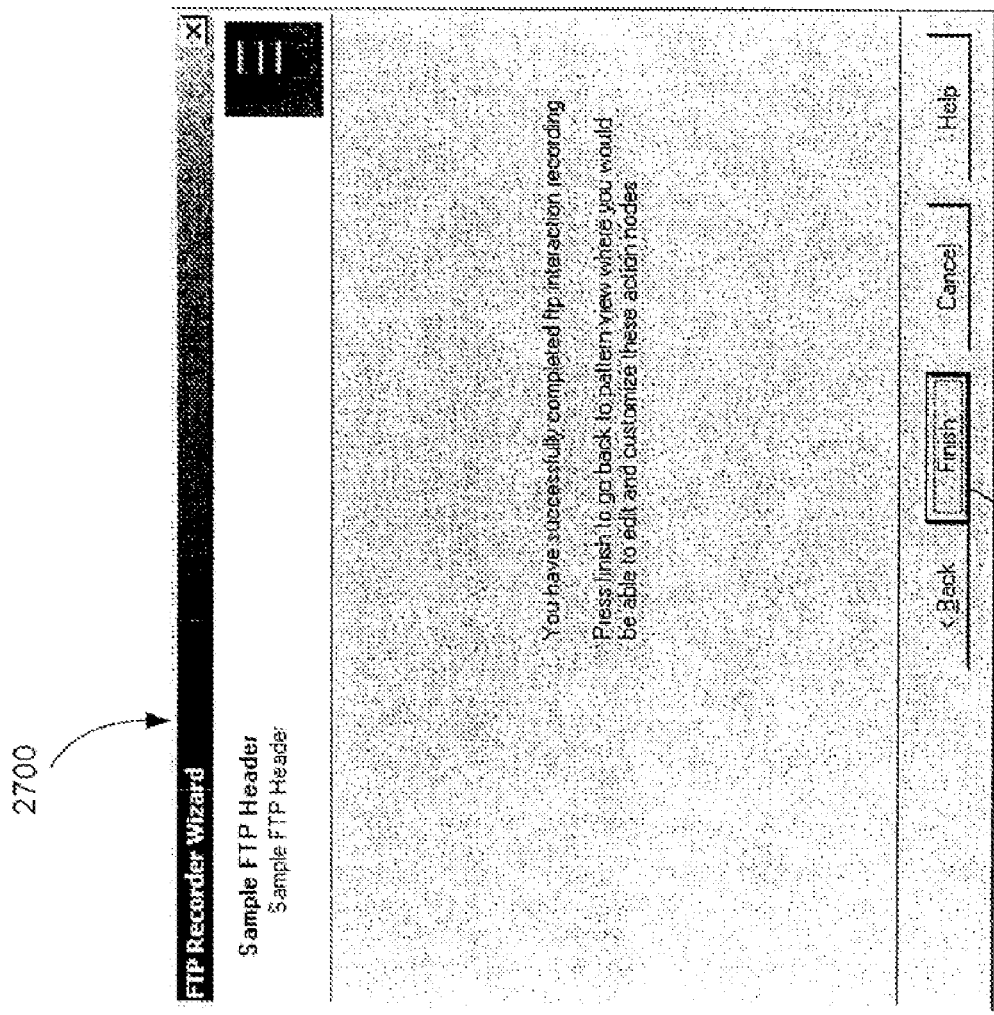
FIG. 27 is a depiction of a wizard completion page of the FTP recorder wizard.

FIG. 27 is a depiction of a wizard completion page 2700 of the FTP recorder wizard. This page announces the completion of the recording process. Upon selection of the Finish button 2702, the user is returned to the pattern view.

File Upload Recording

Figure 28:
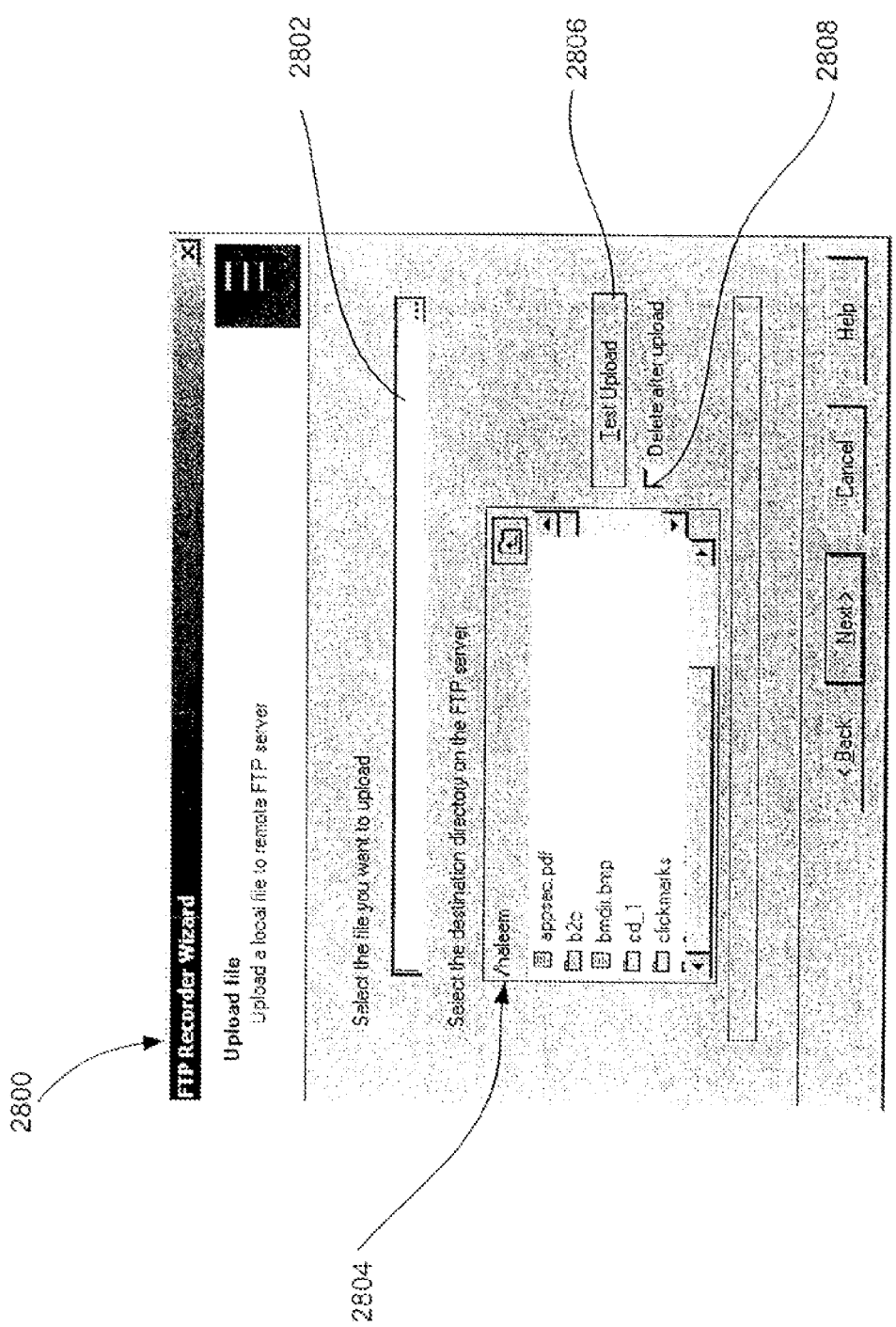
FIG. 28 shows a file upload page of the FTP recorder wizard.

FIG. 28 shows a file upload page 2800 of the FTP recorder wizard. This page allows a user to specify a file to be uploaded to a remote FTP server by entering it's name and path in the file name field 2802. The destination directory is specified in an edit box 2804. The user can optionally test the upload by pressing the Test Upload button 2806. Further, the user can instruct the application to delete the uploaded file by checking the Delete after upload check box 2808. However, this operation can be dependent upon the rights the user has on the FTP server.

File Download Recording

Figure 29:
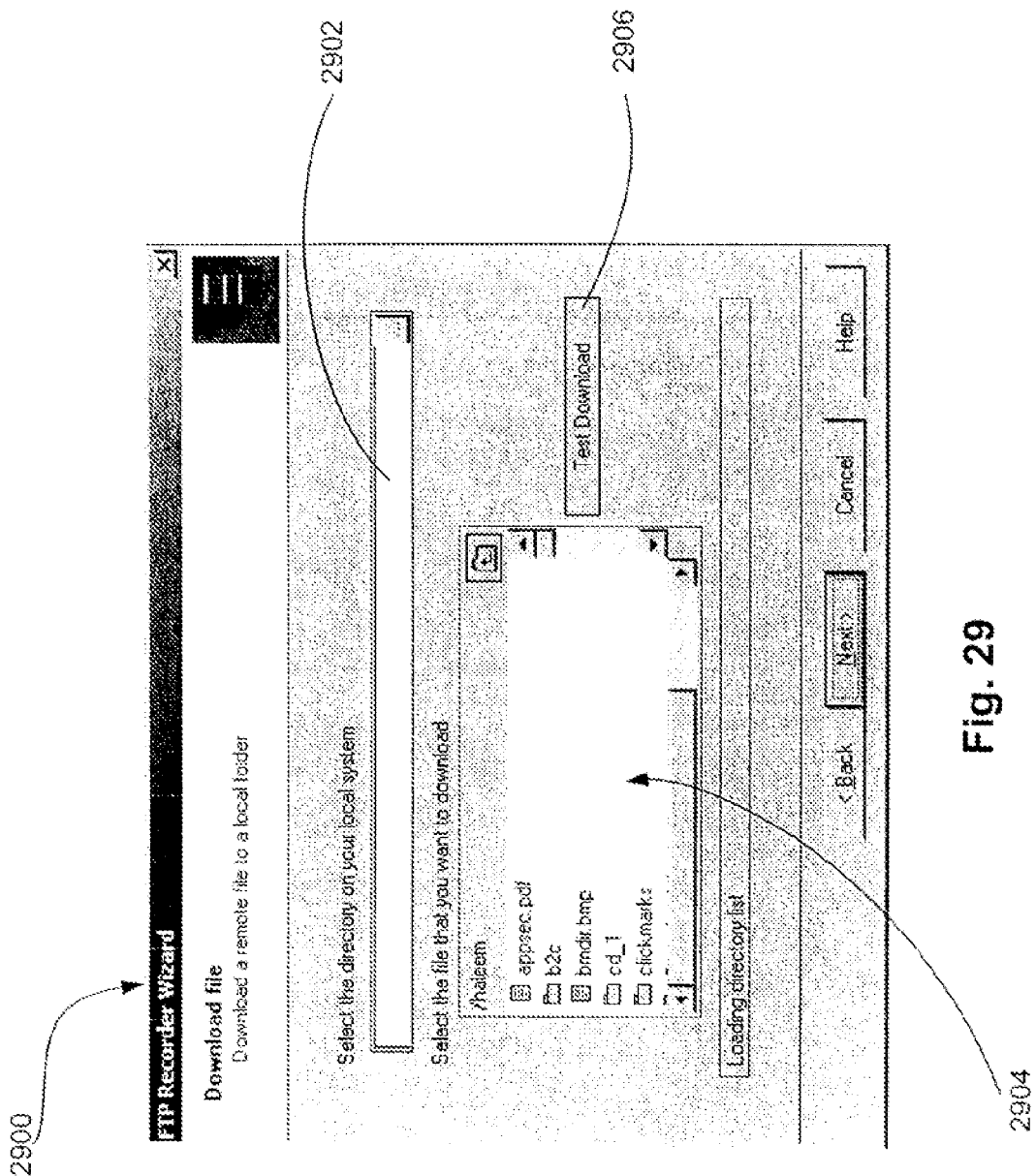
FIG. 29 shows a filed download page of the FTP recorder wizard.

FIG. 29 shows a file download page 2900 of the FTP recorder wizard. This page permits a user to specify a file to be downloaded from a remote site/application/database to a local device. The destination of the data is specified in the destination field 2902. The file to download from the remote site is selected from the file list 2904. As an option, the user can test the download by pressing the Test Download button 2906.

Delete File Process Recording

Figure 30:
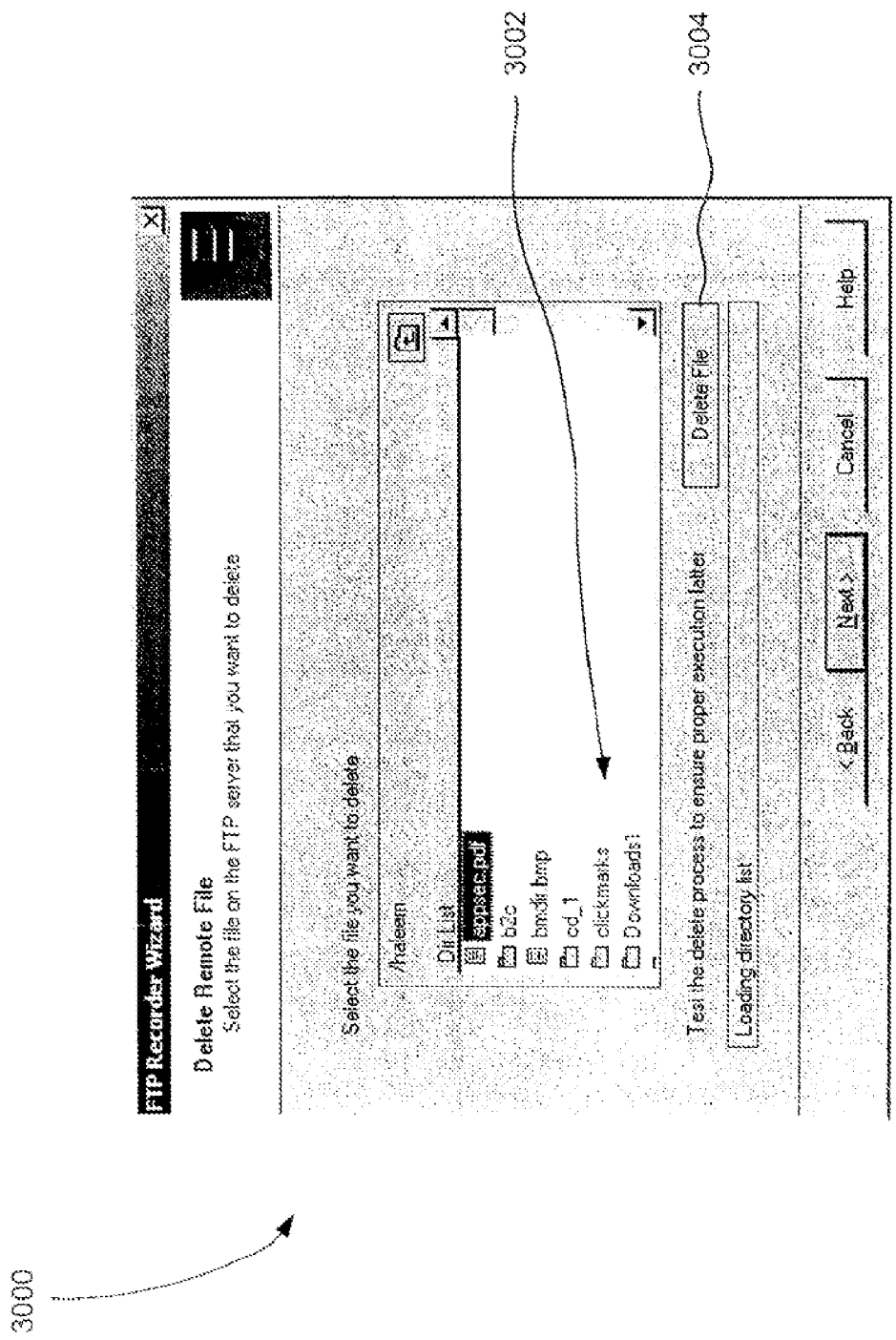
FIG. 30 shows a file deletion page of the FTP recorder wizard.

FIG. 30 shows a file deletion page 3000 of the FTP recorder wizard. This page allows a user to specify a file for deletion from a file list 3002. The user can test the delete process by selecting the Delete File button 3004.

FTP Application View

Figure 31:
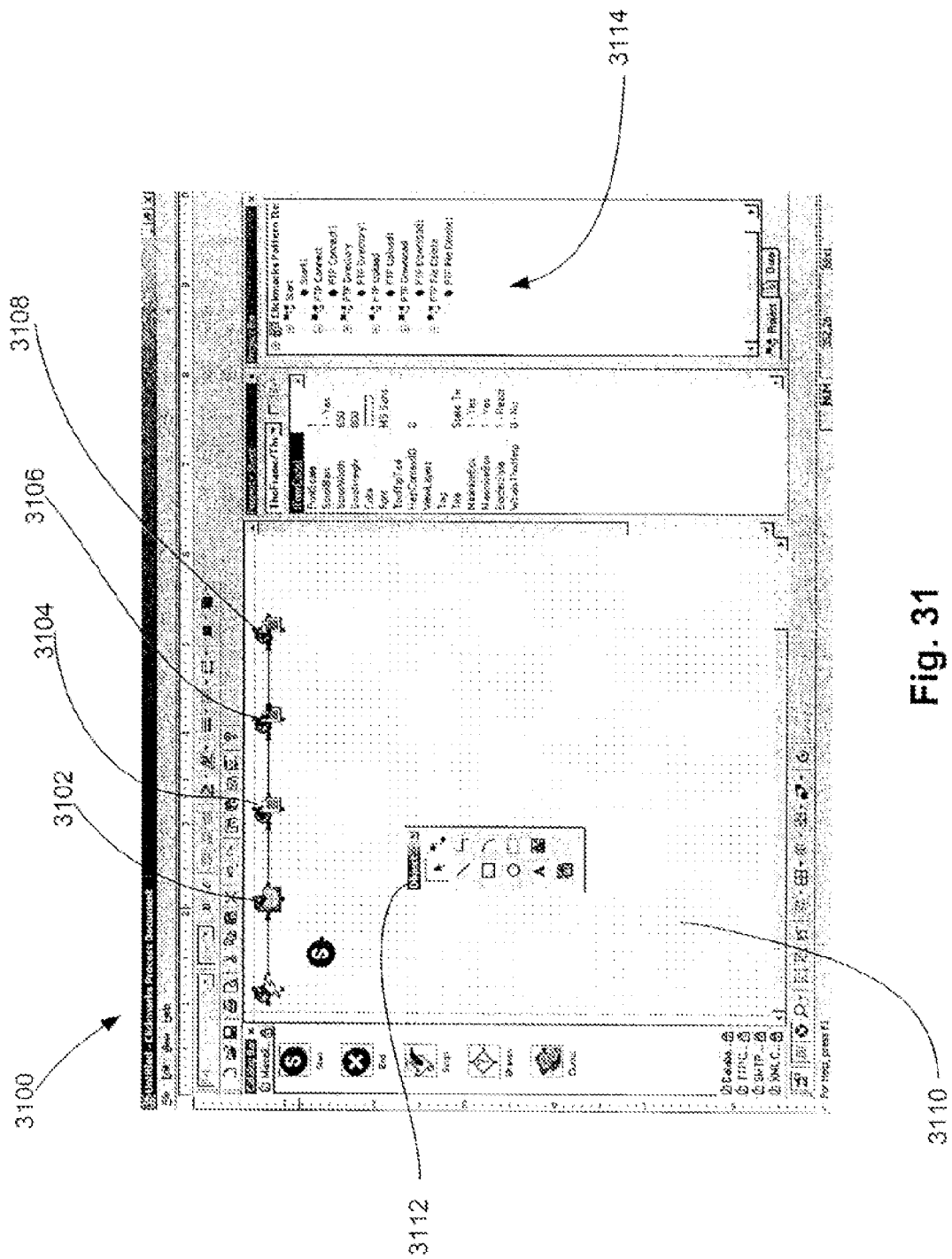
FIG. 31 depicts the application view after the FTP recording wizard has run the exemplary processes of FIGS. 18-30.

FIG. 31 depicts the application view after the FTP recording wizard has run the exemplary processes of FIGS. 18-29. As shown, nodes 3102, 3014, 3106, 3108 for each FTP connection recorded appear in the pattern view 3110. These nodes can then be connected in flowchart form to create a pattern using object connectors from the Object Connector window 3112. The FTP connections also appear in the Data Explorer tree 3114.

SMTP Connector Workplace

Figure 32:
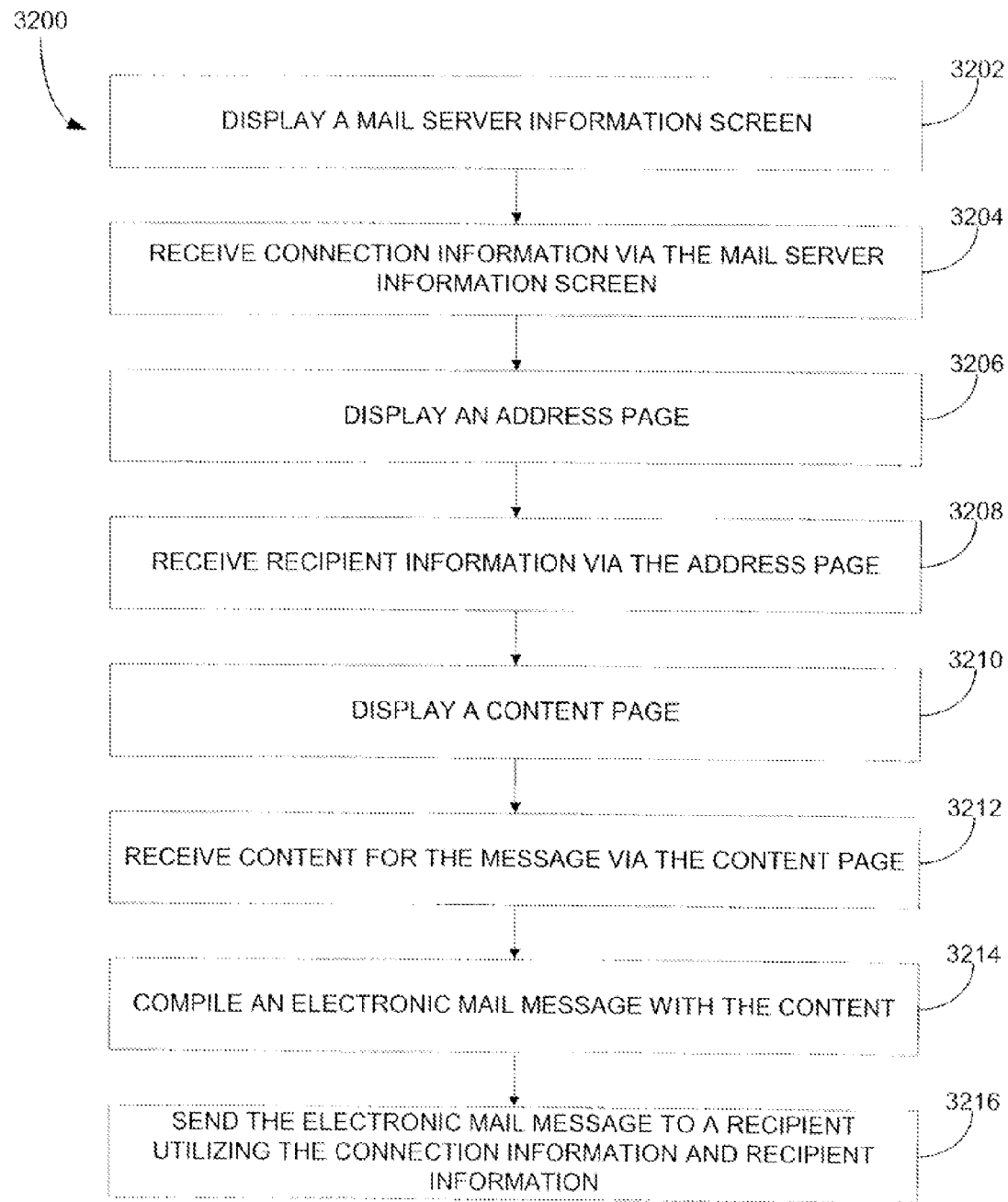
FIG. 32 is a flow diagram of a process for generating a template for an electronic mail message according to an embodiment.

FIG. 32 is a flow diagram of a process 3200 for generating a template for an electronic mail message. In operation 3202, a mail server information screen is displayed. Connection information is received via the mail server information screen in operation 3204. An address page is displayed in operation 3206. In operation 3208, recipient information is received via the address page. A content page is displayed in operation 3210. Content for the message is received in operation 3212 via the content page. An electronic mail message is compiled with the content in operation 3214. The electronic mail message is sent to a recipient in operation 3216 utilizing the connection information and recipient information.

Figure 33:
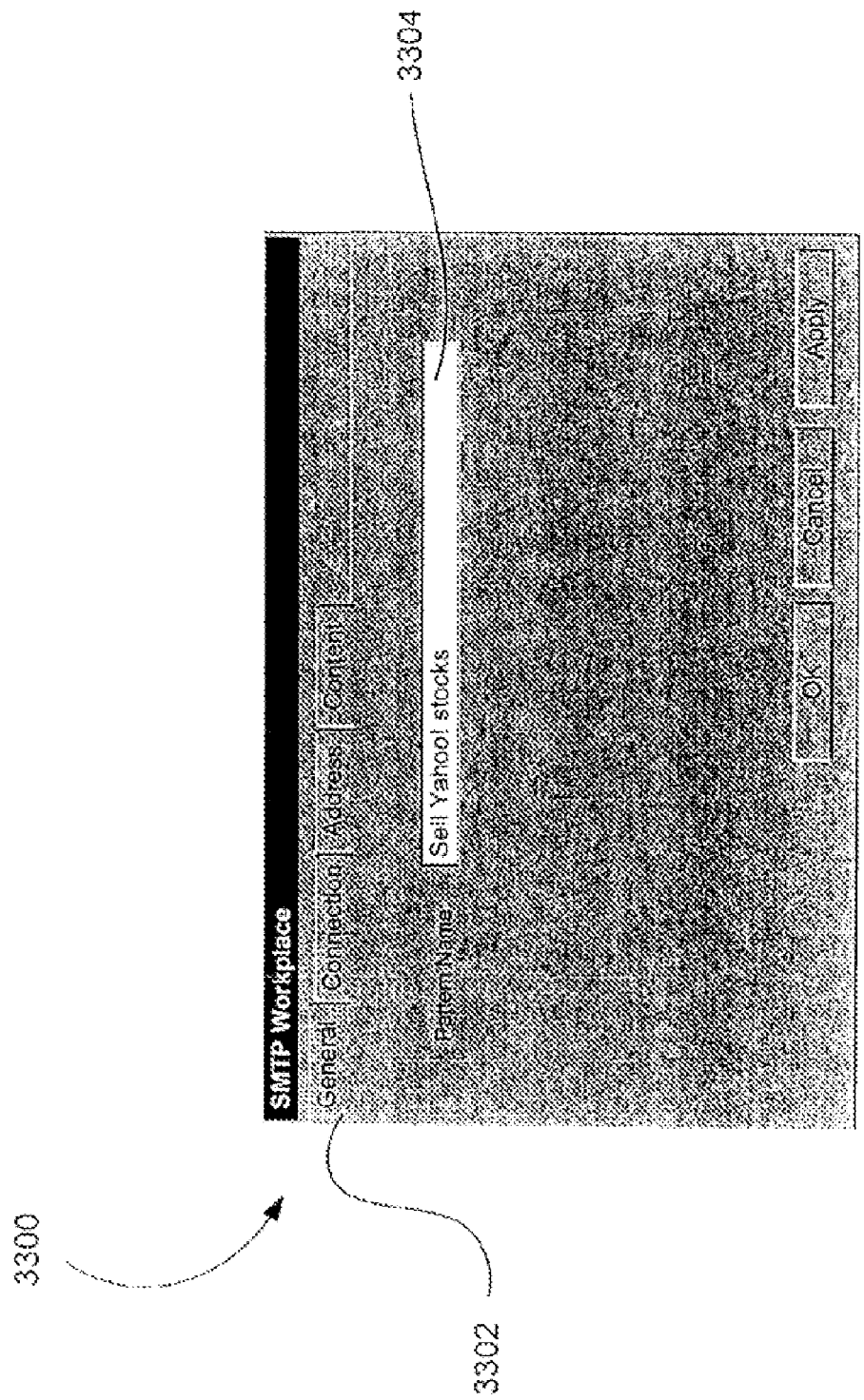
FIG. 33 illustrates a name pattern screen of the SMTP connector workplace.

The SMTP connector provides the designer the ability to create a template to send out emails. FIG. 33 illustrates a name pattern screen 3302 of the SMTP connector workplace 3300. The user enters the name of the SMTP pattern in the Pattern Name field 3304.

Figure 34:
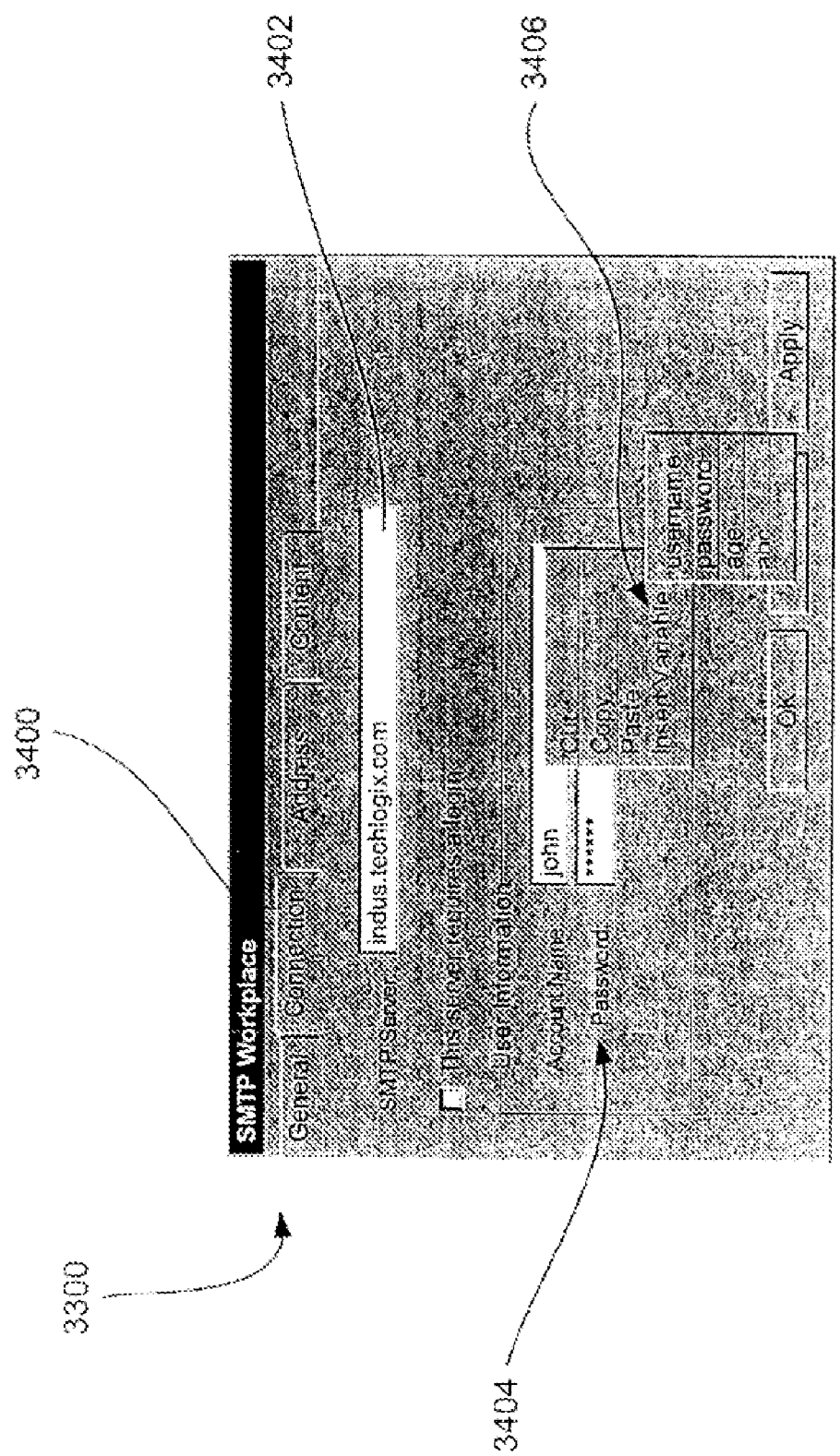
FIG. 34 depicts an SMTP server information screen of the SMTP connector workplace.

FIG. 34 depicts an SMTP server information screen 3400 of the SMTP connector workplace 3300. Fields for entering connection information are provided, including a field 3402 for identifying the SMTP server and fields 3404 for entering login information. While writing the template, designer can insert placeholders for user/session variables by using a toolbar button or pop-up menu item Insert Variable 3406.

Figure 35:
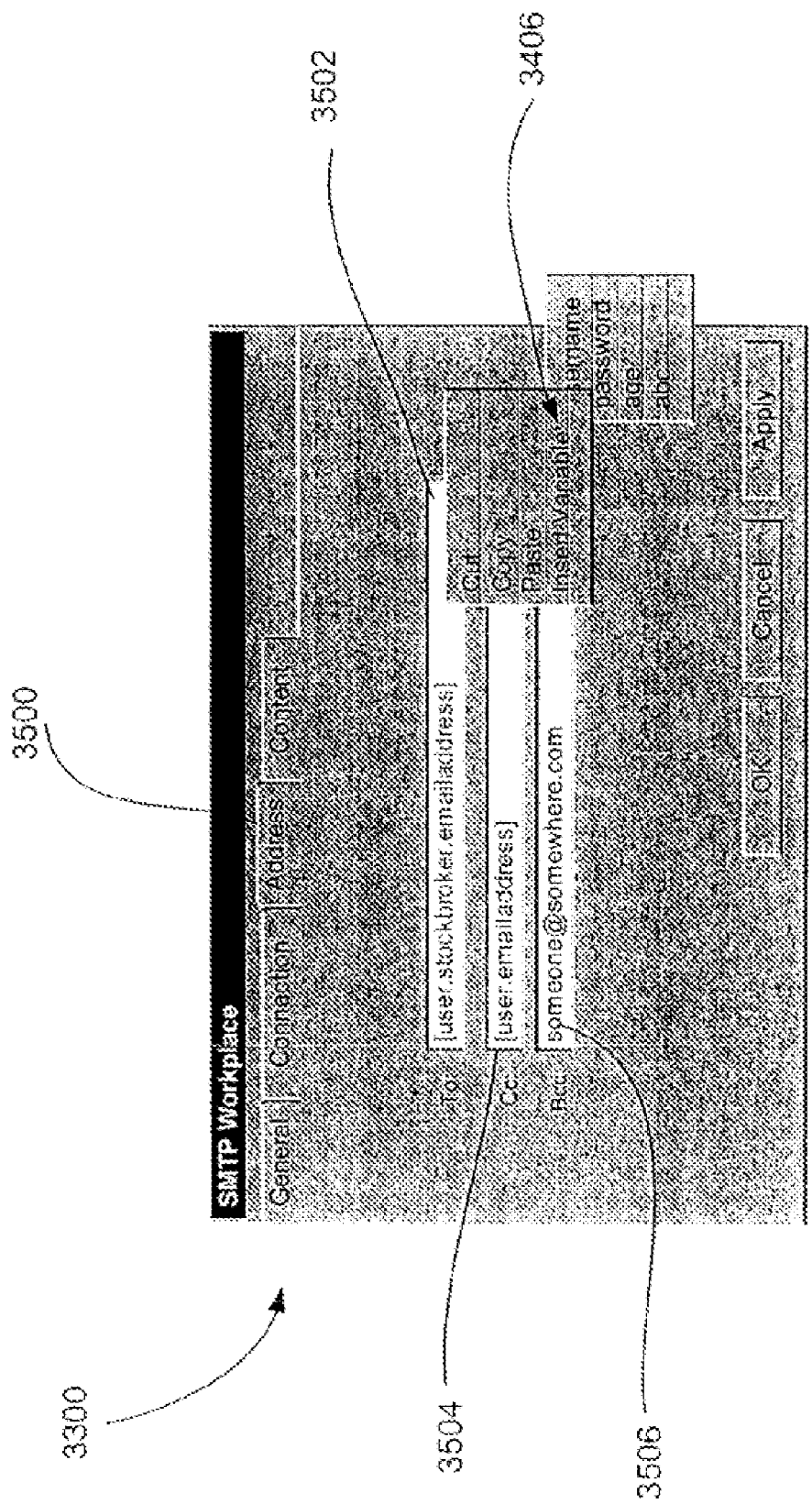
FIG. 35 shows an address page of the SMTP connector workplace.

FIG. 35 shows an address page 3500 of the SMTP connector workplace 3300. On this page, the user enters mail recipients in a 'To' field 3502, 'Cc' field 3504, and/or 'Bcc' field 3506. The designer provides a template for the email to be sent. Again, the designer can fill the template with the session or user variables.

Figure 36:
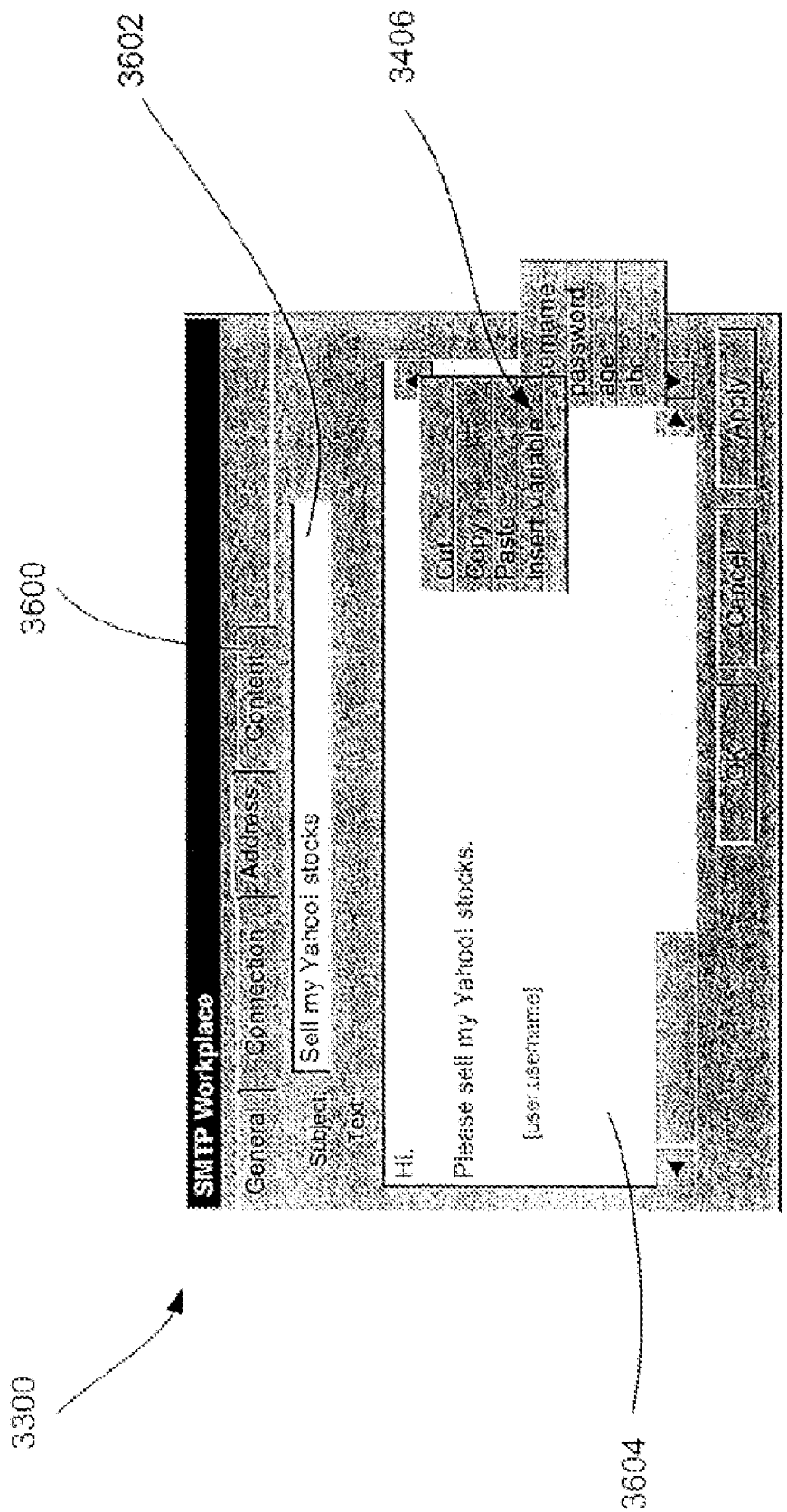
FIG. 36 illustrates a content page of the SMTP connector workplace.

FIG. 36 illustrates a content page 3600 of the SMTP connector workplace 3300. As shown, the content page includes a 'Subject' field 3602 and a text edit box 3604. The designer can type the template of the email in that edit box. Similarly, the designer can fill the template with the session or user variables.

XML Connector

Figure 37:
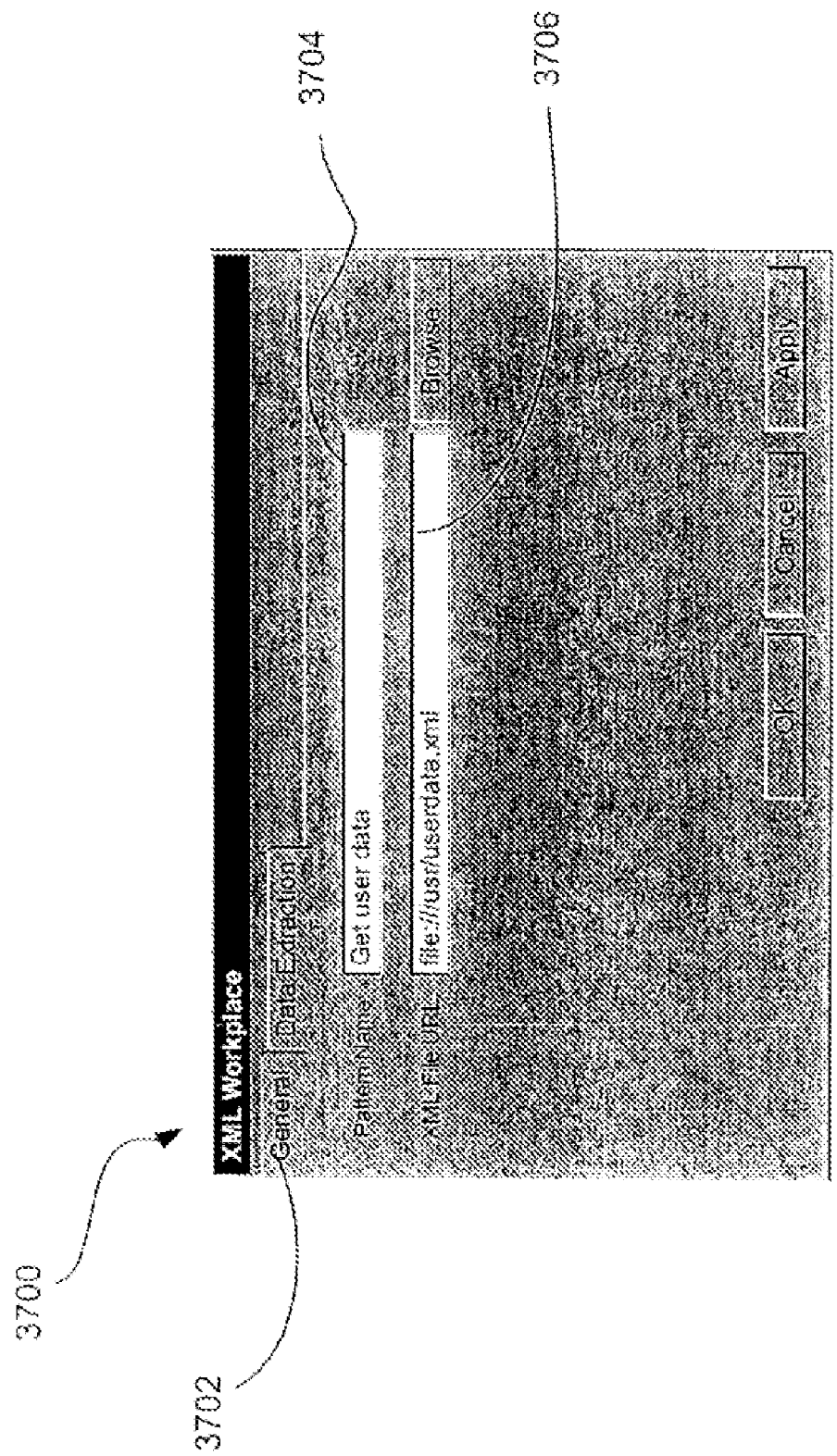
FIG. 37 is an illustration of the general information screen of the XML workplace.
Figure 38:
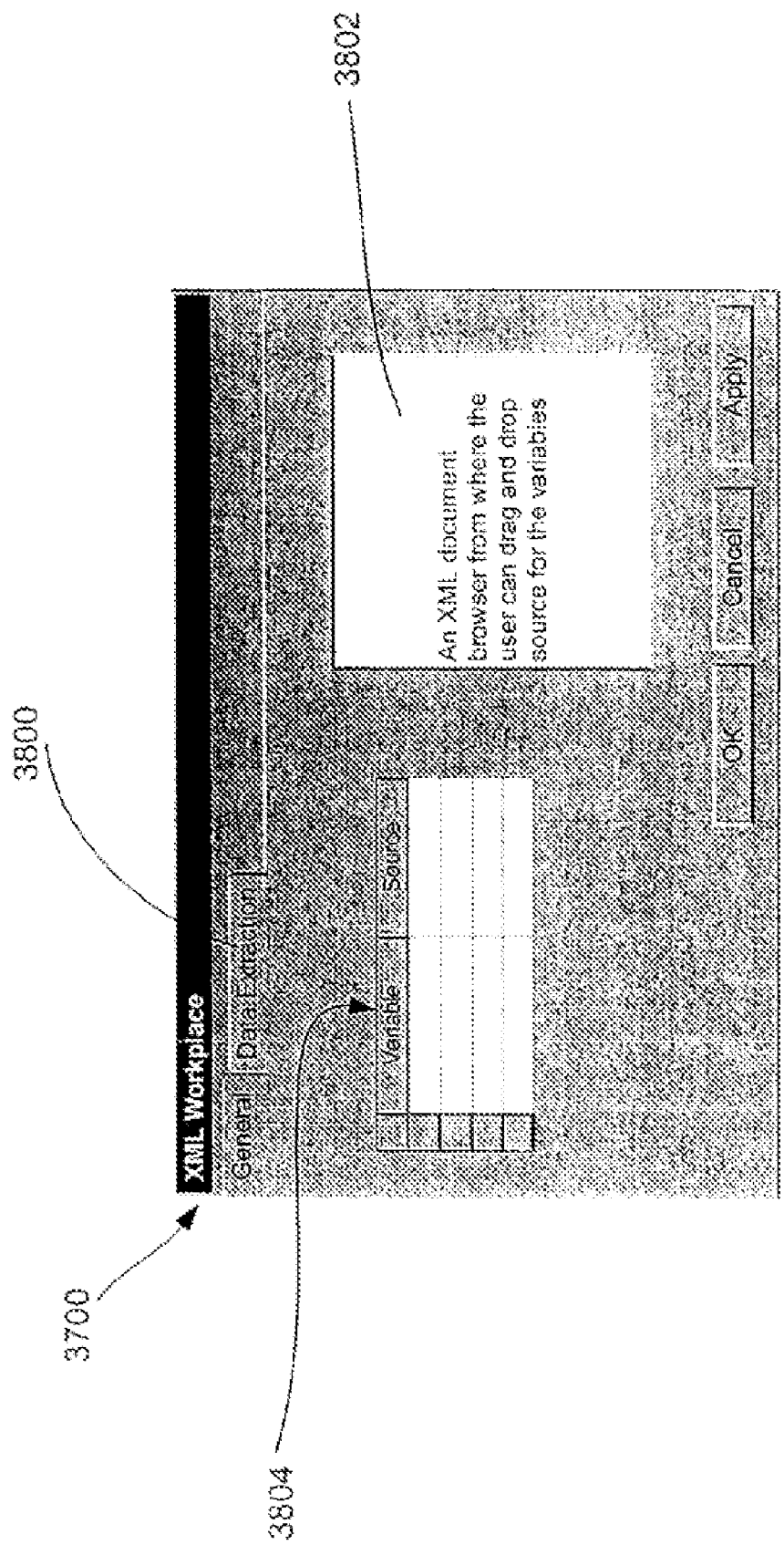
FIG. 38 shows a data extraction screen of the XML workplace.

The XML connector provides the designer with the ability to specify data extraction into a variable from an XML document. As shown in the general information screen 3702 of the XML workplace 3700, the workplace provides the designer the ability to name the pattern in a Pattern Name field 3704 and specify the location of the XML document as a URL in a URL field 3706. See FIG. 37. Subsequently, as shown in FIG. 38, the data extraction screen 3800 allows the user to browse through an XML element hierarchy of the document in a document browser 3802 to drag and drop the source for a variable into a table 3804 of variables and their sources.

Pattern View

Figure 39:
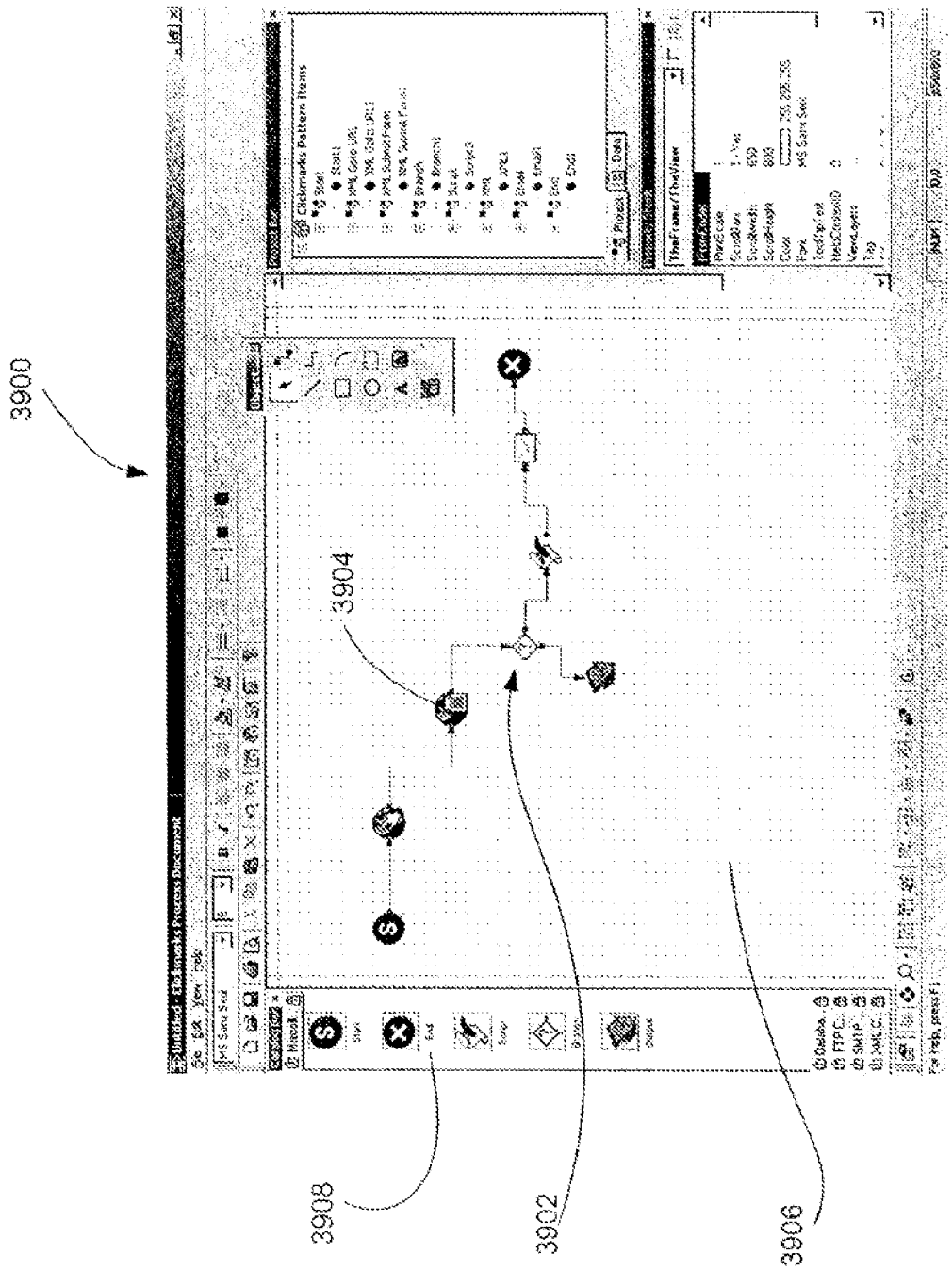
FIG. 39 depicts a Pattern View according to one embodiment.

Referring to FIG. 39, the Pattern View 3900 is the main application view according to one embodiment. The Pattern View shows the entire process diagram 3902. The process diagram can be built by using either recording interactions in different connections 3904 and/or describing them manually in the Pattern View.

The main area is a drawing canvas 3906 that displays the flowchart. A dockable toolbox 3908 includes the icons for each connector type nodes and icons showing connecting between nodes like a simple transition, looping and branching.

Basic Flowcharting Features

The Pattern View provides several flowcharting features:
  a) Ability to group/ungroup items
  b) Ability to align, size and order items
  c) Ability to add text annotations freely within the drawing canvas with full control over font, format, etc.
  d) Ability to size the canvas to printer supported and custom
  e) Ability to draw in portrait or landscape mode
  f) Ability to lock items (cannot move or change any properties)
  g) Ability to zoom into canvas
  h) Icons can be stored in multiple stencils. (This is used to group together icons of related functionality).

Pattern Componentization

Pattern componentization allows re-use of patterns by allowing the designer to group together a portion of a pattern and create a Pattern Component out of them. The Pattern Component is then defined by its input and its outputs. The Component may span multiple connector types. The designer can name the Pattern Component and store it in a local repository which can be browsed using the Pattern Explorer window.

Figure 40:
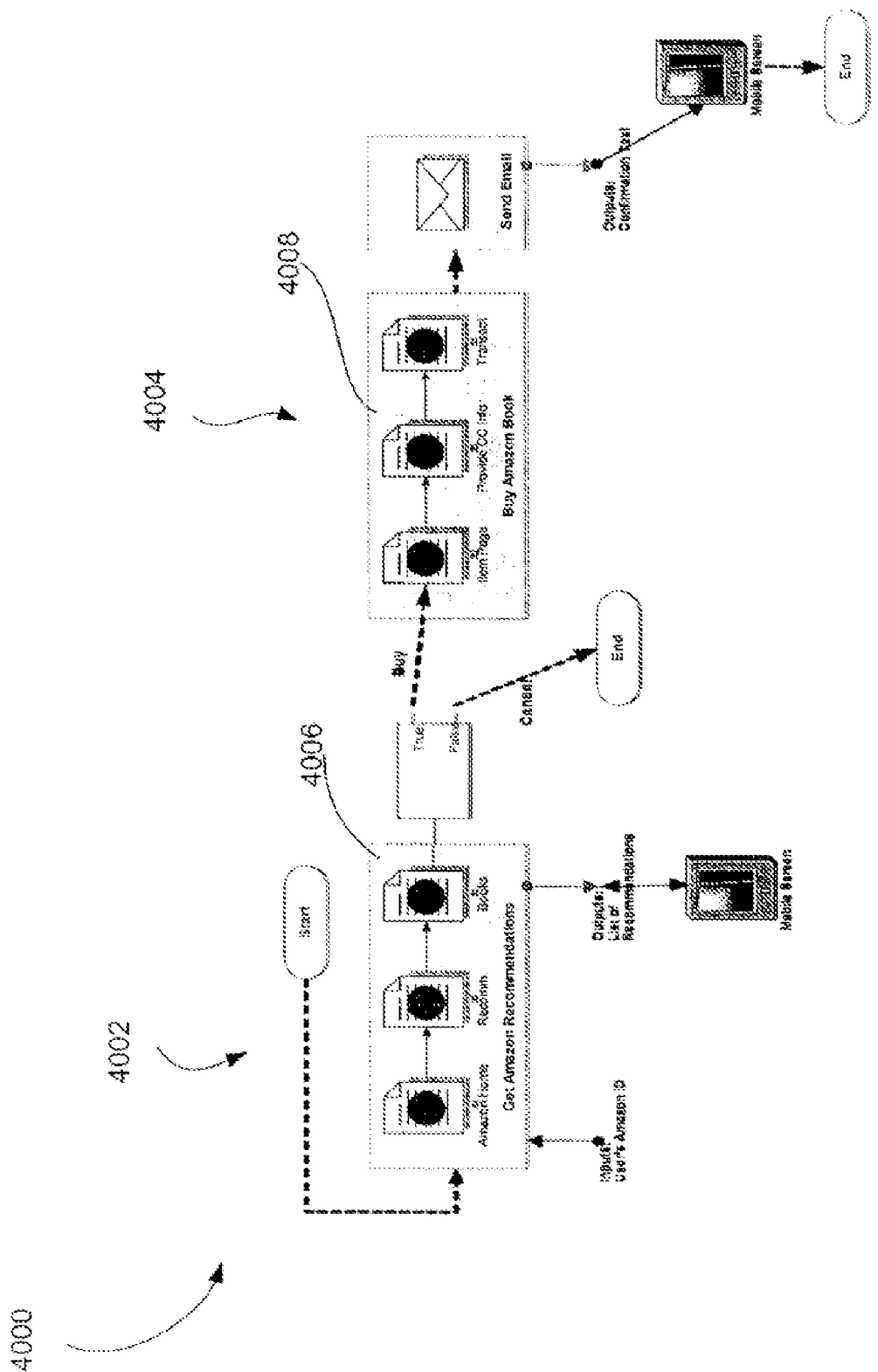
FIG. 40 depicts a sample pattern for synchronizing two different flows.

Once a Pattern Component has been created, it is preferably represented on the drawing canvas by a single shape which encapsulates the entire pattern contained within Sample Pattern View FIG. 40 depicts a sample pattern 4000. The pattern in this example synchronizes two different flows:
  Connector Flow 4002: This is the flow of data and interaction within various types of connectors, for example, the retrieval of the inbox in a Hotmail account.
  Client Flow 4004: this is the flow of screens and responses on the client(s).

States

States represent a single interaction with a Connector, Client or the Platform. (Platform interactions are preferably Scripting States). A pattern represents a transition between various states triggered by Transition Events (see below). In some cases (XML Connector) what state the pattern in is based on recognizing the page returned by the remote application. More information about recognizing a remote application's state can be found in U.S. patent application entitled SYSTEM, METHOD AND COMPUTER PROGRAM PRODUCT FOR RECOGNIZING A STATE OF A REMOTE APPLICATION, referenced above.

Sample Pattern

The pattern shown in FIG. 40 represents the following illustrative case: a user is presented with a list of Book Recommendations from amazon.com. The user can then either choose to purchase one of the books or press Cancel. If he or she purchases a book, an email is also to be sent to the user's main email account confirming the purchase.

The flow is grouped into multiple sections that represent a set of tasks completed within the Connectors. The data obtained from the Connectors can be piped into the Client screens (using either drag-and-drop or variable creation and insertion). The user can then choose one of multiple options (e.g. Buy or Cancel). Each of these options can then result in a new sub-pattern being initiated.

In the sample shown in FIG. 40, the designer is using two Pattern Components: "Get Amazon Recommendation" 4006 and "Buy Amazon Book" 4008. The designer could choose to further aggregate "Buy Amazon Book" and Send Email into a new component for subsequent reuse.

The first step in designing the pattern of FIG. 40 is starting the XML Connector Workplace and recording the interaction that obtains the Recommendations list from Amazon.com. In doing so, the designer uses the Cookie Explorer to set the Amazon Userid cookie to a valid value. Subsequently, the designer can edit the cookie within the Cookie Explorer and set it to a variable such as CurrentUser.AmazonCookie. The designer then maps the latest list of Book Recommendations into a data array and stops the recording.

Next, the designer starts a new recording and records the interaction that goes to Amazon and buys a book. The designer then stops the recording. In doing so, the designer starts the pattern with a URL that represents an item page on Amazon. For the credit card or other payment information, the designer can use actual values. Again this can be subsequently edited to obtain values from a Universal M-Wallet for the current user.

The designer then switches to the pattern view that now shows two separate graphs for both interactions. The designer can add an SMTP connector to the flow and link it with the Buy Amazon book fragment of the pattern.

The designer then adds the mobile screens into the pattern and sets up the content to be displayed on these screens in the Client View.

The designer also specifies alternate paths within the two XML Connector patterns above to allow multiple flows within each of the two segments.

Alternate Paths

The ability to specify alternate paths is especially useful for the XML Connector. The returned page may or may not be the 'expected' page, i.e. The page that the designer saw during recording, or it may be some different page. For example, during recording, the designer goes to a URL which is a login page, enters a Login/Password and can see the contents. During pattern replay, it is possible that the returned page after this interaction is a 'Server too busy' page. In such a situation, the designer may now want to retry for the password entry page.

To handle such a situation, the designer records the normal path using XML Connector Workplace and switches to Pattern View. From the 'Palette View', the designer drags and drops the XML Connector icon on the Pattern View. The designer links the login page node with this new connector node. The designer right-clicks the new connector node and selects 'Identify Page' from a pop-up menu. This invokes the XML Connector Workplace. The designer now browses to the alternate page and clicks 'identify'. Details for this identify operation are provided in U.S. patent application entitled SYSTEM, METHOD AND COMPUTER PROGRAM PRODUCT FOR RECOGNIZING A STATE OF A REMOTE APPLICATION, referenced above.

The workplace recording allows the designer to follow a given path in a linear fashion. Consider the scenario, of the XML Connector, where in a certain state there are choices for interactions (i.e. some links to choose from) that results in different outcomes. The designer desires to cover the alternate paths too. Even if the workplace only allowed recording in a linear fashion of a single scenario, the IDT would recognize a sub-pattern that is the "prefix" of an already recorded pattern, and if the designer revisits the workplace and starts recording again to reach the same state that matches a previously recorded pattern and then branches off to an alternate path, the workplace would still show a linear recording but the IDT would recognize the prefix and eventually insert the branching off from the prefix in the Pattern View.

Pattern Flow: Transitions and Control

This section describes how the pattern transitions from one state to the next and how the flow of the pattern is controlled and directed.

Transition Events

Each connector has a defined set of state Transition Events that can cause the pattern to move to a different state. Table 6 summarizes these for each connector.

TABLE 6

| Connector | Event | Description |
| --- | --- | --- |
| XML | Link | When a hyperlink is followed |
|  | Submit | When a POST or GET operation is performed on browser the |
|  | OnLoad | When the document has been fully loaded into the browser simulator and all session variables have been appropriately updated |
|  | OnFailure | When an HTTP failure code is received |
| Database | OnSuccess | When a result set is successfully received from the database. Note that a null set s also considered an appropriate result |
|  | OnFailure | When a failure occurs in retrieving the result set (e.g. database connection is broken or cannot be established) |
| SMTP | OnSuccess | Email is successfully sent (Note this does not guarantee delivery; only an attempt at delivery) |
|  | OnFailure | Email could not be sent |
| FTP | OnSuccess | Incoming our outgoing files is successfully sent/received |
|  | OnFailure | Ftp process ended in failure |

Graphically, an arrow labeled with the event type represents each transition event.

Specifying Transition Events

The designer specifies transition events. However, for the XML Connector, transition events are also recorded automatically by the Workplace while the pattern is being recorded. A designer can subsequently add in new transition events to the recorded pattern. For example, while recording a login sequence, the designer would normally have utilized a POST/GET transition event (by pressing the Login button). However, the designer can also add an OnFailure transition event to handle error situations. For the other connectors, the designer would explicitly choose to handle one ore more transitions events.

From a particular state, a designer may only utilize a given transition event once. For example, from State A a Database: OnSuccess transition event may only lead to State B. There may not be a second Database:OnSuccess leading to State C. However, for the special case of Link and Submit transition events, the designer can specify multiple states. For example, a Submit transition event can lead to both State B and State C. This is because Submit and Link transition events frequently represent transactions that can have many different results. A simple example is a login state. The Submit transition event could lead to the MainMenu state or a BadLogin state or even an AdministratorMenu state. Thus, for the Submit and Link transition event, the designer can specify an arbitrary number of resulting states.

Flow Control and Scripting States

The pattern flow is specified explicitly within the pattern itself. The state transitions described above represent two cases of pattern flow. For conceptual clarity, "normal" flow and error-handling are distinguished. Normal flow represents the flow intended by the designer. It can itself have multiple branches (for example due to a Submit transition). Error handling flow should normally be added to each state transition to handle failure cases. It represents an exception handling mechanism. Hence, while important, it is peripheral to the normal flow of the pattern. The text below discusses the various types of normal flow.

Most transitions are linear, meaning that the pattern flows from one state to the next. For flow control, the designer can place scripting states that can decide the direction of the flow.

Scripting States vs. Submit/Link Transitions

Scripting States are useful for flow control in all the connectors except for the XML Connector. In the XML Connector, the Submit/Link transitions with their multiple possible results provide an intrinsic flow control method. However this flow control is based upon the dynamics of the remote web site (the one the XML Connector is interacting with). If the pattern flow is to be directed within XML Connector states based upon the values of Session variables, Scripting states can be used. Use of scripting states is useful if, for example, a price comparison pattern is being implemented. After comparing the price obtained from the current web page with the BookPrice session variable obtained from a different eCommerce site, the pattern might need to be directed towards the first or the second eCommerce site. This can be accomplished by placing a Scripting state to perform the comparison.

Several illustrative Scripting states are provided in Table 7.

TABLE 7

| Scripting State | Description |
| --- | --- |
| StraightThru | The pattern flows from a single state to another state. This would be used to perform variable manipulation, etc. (For example, removing the commas from an amount string before inserting it into a database as a number). |
| 2-Way Branch | This represents a scripting state that can lead to two different states based on the script executed within the state. (For example, if the result of a database query indicates that the user should be sent to an Account Overdue transaction vs. an Account Overview transaction). |
| n-Way Branch | Generalization of the 2-Way Branch. The designer specifies the number of branches so the script can be validated. |
| Loop | A portion of the pattern is repeated. |

Looping and Branching States

This section describes how the designer interacts with looping and branching scripting states. Note that in all cases, the popup dialogs are meant to facilitate the actual script that is generated corresponding to the state and the designer has the option of editing the generated Javascript as well.

Figure 41:
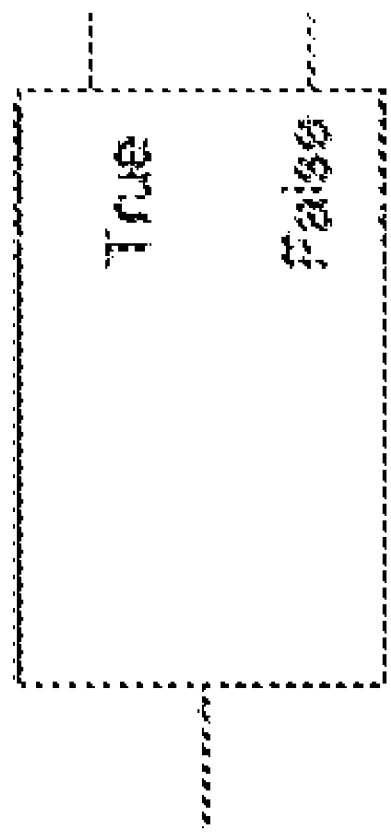
FIG. 41 depicts a two-way branching icon.
Figure 42:
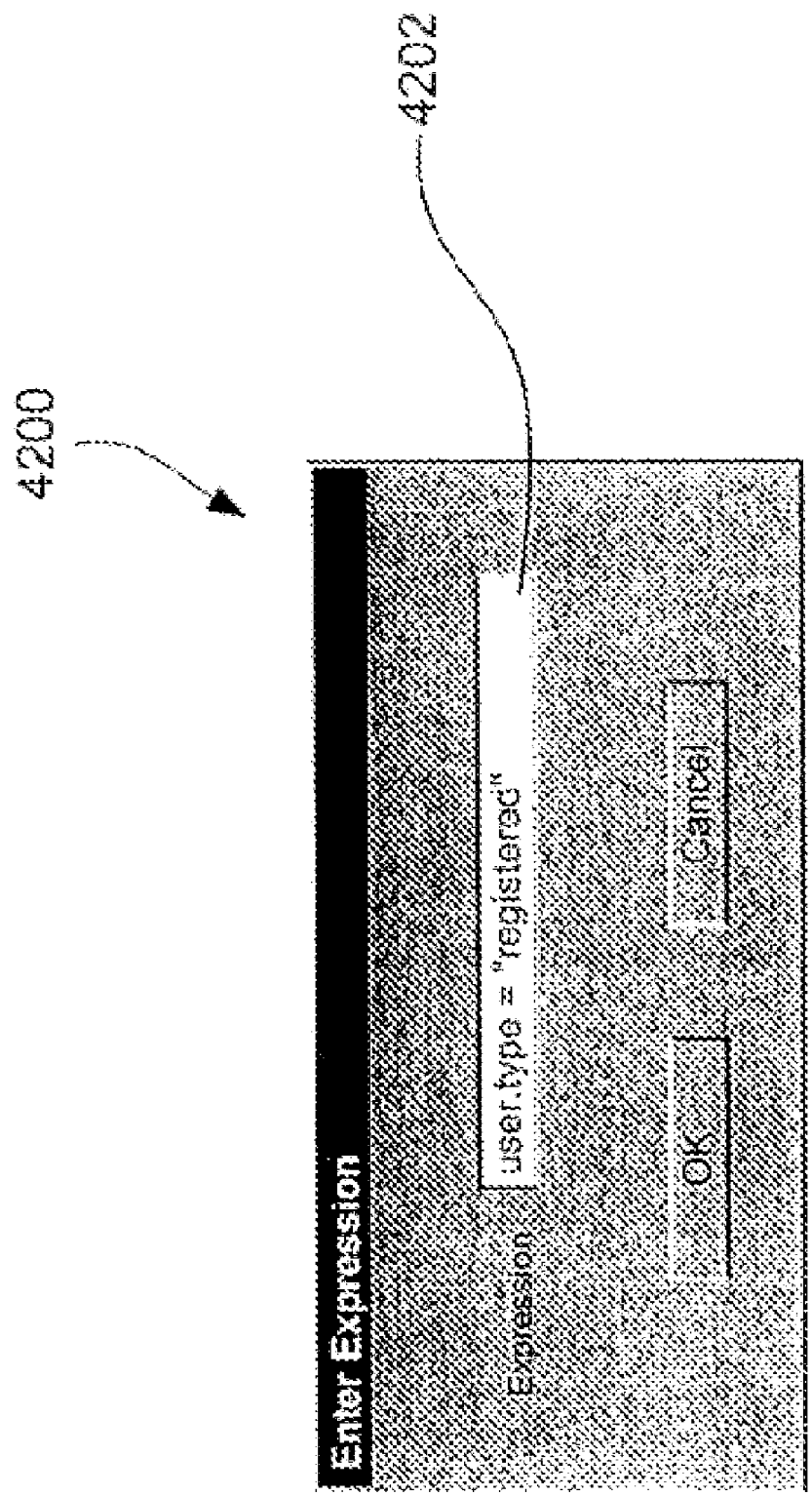
FIG. 42 illustrates a dialog box for setting branching parameters.

FIG. 41 depicts a two-way branching icon 4100. The designer drops the two-way branch icon on the process diagram. Double-clicking its symbol pops up the dialog box 4200 shown in FIG. 42. The dialog box asks for the Boolean expression entered in the Expression field 4202 to be evaluated. If during pattern replay, the Boolean expression is true, the pattern follows the path linked to the 'True' port. Otherwise it follows the path linking with the 'False' port.

Figure 43:
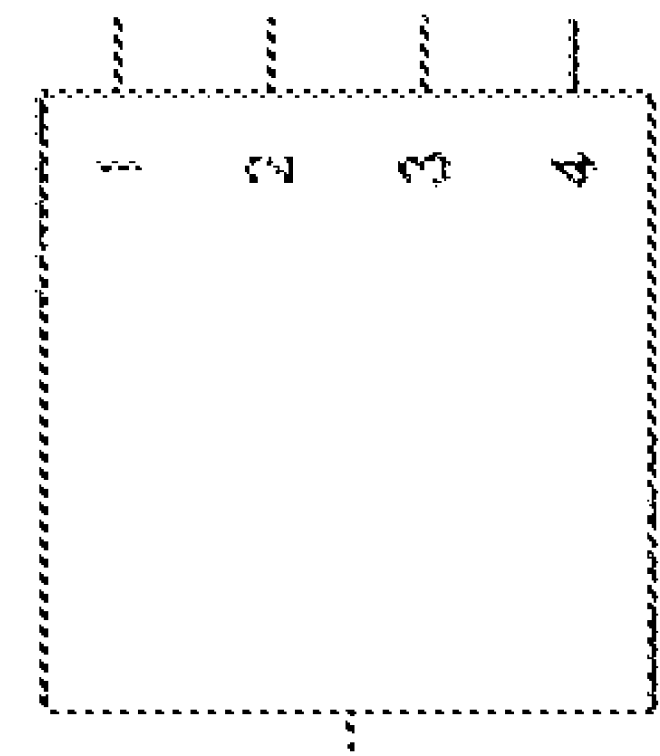
FIG. 43 depicts an n-way branching icon.

FIG. 43 depicts an n-way branching icon 4300, which is similar to the two-way branching icon. The n-way branching icon, however, allow the designer to specify the number of branches and parameters for selecting which branch the pattern follows.

Figure 44:
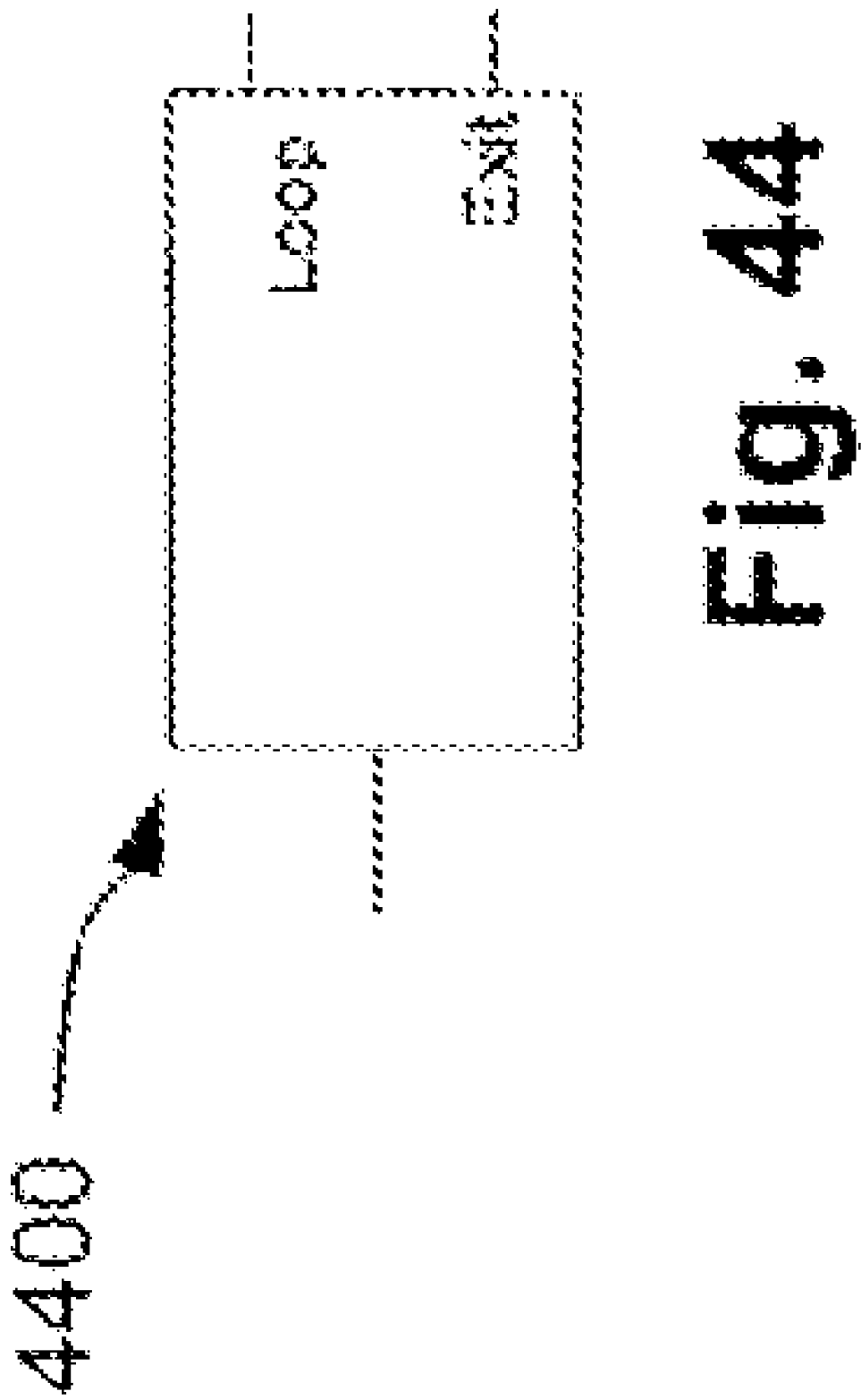
FIG. 44 shows a looping icon.
Figure 45:
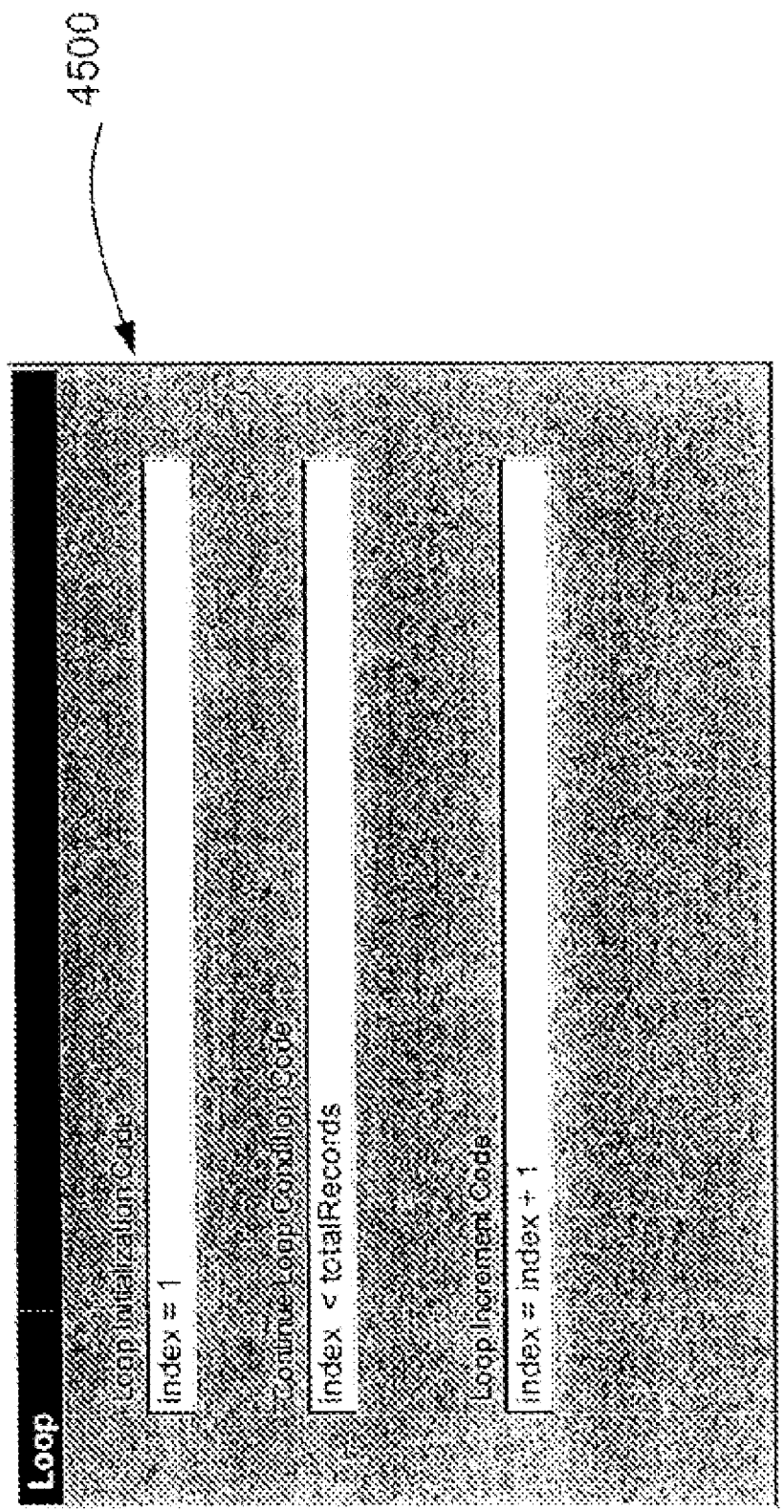
FIG. 45 illustrates a window for entering looping criteria.

FIG. 44 shows a looping icon 4400 that includes a loop port that loops back to a previous portion of the pattern until specified criteria are met, upon which the pattern follows the exit port. FIG. 45 illustrates a window 4500 for entering the looping criteria. In this example, the exit port is activated upon an incrementally increasing control value reaching a specified value.

Connector Pattern Details

Figure 46:
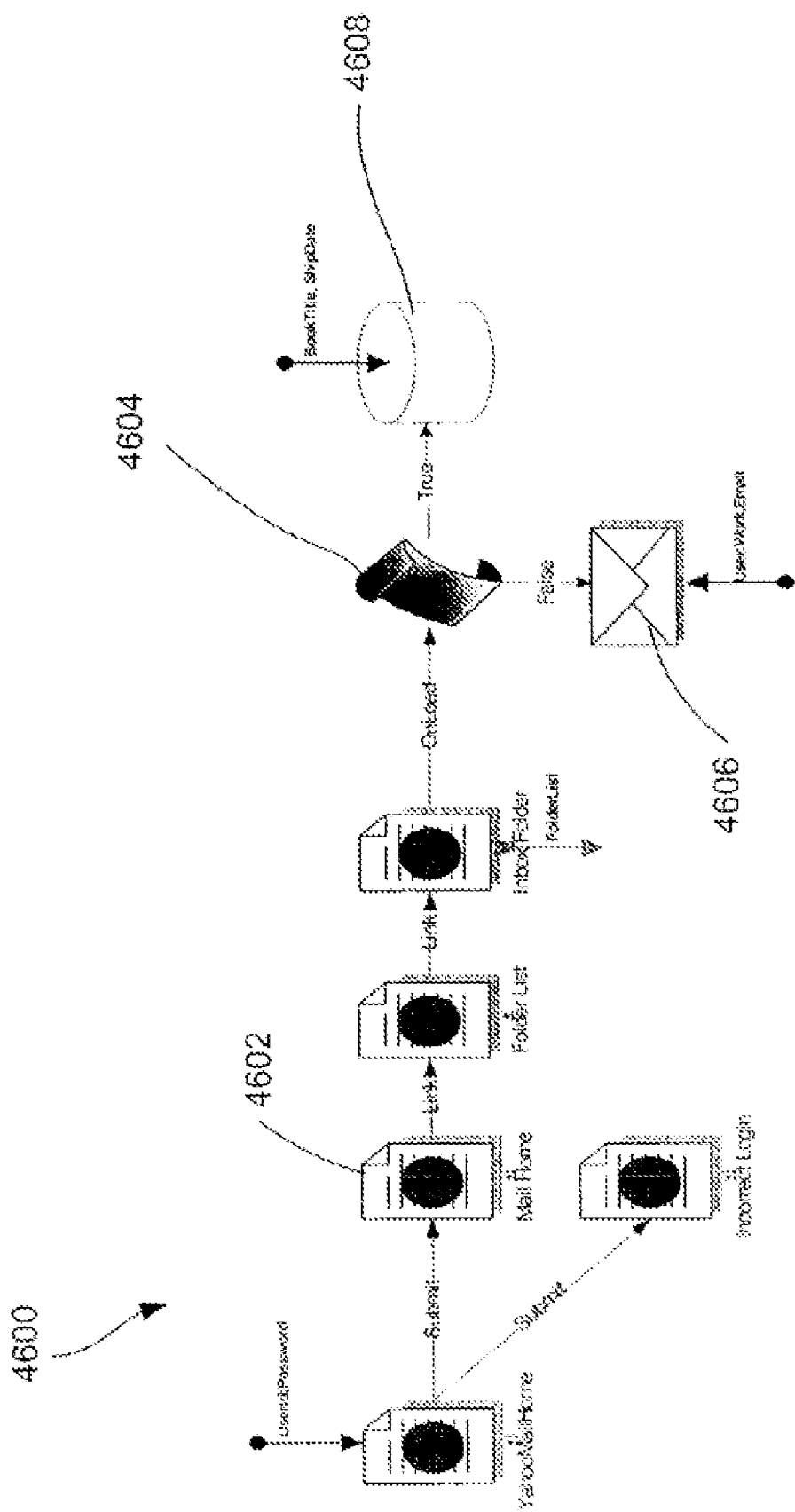
FIG. 46 shows a detailed depiction of the Connector segment of an illustrative pattern.

FIG. 46 shows a detailed depiction of the Connector segment 4600 of an illustrative pattern. The segment includes several XML Connectors 4602 that together represent a user checking his or her Yahoo email inbox for the presence of an email from shipping.amazon.com. Note that the initial Submit state has two possible result states: The Yahoo Mail Home and an Incorrect Password page.

A 2-way scripting state 4604 is used to determine whether the email has arrived from shipping.amazon.com and what action to take in either case. If an email from Shipping.amazon.com is not present, an email message is sent to the user's work email address using an SMTP connector 4606 indicating that the product has not yet shipped. If the email is present, a database connector 4608 is used to insert a confirmation record into a database, recording the title of the book and the shipping date.

As an option, at least one additional state in the XML Connector can be provided, where the message, if present, is linked to, and the shipping date extracted from, the message contents.

Pattern Views: Settings

The Pattern View can have several different settings. Illustrative settings include:

Full Pattern: This displays the entire pattern including Connector Flow and Client Flow Connector Pattern: This displays only the connector portions of the pattern. It can be used when the designer is performing detailed editing on a connector piece.

Client Pattern: This displays only the client portion. Each set of Connectors between client views are collapsed into a single element. This allows the designer to visualize the flow of the pattern from the client perspective.

Device Editor View (Client View)

This section describes how the designer specifies the view on a client and how the client interacts with the content/transactions.

Content Editing

The Client View can support multiple clients. The designer can select the current client from the toolbar. The Client View displays an accurate representation of a single screen of the selected client along with multiple tools for editing the screen. The representation is accurate in that the size of the screen corresponds to the actual client. The designer can rename or delete a screen. On deletion, confirmation can be obtained since any associated flow links in the Pattern View is also deleted.

Four illustrative classes of editors of the IDT are set forth below:

MobileEditor: For the mobile phone class of clients
PDAEditor: For the handheld device class of clients
VoiceEditor: For use with Voice portal clients
WebEditor: For use with browser style clients The MobileEditor, the PDA Editor and the Voice Editor have several basic modes, including:

MultiScreen: Shows all the screen defined for this pattern in one window (with scrollbars as needed). This gives a "big picture" view of the pattern from the client point of view.

Edit: Shows one particular screen. This is where all the content, formatting and scripting tools are available to the designer for detailed modification of the screen.

MultiScreen Mode

Figure 47:
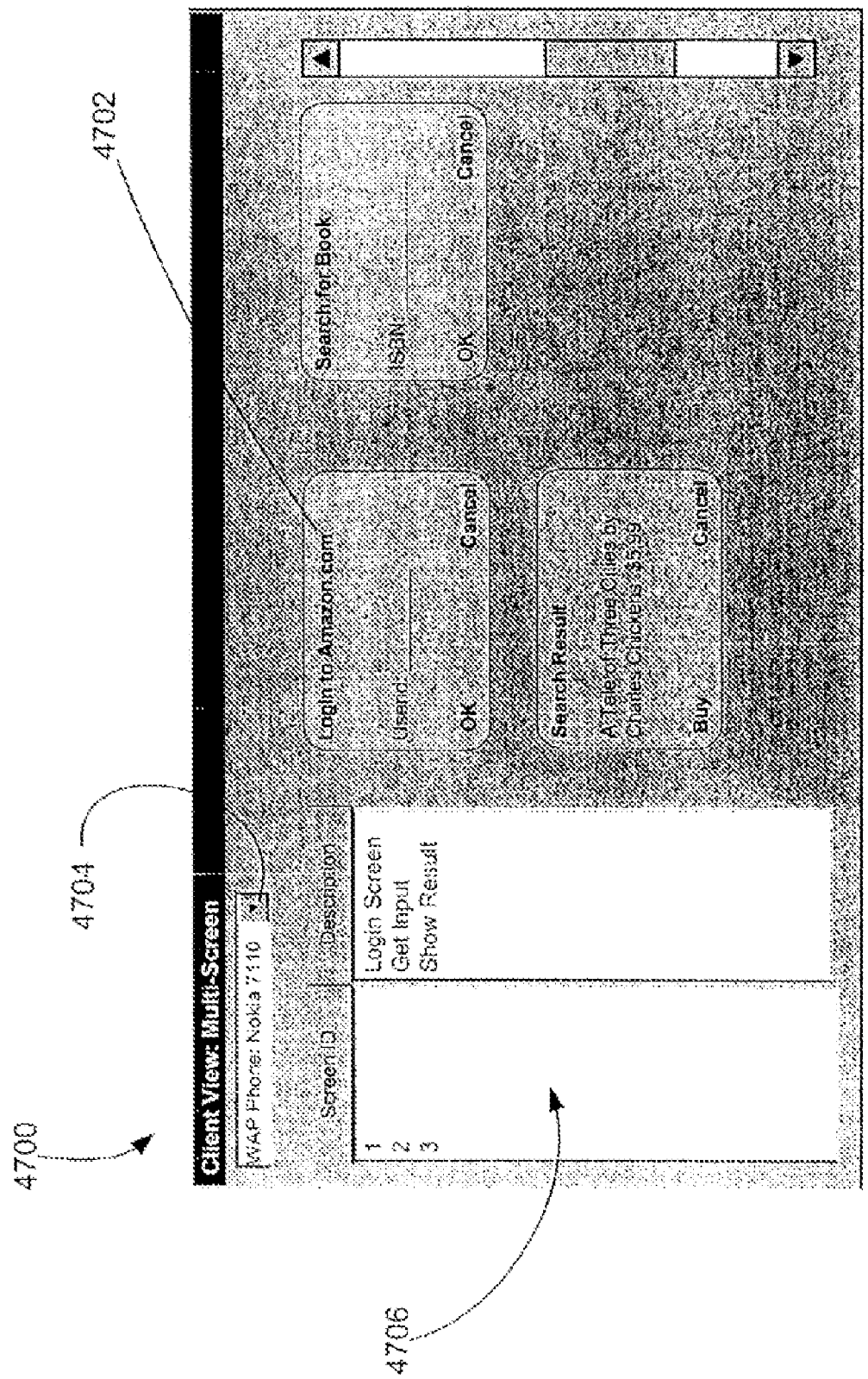
FIG. 47 depicts the Multi-Screen mode in the Client view.

FIG. 47 depicts the MultiScreen mode in the Client view 4700. In MultiScreen mode, some or all of the screens 4702 in the pattern are shown collectively. In this mode, the designer can use a dropdown list 4704 to select the particular client for which the screens are currently displayed. A screen identifier and description can be entered in a table 4706. The designer can go into Edit Mode on any particular screen by double-clicking either on the appropriate row in the table or on the screen itself.

Edit Mode

Figure 48:
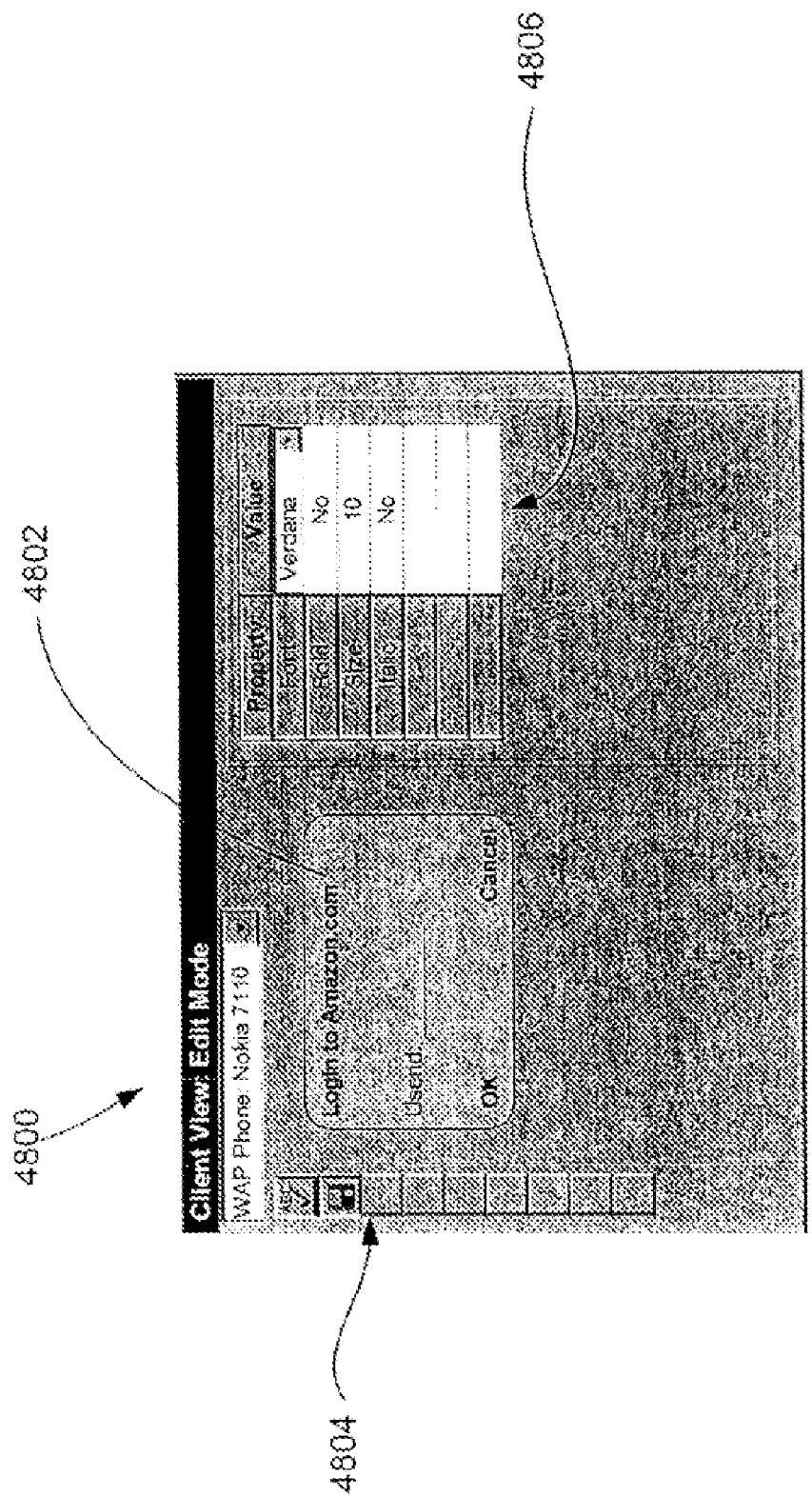
FIG. 48 illustrates the basic view in Edit mode of the Client view.

As shown in FIG. 48, the basic view 4800 in Edit mode, according to an illustrative embodiment, has three elements: the screen 4802 being edited; a tool bar 4804 with Content, Format and Script elements of ruse on the screen; and a Properties window 4806 which displays the properties of the currently selected element.

The editor is preferably line oriented, but can also be pixel oriented. Additionally, the editor can provide a variety of formatting tools (for example, Bold, Italic, justification, etc.) These tools can be specific to the capabilities of the element and/or the client selected.

For each editor, the designer is presented with a toolbar of available options for Content elements, formatting and scripting. Illustrative Content elements include:

Text: Plain text
Link: Represents a hyperlink
SubmitLink: Represents a link that causes the form contents to be submitted
Input: An input entry field (can be one of text, textarea, image, hidden, submit, password and number)
Select: An input selection field
Variable: A Session or Application variable (contents are dynamically replaced at run-time). Variable text is enclosed in square brackets with the variable name inside.

Additionally the editors may also support content insertion using drag and drop operations from within the Workplace view.

Graphics can be added to the screen in several different ways, including:

a) Filename: By specifying an appropriate graphic file. This may be displayed inplace on the screen.
b) URL: By specifying a URL. An icon representing a linked image is displayed.

Data Management View

This section describes how Session and Application data are managed.

Data Overview

The designer can use data obtained from various connectors to populate content on clients or to make decisions on what content to display. The designer can create Session variables at any point within the pattern, and the variable may be available globally within the pattern. The designer also has access to Application variables which are provided by the mobilization platform.

Session Data Types

There are several types of data that can be created by the designer, including:

Basic Types: These are fundamental data types such as String, Number, Boolean, and Float.

Record: This represents a collection of Basic Types (like a struct in C).

Table: This represents a collection of records (like an database table).

Before a designer can use a Record or Table, the Record or table must be defined. Subsequently multiple variables of that type or Record or Table can be created like variables of Basic Types.

Data Management View Functions

Figure 49:
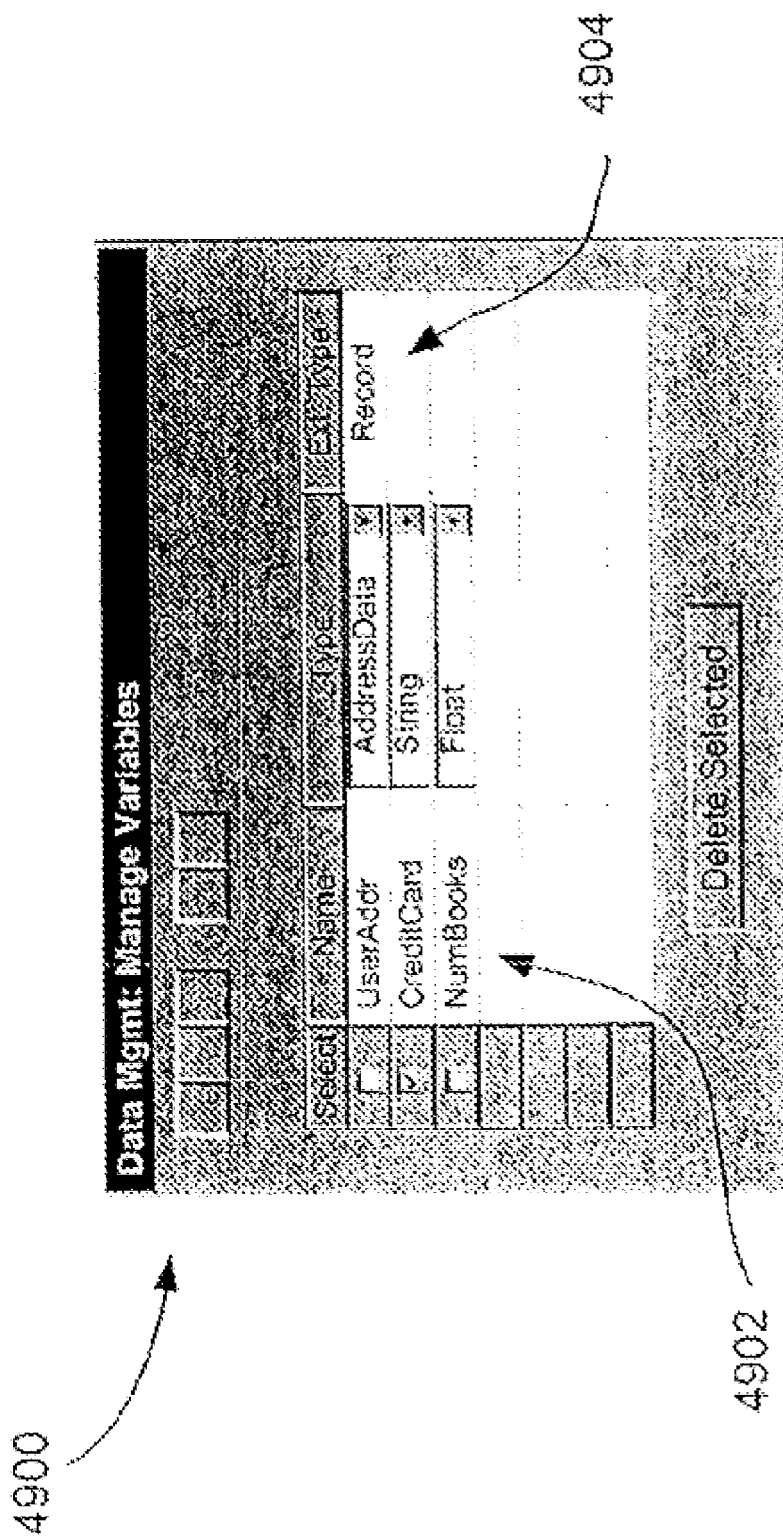
FIG. 49 shows the view for managing variables in the Data Management View.
Figure 50:
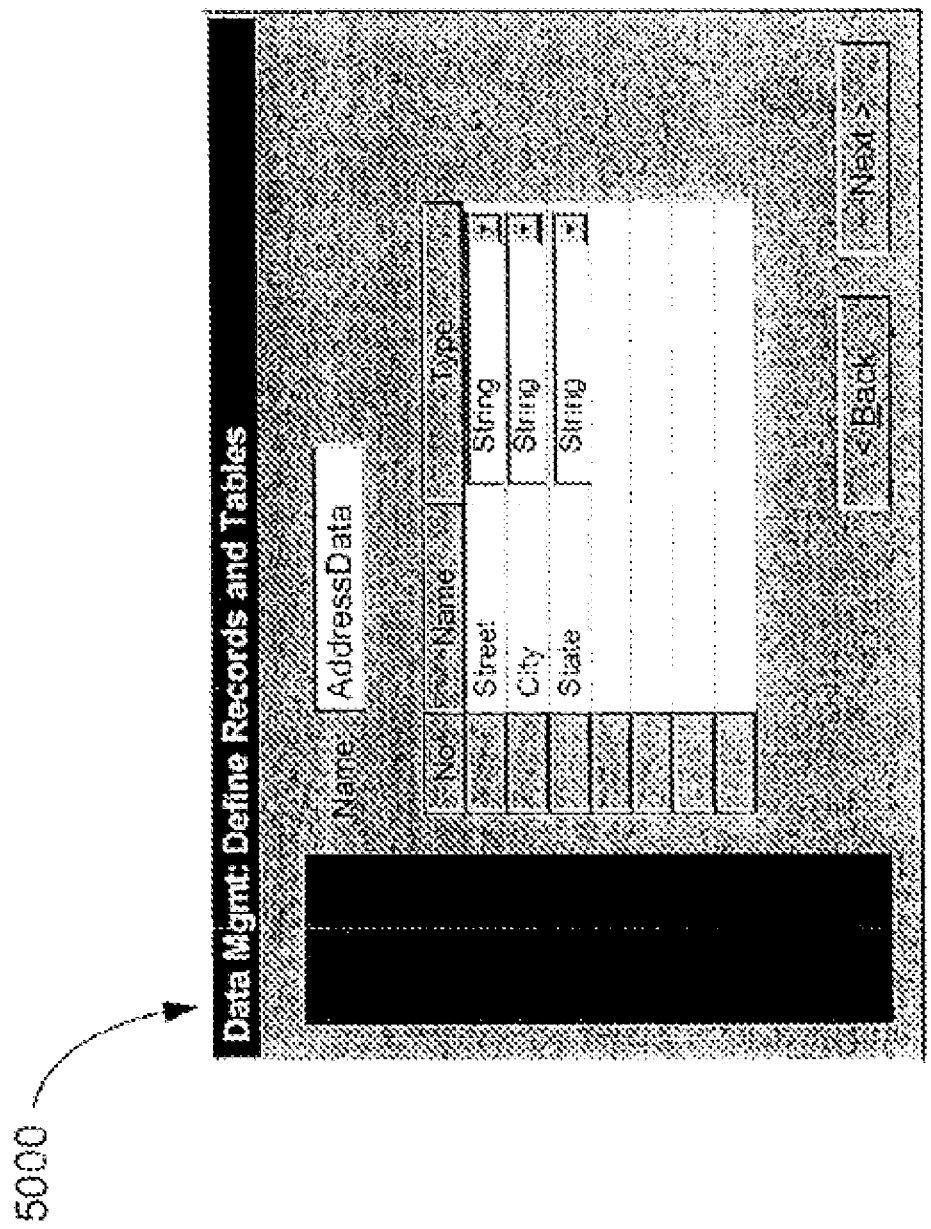
FIG. 50 illustrates the view for defining new variable types in the Data Management View.

The basic appearance of the Data Management View is shown in FIGS. 49 and 50, which demonstrate the view 4900 while managing variables and the view 5000 while defining new variable types, here records and tables. The data Management View performs the following functions:

Define Record: Wizard-style interface for defining a record. See FIG. 50.

Define Tables: Wizard-style interface for defining a table. See FIG. 50.

Manage Variables: Grid style view 4902 that displays all variables defined within the current pattern. Allows variables to be added, renamed and deleted, preferably in place. A type of variable, such as record or table, can also be defined in a type field 4904. See FIG. 49.

Export Variables: Creates an XML file that describes the selected variables (including record and table definitions if appropriate). This allows for reuse of variable definitions from one pattern to another.

Import Variables: Read in XML file and create variables and record, table definitions.

Example of Usage

In an illustrative use session, the designer starts by creating a new Pattern Document from the 'File' menu. The initial view displayed to the designer is a blank Pattern View along with the available Palettes. The basic interface is a grid-like interface with the main canvas sheet as the Pattern View and the stacked-up stencils as the different Palettes available for connectors.

The designer can invoke one of the Workplace Views from the ones available for each connector to start a scenario recording session. The designer interacts with the Web site(s), database(s) for the respective connector and once the designer is done, the View is switched back to Pattern View. The result is the creation of a segment that is added to the flow chart already shown in the Pattern View.

Alternatively the designer can use the smart icons in the different Palettes to manually create nodes and connect them to form a flow that represents an interaction within a connector (such as within the XML Connector) or of different connectors to complete a process.

The flow chart in the Pattern View represents a set of interactions that complete a transaction. Each node (or smart icon) of the graph is a single interaction with a Web site, Database, etc. The connecting lines between the nodes give the Pattern Reply Engine the necessary information about the sequence of the interaction.

The scripting smart icon has the associated Scripting View that allows the designer to edit JavaScript code for the scripting node. The View has syntax highlighting and other features to help in scripting.

Each interaction smart icon has the associated Data View that allows the user to specify the parameters of the interaction and the binding of the interaction with the session and user variables.

The designer uses the above mentioned views to complete the information needed to specify the set of interactions that constitute a Pattern. The initial recorded interaction creates the smart icon nodes with the simulated data that the designer used during the scenario recording. The designer can later use the appropriate Data Views to fine-tune the interaction parameters. For example, the designer may change the literal value of the user name required for a web site with the session variable that the platform has supplied.

When the designer is satisfied with a Pattern, the designer can request the system to analyze and verify the Pattern. For example, the variables used may be required to have appropriate Type according to the usage. Another example would be that there may have to be exactly one start node in the Pattern. Eventually, after the validation, the designer can output the created Pattern for use by the rest of the Platform and save the Pattern file for later use.

While various embodiments have been described above, it should be understood that they have been presented by way of example only, and not limitation. Therefore, the breadth and scope of a preferred embodiment should not be limited by any of the above-described exemplary embodiments, but should be defined only in accordance with the following claims and their equivalents.

What is claimed is:

1. A method, comprising:
   generating an interaction pattern, by;
      displaying an interface including a browser for interacting with web content,
      receiving at least two user specified interactions with particular web content via the interface including at least a first user selection of a link and a second user selection of a button,
      recording the at least two user specified interactions with the particular web content, including recording at least the first user selection of the link and the second user selection of the button,
      generating the interaction pattern based on the recorded at least two user specified interactions with the particular web content, wherein the interaction pattern includes a code based representation of the first user selection of the link and the second user selection of the button, and
      displaying the interaction pattern on a graphical user interface by displaying the code based representation of the first user selection the link and the second user selection of the button, such that the interaction pattern includes a graphical representation of each of the at least two user specified interactions with the particular web content;
   recording an SMTP pattern, recording the SMTP pattern including:
      displaying a name pattern screen,
      receiving a pattern name for the SMTP pattern in the name pattern screen, displaying a mail server information screen,
receiving connection information separate from recipient information via the mail server information screen, the connection information including a mail server name,
displaying an address page separate from the mail server information screen,
receiving the recipient information via the address page,
displaying a content page separate from the mail server information screen and the address page,
receiving content in the content page, and
compiling an electronic mail message having the content;
receiving a command to link the interaction pattern and the SMTP pattern identified in the name pattern screen;
linking the interaction pattern and the SMTP pattern identified in the name pattern screen; and
in response to the interaction pattern being initiated, sending the electronic mail message to a recipient utilizing the connection information and the recipient information;
wherein the name pattern screen, the mail server information screen, the address page, and the content page are each associated with a separate tab displayed in a workplace view.

2. The method as claimed in claim 1, wherein the connection information includes at least one variable.

3. The method as claimed in claim 2, wherein the at least one variable is inserted using a button or a menu.

4. The method as claimed in claim 1, wherein the recipient information includes at least one variable.

5. The method as claimed in claim 4, wherein the at least one variable is displayed inside brackets with a variable name for the at least one variable.

6. The method as claimed in claim 1, wherein the content includes at least one variable.

7. The method as claimed in claim 1, wherein the mail server information screen includes a field for identifying an SMTP server.

8. The method as claimed in claim 1, wherein the mail server information screen includes afield for entering login information.

9. The method as claimed in claim 1, wherein the connection information further includes a mail server login password and a mail server account name.

10. The method as claimed in claim 2, wherein data is extracted into the variable from an XML document.

11. The method as claimed in claim 1, wherein the pattern name is for a set of instructions that constitutes the SMTP pattern specified by information in the mail server information screen, the address page, and the content page.

12. The method as claimed in claim 11, wherein the SMTP pattern is analyzed and verified, and after verification, the SMTP pattern is output and saved.

13. The method as claimed in claim 1, wherein the graphical user interface that displays the interaction pattern is separate from the workplace view.

14. The method as claimed in claim 1, wherein generating the interaction pattern further includes:
receiving a command via the graphical user interface to connect the code based representation of the first user selection of the link with the code based representation of the second user selection of the button, to provide a specific order of execution between the first user selection of the link with the second user selection of the button, and
connecting the first user selection of the link with the second user selection of the button to provide the specific order of execution.

15. The method as claimed in claim 1, wherein the at least two user specified interactions with the particular web content further include accessing a website and purchasing an item from the website.

16. The method as claimed in claim 15, wherein the interaction pattern and the SMTP pattern identified in the name pattern screen are linked such that in response to completion of the website access and the item purchase by way of the first user selection of the link and the second user selection of the button, the electronic mail message is sent to the recipient utilizing the connection information and the recipient information.

17. A system, comprising;
a processor;
logic for generating an interaction pattern, by:
displaying an interface including a browser for interacting with web content,
receiving at least two user specified interactions with particular web content via the interface including least a first user selection of a link and a second user selection of a button,
recording the at least two user specified interactions with the particular web content, including recording at least the first user selection of the link and the second user selection of the button,
generating the interaction pattern based on the recorded at least two user specified interactions with the particular web content, wherein the interaction pattern includes a code based representation of the first user selection of the link and the second user selection of the button, and
displaying the interaction pattern on a graphical user interface by displaying the code based representation of the first user selection of the link and the second user selection of the button, such that the interaction pattern includes a graphical representation of each of the at least two user specified interactions with the particular web content;
logic for recording an SMTP pattern, recording the SMTP pattern including:
displaying a name pattern screen,
receiving a pattern name for the SMTP pattern in the name pattern screen,
displaying a mail server information screen,
receiving connection information separate from recipient information via the mall server information screen, the connection information including a mail server name,
displaying an address page separate from the mail server information screen,
receiving the recipient information via the address page,
displaying a content page separate from the mail server information screen and the address page,
receiving content in the content page, and
compiling an electronic mail message having the content;
logic for receiving a command to link the interaction pattern and the SMTP pattern identified in the name pattern screen;
logic for linking the interaction pattern and the SMTP pattern identified in the name pattern screen; and logic for, in response to the interaction pattern being initiated, sending the electronic mail message to a recipient utilizing the connection information and the recipient information;

wherein the system is operable such that the name pattern screen, the mail server information screen, the address page, and the content page are each associated with a separate tab displayed in a workplace view.

18. The system as claimed in claim 17, wherein the connection information includes at least one variable, 19. The system as claimed in claim 18, wherein the at least one variable is inserted using a button or a menu.

20. The system as claimed in claim 17, wherein the recipient information includes at least one variable.

21. The system as claimed in claim 20, wherein the at least one variable is displayed inside brackets with a variable name for the at least one variable.

22. The system as claimed in claim 17, wherein the content includes at least one variable.

23. A computer program product embodied on a non-transitory computer-readable medium, comprising:

computer code for generating an interaction pattern, by:
displaying an interface including a browser for interacting with web content,
receiving at least two user specified interactions with particular web content via the interface including at least a first user selection of a link and a second user selection of a button,
recording the at least two user specified interactions with the particular web content, including recording at least the first user selection of the link and the second user selection of the button,
generating the interaction pattern based on the recorded at least two user specified interactions with the particular web content, wherein the interaction pattern includes a code based representation of the first user selection of the link and the second user selection of the button, and
displaying the interaction pattern on a graphical user interface by displaying the code based representation of the first user selection of the link and the second user selection of the button, such that the interaction pattern includes a graphical representation of each of the at least two user specified interactions with the particular web content;

computer code for recording an SMTP pattern, recording the SMTP pattern including:
displaying a name pattern screen,
receiving a pattern name for the SMTP pattern in the name pattern screen,
displaying a mail server information screen,
receiving connection information separate from recipient information via the mail server information screen, the connection information including a mail server name,
displaying an address page separate from the mail server information screen,
receiving the recipient information via the address page,
displaying a content page separate from the mail server information screen and the address page,
receiving content in the content page, and
compiling an electronic mail message having the content;

computer code for receiving a command to link the interaction pattern and the SMTP pattern identified in the name pattern screen;

computer code for linking the interaction pattern and the SMTP pattern identified in the name pattern screen; and computer code for, in response to the interaction pattern being initiated, sending the electronic mail message to a recipient utilizing the connection information and the recipient information;

wherein the computer program product is operable such that the name pattern screen, the mail server information screen, the address page, and the content page are each associated with a separate tab displayed in a workplace view.

24. The computer program product as claimed in claim 23, wherein the connection information includes at least one variable.

25. The computer program product as claimed in claim 24, wherein the at least one variable is inserted using a button or a menu.

26. The computer program product as claimed in claim 23, wherein the recipient information includes at least one variable.

27. The computer program product as claimed in claim 26, wherein the at least one variable is displayed inside brackets with a variable name for the at least one variable.

28. The computer program product as claimed in claim 23, wherein the content includes at least one variable.

* * * * *

UNITED STATES PATENT AND TRADEMARK OFFICE
CERTIFICATE OF CORRECTION

PATENT NO. : 8,185,585 B2  
APPLICATION NO. : 11/614768  
DATED : May 22, 2012  
INVENTOR(S) : Zondervan et al.

Page 1 of 1

It is certified that error appears in the above-identified patent and that said Letters Patent is hereby corrected as shown below:

On the cover page
item (75), Inventors, replace "Muhammad Ata Ul Haleem Vainco" with --Muhammad Ata Ul Haleem Vaince--.

Claim 1, col. 26, line 39; replace "by;" with --by:--;
Claim 1, col. 26, line 58; replace "selection the" with --selection of the--;
Claim 8, col. 27, line 42; replace "afield" with --a field--;
Claim 17, col. 28, line 16; replace "comprising;" with --comprising:--;
Claim 17, col. 28, lines 22-23; replace "including least" with --including at least--;
Claim 17, col. 28, line 49; replace "mall" with --mail--;
Claim 18, col. 29, line 10; replace "variable," with --variable.--;
Claim 29, col. 30, lines 19-20; replace "the interaction" with --the recorded interaction--.

Signed and Sealed this
Fifth Day of March, 2013

Teresa Stanek Rea
*Acting Director of the United States Patent and Trademark Office*